(12) United States Patent
Chandler et al.

(10) Patent No.: US 11,910,066 B2
(45) Date of Patent: Feb. 20, 2024

(54) PROVIDING INTERACTIVE ADVERTISEMENTS

(71) Applicant: Turner Broadcasting System, Inc., Atlanta, GA (US)

(72) Inventors: Keith Chandler, Snellville, GA (US); Alex Wellen, Atlanta, GA (US); Don Loheide, Atlanta, GA (US); Rajin Persaud, Atlanta, GA (US); Michael Koetter, Decatur, GA (US); Chris Hinton, Decatur, GA (US); Neda Davis, Atlanta, GA (US); Laura Poffenberger, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 907 days.

(21) Appl. No.: 15/009,217

(22) Filed: Jan. 28, 2016

(65) Prior Publication Data

US 2016/0150291 A1 May 26, 2016

Related U.S. Application Data

(63) Continuation of application No. 15/008,844, filed on Jan. 28, 2016, now Pat. No. 10,820,062, which is a
(Continued)

(51) Int. Cl.
*H04N 21/81* (2011.01)
*H04N 21/845* (2011.01)
(Continued)

(52) U.S. Cl.
CPC .......... *H04N 21/812* (2013.01); *G06F 16/41* (2019.01); *G06F 16/9577* (2019.01);
(Continued)

(58) Field of Classification Search
CPC .... G06F 17/30; G06F 16/986; G06F 16/9577; G06F 16/41; G11B 27/031; G11B 27/10;
(Continued)

(56) References Cited

U.S. PATENT DOCUMENTS 5,479,266 A 12/1995 Young et al.
5,751,282 A 5/1998 Girard et al.
(Continued)

FOREIGN PATENT DOCUMENTS

JP 10243365 A 9/1998

OTHER PUBLICATIONS

United States Patent and Trademark Office, Office Action for U.S. Appl. No. 14/522,884, filed May 26, 2017, 42 pages, U.S.A.
(Continued)

*Primary Examiner* — Michael Roswell
*Assistant Examiner* — Tionna M Burke
(74) *Attorney, Agent, or Firm* — ALSTON & BIRD LLP

(57) ABSTRACT

An example method for providing an interactive advertisement in association with a media presentation comprises storing a commercial identifier in association with an interactive advertisement identifying a commercial associated with the interactive advertisement. The interactive advertisement is associated with interactive advertisement data comprising a related content identifier identifying a related content object. Before a commercial segment begins, a list of commercials to be provided during the commercial segment is received comprising the commercial identifier. After determining that the commercial associated with the interactive advertisement is to be provided during the commercial segment and responsive to determining that the commercial segment is eligible for hosting the interactive advertisement, providing at least a portion of the interactive advertisement data, the portion of the interactive advertise-
(Continued)

FIG. 13 ment data configured to provide access to the related content object. The commercial and access to the related content object are provided for simultaneous display.

21 Claims, 20 Drawing Sheets

Related U.S. Application Data continuation-in-part of application No. 14/522,739, filed on Oct. 24, 2014, now Pat. No. 10,025,875.

(60) Provisional application No. 61/895,617, filed on Oct. 25, 2013.

(51) Int. Cl.

| | | |
|---|---|---|
| G11B 27/10 | (2006.01) | |
| H04N 21/458 | (2011.01) | |
| H04N 21/643 | (2011.01) | |
| H04N 21/431 | (2011.01) | |
| H04N 21/8352 | (2011.01) | |
| H04H 60/07 | (2008.01) | |
| H04L 67/10 | (2022.01) | |
| H04H 20/93 | (2008.01) | |
| H04H 20/28 | (2008.01) | |
| H04N 21/44 | (2011.01) | |
| G06F 16/41 | (2019.01) | |
| G06F 16/958 | (2019.01) | |
| H04W 4/06 | (2009.01) | |
| G06F 16/957 | (2019.01) | |
| G11B 27/031 | (2006.01) | |
| H04N 21/234 | (2011.01) | |
| H04N 21/236 | (2011.01) | |
| H04N 21/2668 | (2011.01) | |
| H04N 21/2665 | (2011.01) | |
| H04N 21/45 | (2011.01) | |

(52) U.S. Cl.
CPC .......... *G06F 16/986* (2019.01); *G11B 27/031* (2013.01); *G11B 27/10* (2013.01); *H04H 20/28* (2013.01); *H04H 20/93* (2013.01); *H04H 60/07* (2013.01); *H04L 67/10* (2013.01); *H04N 21/23418* (2013.01); *H04N 21/23605* (2013.01); *H04N 21/2665* (2013.01); *H04N 21/2668* (2013.01); *H04N 21/4316* (2013.01); *H04N 21/44016* (2013.01); *H04N 21/458* (2013.01); *H04N 21/4524* (2013.01); *H04N 21/64322* (2013.01); *H04N 21/8352* (2013.01); *H04N 21/8456* (2013.01); *H04W 4/06* (2013.01)

(58) Field of Classification Search
CPC ........ H04H 20/28; H04H 20/93; H04H 60/07; H04L 67/10; H04N 21/23418; H04N 21/23605; H04N 21/2665; H04N 21/2668; H04N 21/4316; H04N 21/44016; H04N 21/4524; H04N 21/458; H04N 21/64322; H04N 21/8352; H04N 21/8456; H04W 4/06
USPC ....................................................... 715/202
See application file for complete search history.

(56) References Cited

U.S. PATENT DOCUMENTS

| | | |
|---|---|---|
| 5,841,433 A | 11/1998 | Chaney |
| 5,886,690 A | 3/1999 | Pond et al. |
| 5,990,890 A | 11/1999 | Etheredge |
| 6,829,781 B1 | 12/2004 | Ghagavath et al. |
| 6,952,221 B1 | 10/2005 | Holtz et al. |
| 7,337,462 B2 | 2/2008 | Dukiewicz et al. |
| 7,549,128 B2 | 6/2009 | Snyder et al. |
| 7,801,910 B2 | 9/2010 | Houh et al. |
| 8,150,990 B2 | 4/2012 | Ogram |
| 8,661,366 B2 | 2/2014 | Snyder et al. |
| 8,707,354 B1 | 4/2014 | Moreau et al. |
| 8,726,187 B2 | 5/2014 | Snyder et al. |
| 8,739,213 B2 | 5/2014 | Angiolillo et al. |
| 9,055,309 B2 | 6/2015 | Neumeier et al. |
| 9,449,109 B1 | 9/2016 | Keel et al. |
| 9,716,918 B1* | 7/2017 | Lockton .............. H04N 21/812 |
| 10,212,490 B2 | 2/2019 | Major |
| 2001/0001160 A1 | 5/2001 | Shoff et al. |
| 2002/0013943 A1 | 1/2002 | Haberman et al. |
| 2002/0083439 A1* | 6/2002 | Eldering ................ G06Q 30/02 |
| | | 725/32 |
| 2002/0083468 A1 | 6/2002 | Dudkiewicz |
| 2002/0091762 A1 | 7/2002 | Sohn et al. |
| 2003/0001880 A1 | 1/2003 | Holtz et al. |
| 2003/0189588 A1 | 10/2003 | Girgensohn et al. |
| 2004/0123321 A1 | 6/2004 | Striemer |
| 2004/0133468 A1 | 7/2004 | Varghese |
| 2004/0210945 A1 | 10/2004 | Snyder et al. |
| 2004/0237120 A1 | 11/2004 | Lewin et al. |
| 2005/0022237 A1 | 1/2005 | Nomura |
| 2005/0091694 A1 | 4/2005 | Rambo |
| 2006/0020966 A1 | 1/2006 | Poslinski |
| 2006/0149677 A1 | 7/2006 | Shahine et al. |
| 2006/0218618 A1 | 9/2006 | Lorkovic |
| 2007/0073767 A1 | 3/2007 | Springer et al. |
| 2007/0220419 A1 | 9/2007 | Stibel et al. |
| 2008/0183806 A1 | 7/2008 | Cancel et al. |
| 2008/0201225 A1 | 8/2008 | Maharajh et al. |
| 2008/0263581 A1 | 10/2008 | Turner |
| 2008/0320413 A1 | 12/2008 | Oshiro et al. |
| 2009/0076898 A1 | 3/2009 | Wang et al. |
| 2009/0226152 A1 | 9/2009 | Hanes |
| 2009/0288008 A1 | 11/2009 | Snyder et al. |
| 2009/0292991 A1 | 11/2009 | Snyder et al. |
| 2010/0269138 A1 | 10/2010 | Krikorian et al. |
| 2010/0306402 A1 | 12/2010 | Russell et al. |
| 2011/0113363 A1 | 5/2011 | Hunt et al. |
| 2011/0119595 A1 | 5/2011 | Bydeley et al. |
| 2011/0196888 A1 | 8/2011 | Hanson et al. |
| 2012/0072278 A1* | 3/2012 | Kamangar ......... G06Q 30/0244 |
| | | 705/14.41 |
| 2012/0136701 A1* | 5/2012 | Relan ..................... G06Q 30/02 |
| | | 705/14.4 |
| 2012/0166294 A1 | 6/2012 | Lieberman et al. |
| 2012/0240151 A1* | 9/2012 | Tapper ............... H04N 21/4104 |
| | | 725/32 |
| 2013/0198642 A1 | 8/2013 | Carney et al. |
| 2014/0122485 A1 | 5/2014 | Shyamsundar et al. |
| 2014/0195675 A1 | 7/2014 | Silver |
| 2014/0232874 A1 | 8/2014 | Meyer |
| 2015/0007027 A1 | 1/2015 | Anderson et al. |
| 2015/0120768 A1 | 4/2015 | Wellen et al. |
| 2015/0121221 A1 | 4/2015 | Wellen et al. |
| 2015/0121223 A1 | 4/2015 | Wellen et al. |
| 2015/0121417 A1 | 4/2015 | Vince |
| 2015/0121419 A1 | 4/2015 | Wellen et al. |
| 2015/0121420 A1 | 4/2015 | Wellen et al. |
| 2015/0121424 A1 | 4/2015 | Wellen et al. |
| 2015/0121426 A1 | 4/2015 | Wellen et al. |
| 2015/0121439 A1 | 4/2015 | Wellen et al. |
| 2015/0155009 A1 | 6/2015 | Mate et al. |
| 2015/0256861 A1 | 9/2015 | Oyman |
| 2015/0294025 A1 | 10/2015 | Wellen et al. |
| 2016/0240170 A1 | 8/2016 | Scheepens et al. |
| 2018/0218400 A1 | 8/2018 | Kerns |

OTHER PUBLICATIONS

United States Patent and Trademark Office, Office Action for U.S. Appl. No. 14/523,459, filed Jun. 2, 2017, 17 pages, U.S.A.

(56) References Cited

OTHER PUBLICATIONS

United States Patent and Trademark Office, Office Action for U.S. Appl. No. 14/523,190, filed Jun. 14, 2017, 12 pages, U.S.A.
United States Patent and Trademark Office, Notice of Allowance for U.S. Appl. No. 14/522,998, filed Jun. 16, 2017, 11 pages, U.S.A.
United States Patent and Trademark Office, Office Action for U.S. Appl. No. 14/522,955, filed Jul. 13, 2017, 12 pages, U.S.A.
United States Patent and Trademark Office, Supplemental Notice of Allowability for U.S. Appl. No. 14/522,998, filed Jul. 27, 2017, 3 pages, U.S.A.
United States Patent and Trademark Office, Notice of Allowance for U.S. Appl. No. 14/523,092, filed Jul. 27, 2017, 11 pages, U.S.A.
Rean, "3rd Party "Related Links" Widgets for Websites—Best Of", Hongkiat.com, published prior to Jan. 9, 2012, <https://web.archive.org/web/20120109081506/http://www.hongkiat.com/blog/3rd-party-related-links-widgets/>, 6 page.
International Searching Authority, International Search Report and Written Opinion for International Application No. PCT/US2014/062171, dated Mar. 2, 2015, 13 pages, European Patent Office, The Netherlands.
The International Bureau of WIPO, International Preliminary Report on Patentability for International Application No. PCT/US2014/062171, dated May 6, 2016, 9 pages, Switzerland.
United States Patent and Trademark Office, Office Action for U.S. Appl. No. 14/523,459, filed May 20, 2016, 27 pages, U.S.A.
United States Patent and Trademark Office, Office Action for U.S. Appl. No. 14/523,390, filed Jun. 3, 2016, 23 pages, U.S.A.
United States Patent and Trademark Office, Office Action for U.S. Appl. No. 14/523,190, filed Jul. 1, 2016, 11 pages, U.S.A.
United States Patent and Trademark Office, Office Action for U.S. Appl. No. 14/523,092, filed Aug. 26, 2016, 11 pages, U.S.A.
United States Patent and Trademark Office, Office Action for U.S. Appl. No. 14/522,998, filed Jul. 28, 2016, 10 pages, U.S.A.
United States Patent and Trademark Office, Office Action for U.S. Appl. No. 14/522,955, filed Jul. 15, 2016, 10 pages, U.S.A.
United States Patent and Trademark Office, Office Action for U.S. Appl. No. 14/522,739, filed Jul. 1, 2016, 10 pages, U.S.A.
United States Patent and Trademark Office, Office Action for U.S. Appl. No. 14/523,307, filed Aug. 26, 2016, 11 pages, U.S.A.
United States Patent and Trademark Office, Notice of Allowance for U.S. Appl. No. 14/522,739, filed Mar. 20, 2018, 12 pages, U.S.A.
United States Patent and Trademark Office, Office Action for U.S. Appl. No. 14/523,390, filed Mar. 22, 2018, 17 pages, U.S.A.
United States Patent and Trademark Office, Office Action for U.S. Appl. No. 14/523,459, filed Mar. 26, 2018, 17 pages, U.S.A.
Smarty, Ann, "Split FireFox into Several Frames for Better Productivity and More", Jul. 2, 2010, 5 pages, retrieved from <https://www.searchenginejournal.com/split-firefox-into-several-frames-for-better-productivity-and-more/22257/>.
United States Patent and Trademark Office, Office Action for U.S. Appl. No. 14/523,459, filed Dec. 14, 2017, 19 pages, U.S.A.
United States Patent and Trademark Office, Notice of Allowance for U.S. Appl. No. 14/523,190, filed Jan. 9, 2018, 10 pages, U.S.A.
Lancet, Yaara, "Two Ways to Sneak a Peek at Videos While You're Working"; makeuseof.com, Aug. 30, 2011, retrieved from the Internet Archive <http://www.makeuseof.com/tag/ways-sneak-peek-videos-working/>, Sep. 24, 2011 to Feb. 18, 2017, 9 pages.
United States Patent and Trademark Office, Office Action for U.S. Appl. No. 14/523,092, filed Feb. 23, 2017, 11 pages, U.S.A.
United States Patent and Trademark Office, Office Action for U.S. Appl. No. 14/523,307, filed Feb. 27, 2017, 14 pages, U.S.A.
United States Patent and Trademark Office, Office Action for U.S. Appl. No. 14/522,739, filed Apr. 21, 2017, 11 pages, U.S.A.
United States Patent and Trademark Office, Office Action for U.S. Appl. No. 14/523,390, filed May 19, 2017, 14 pages, U.S.A.
United States Patent and Trademark Office, Notice of Allowance for U.S. Appl. No. 14/523,307, filed Sep. 12, 2017, 13 pages, U.S.A.
United States Patent and Trademark Office, Office Action for U.S. Appl. No. 14/522,884, filed Oct. 26, 2017, 48 pages, U.S.A.
United States Patent and Trademark Office, Office Action for U.S. Appl. No. 14/522,739, filed Nov. 3, 2017, 13 pages, U.S.A.
United States Patent and Trademark Office, Notice of Allowance for U.S. Appl. No. 14/522,955, filed Nov. 17, 2017, 9 pages, U.S.A.
United States Patent and Trademark Office, Office Action for U.S. Appl. No. 14/523,390, filed Dec. 4, 2017, 16 pages, U.S.A.
ABC News, "ABCNews, John Anderson Apologizes for Everything", Youtube.com, Internet Achieve from May 16, 2008 to Nov. 10, 2016 <https://web.archive.org/web/20090515232956/http://www.youtube.com/user/ABCNews>.
Angelone, Frank (Guest Blogger), "The Power of Video Vs. Text-based Content", lockergnome.com, published Jan. 6, 2010, retrieved from <http://lockergnome.com/2010/01/06/the-power-of-video-vs-text-based-content/> on Nov. 12, 2016.
United States Patent and Trademark Office, Office Action for U.S. Appl. No. 14/523,190, filed Jan. 13, 2017, 12 pages, U.S.A.
United States Patent and Trademark Office, Office Action for U.S. Appl. No. 14/523,390, filed Nov. 25, 2016, 27 pages, U.S.A.
United States Patent and Trademark Office, Office Action for U.S. Appl. No. 14/523,459, filed Nov. 22, 2016, 33 pages, U.S.A.
United States Patent and Trademark Office, Office Action for U.S. Appl. No. 14/522,998, filed Feb. 10, 2017, 11 pages, U.S.A.
United States Patent and Trademark Office, Office Action for U.S. Appl. No. 14/522,955, filed Jan. 17, 2017, 12 pages, U.S.A.
United States Patent and Trademark Office, Office Action for U.S. Appl. No. 14/522,739, filed Dec. 29, 2016, 12 pages, U.S.A.
United States Patent and Trademark Office, Office Action for U.S. Appl. No. 15/008,844, filed Apr. 6, 2018, 25 pages, U.S.A.
United States Patent and Trademark Office, Office Action for U.S. Appl. No. 15/009,221, filed Apr. 12, 2018, 26 pages, U.S.A.
United States Patent and Trademark Office, Notice of Allowability for U.S. Appl. No. 14/522,739, filed Jun. 20, 2018, 3 pages, U.S.A.
United States Patent and Trademark Office, Office Action for U.S. Appl. No. 15/009,201, filed Jul. 26, 2018, 31 pages, U.S.A.
United States Patent and Trademark Office, Office Action for U.S. Appl. No. 14/523,459, filed Oct. 17, 2018, 27 pages, U.S.A.
United States Patent and Trademark Office, Office Action for U.S. Appl. No. 14/523,390, filed Oct. 17, 2018, 31 pages, U.S.A.
United States Patent and Trademark Office, Office Action for U.S. Appl. No. 15/008,844, filed Oct. 31, 2018, 22 pages, U.S.A.
United States Patent and Trademark Office, Office Action for U.S. Appl. No. 15/009,221, filed Nov. 2, 2018, 19 pages, U.S.A.
Office Action for U.S. Appl. No. 15/008,844 dated Mar. 22, 2019, 12 pages.
United States Patent and Trademark Office, Office Action for U.S. Appl. No. 14/523,459, filed Dec. 31, 2018, 7 pages, U.S.A.
United States Patent and Trademark Office, Final Office Action for U.S. Appl. No. 15/009,221, filed Oct. 21, 2019, (17 pages), USA.
United States Patent and Trademark Office, NonFinal Office Action for U.S. Appl. No. 15/009,201, filed Aug. 22, 2019, (18 pages), USA.
United States Patent and Trademark Office, Notice of Allowance for U.S. Appl. No. 14/523,459, filed Sep. 11, 2019 (26 pages), USA.
United States Patent and Trademark Office, Final Office Action for U.S. Appl. No. 15/008,844, filed Sep. 13, 2019 (16 pages), USA.
United States Patent and Trademark Office, NonFinal Office Action for U.S. Appl. No. 15/009,221, filed Jan. 27, 2020, (17 pages), USA.
United States Patent and Trademark Office, Final Office Action for U.S. Appl. No. 15/009,201, filed Feb. 18, 2020, (17 pages), USA.
United States Patent and Trademark Office, Notice of Allowance for U.S. Appl. No. 14/523,390, filed Dec. 17, 2019, (13 pages), USA.
United States Patent and Trademark Office, NonFinal Office Action for U.S. Appl. No. 15/008,844, filed Dec. 31, 2019, (17 pages), USA.
NonFinal Office Action for U.S. Appl. No. 15/009,221, filed Sep. 30, 2020, (33 pages), United States Patent and Trademark Office, USA.
United States Patent and Trademark Office, Notice of Allowance for U.S. Appl. No. 15/008,844, filed Jun. 24, 2020, (26 pages), USA.
NonFinal Office Action for U.S. Appl. No. 15/009,221, dated Nov. 3, 2021, (15 pages), United States Patent and Trademark Office, USA.

(56) References Cited

OTHER PUBLICATIONS

Final Office Action for U.S. Appl. No. 15/009,221, dated Apr. 25, 2022, (22 pages), United States Patent and Trademark Office, US.
Final Office Action for U.S. Appl. No. 15/009,221, filed Mar. 8, 2021, (19 pages), United States Patent and Trademark Office, US.
United States Patent and Trademark Office, NonFinal Office Action for U.S. Appl. No. 15/009,201, filed Jan. 25, 2021, (45 pages), USA.
Communication Pursuant to Article 94(3) EPC for European Patent Application No. 14799591.4, dated Nov. 3, 2023, (10 pages), European Patent Office, Rijswijk, Netherlands.

* cited by examiner

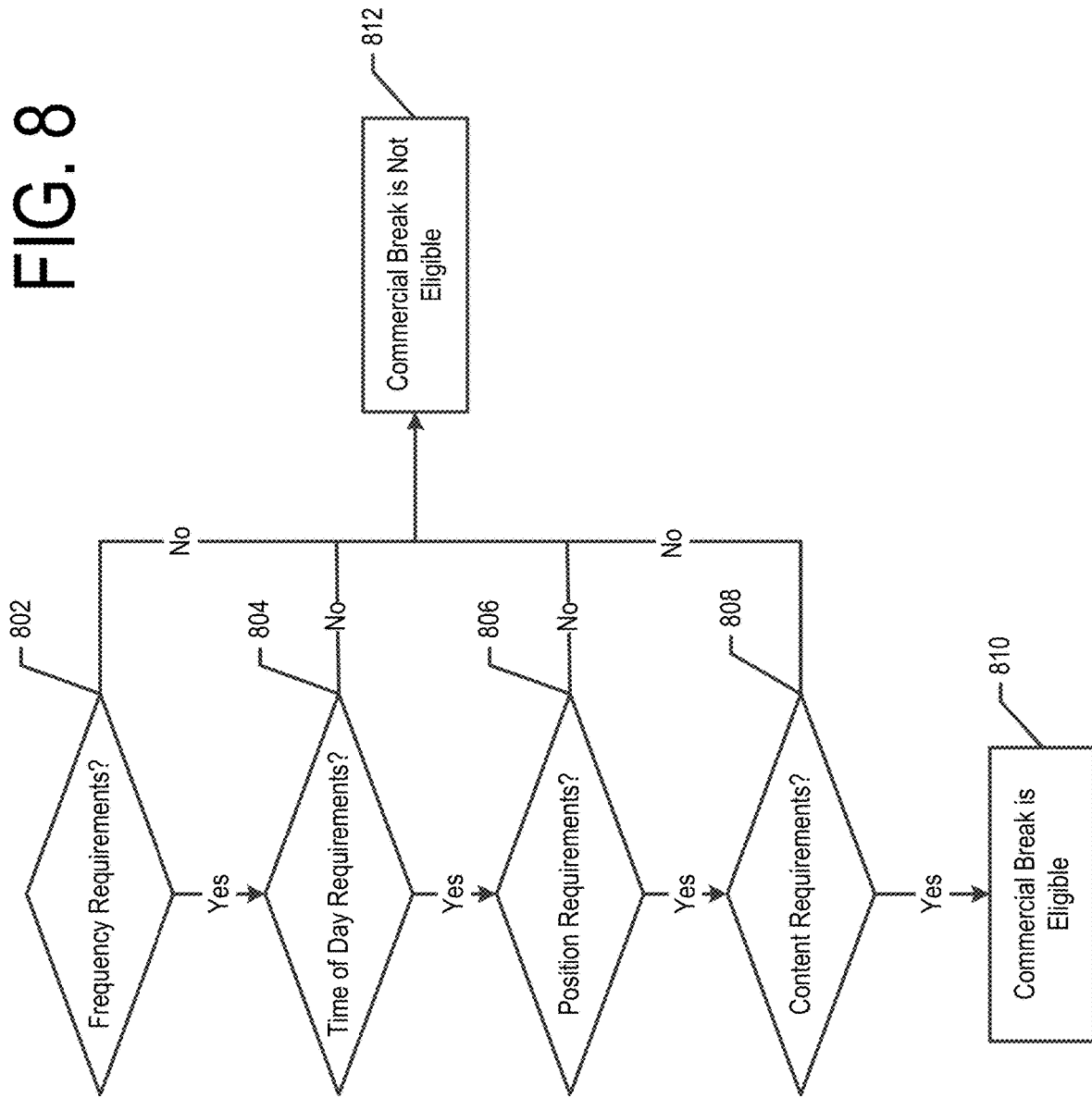

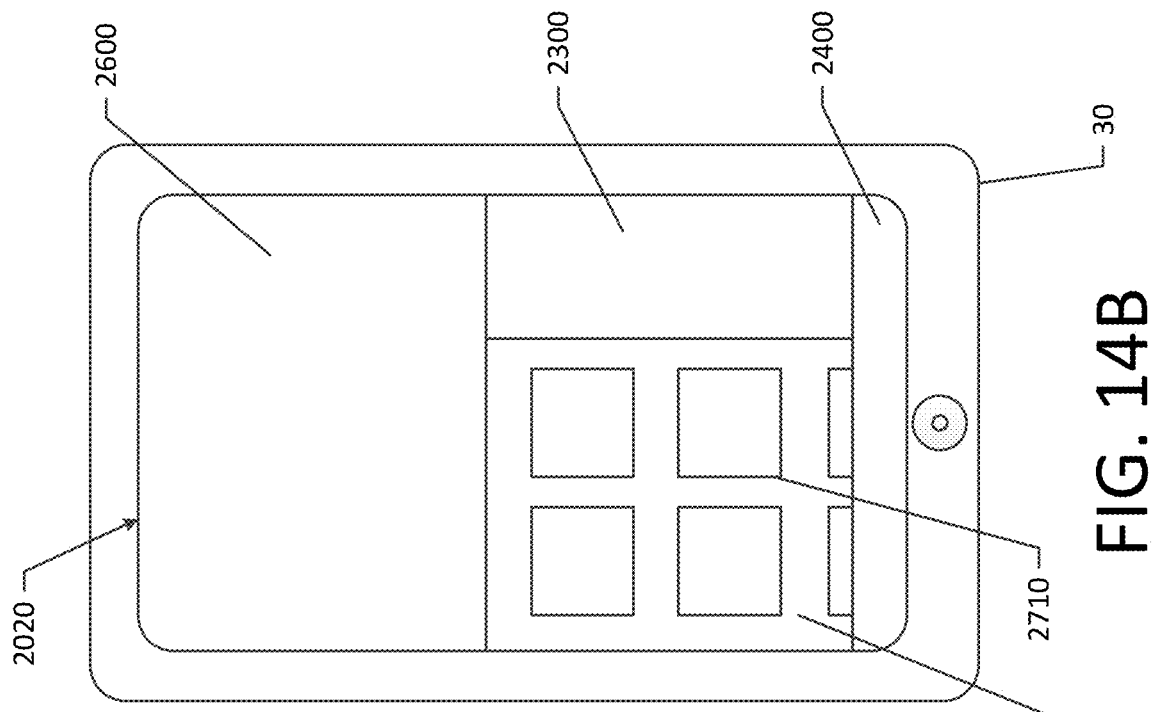
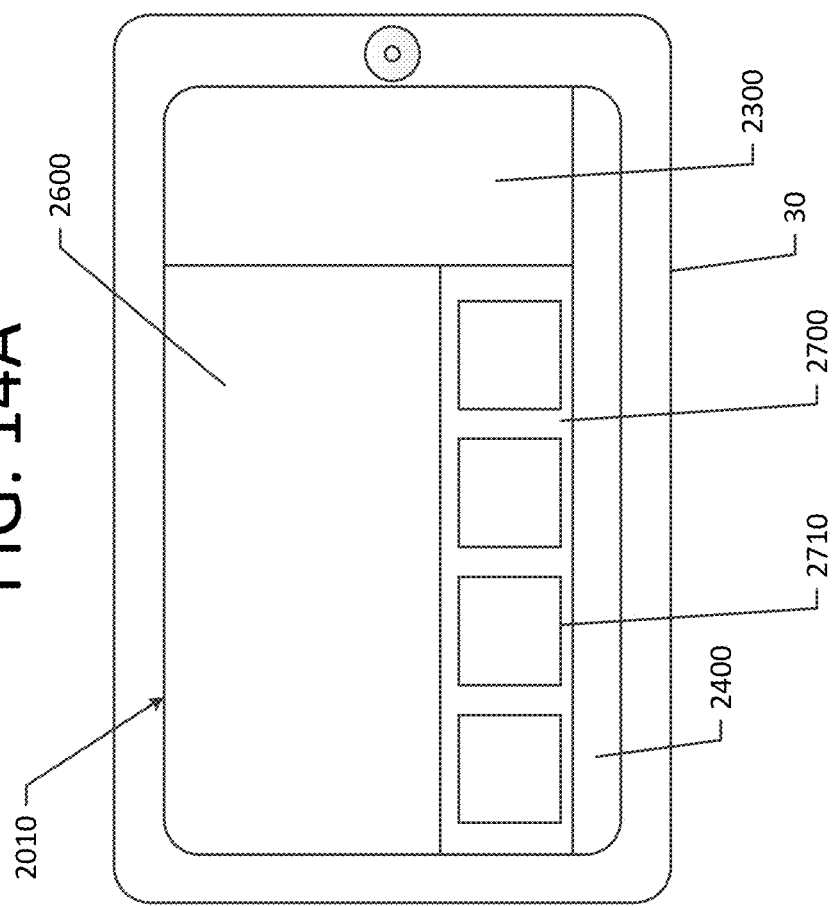
FIG. 14A
FIG. 14B

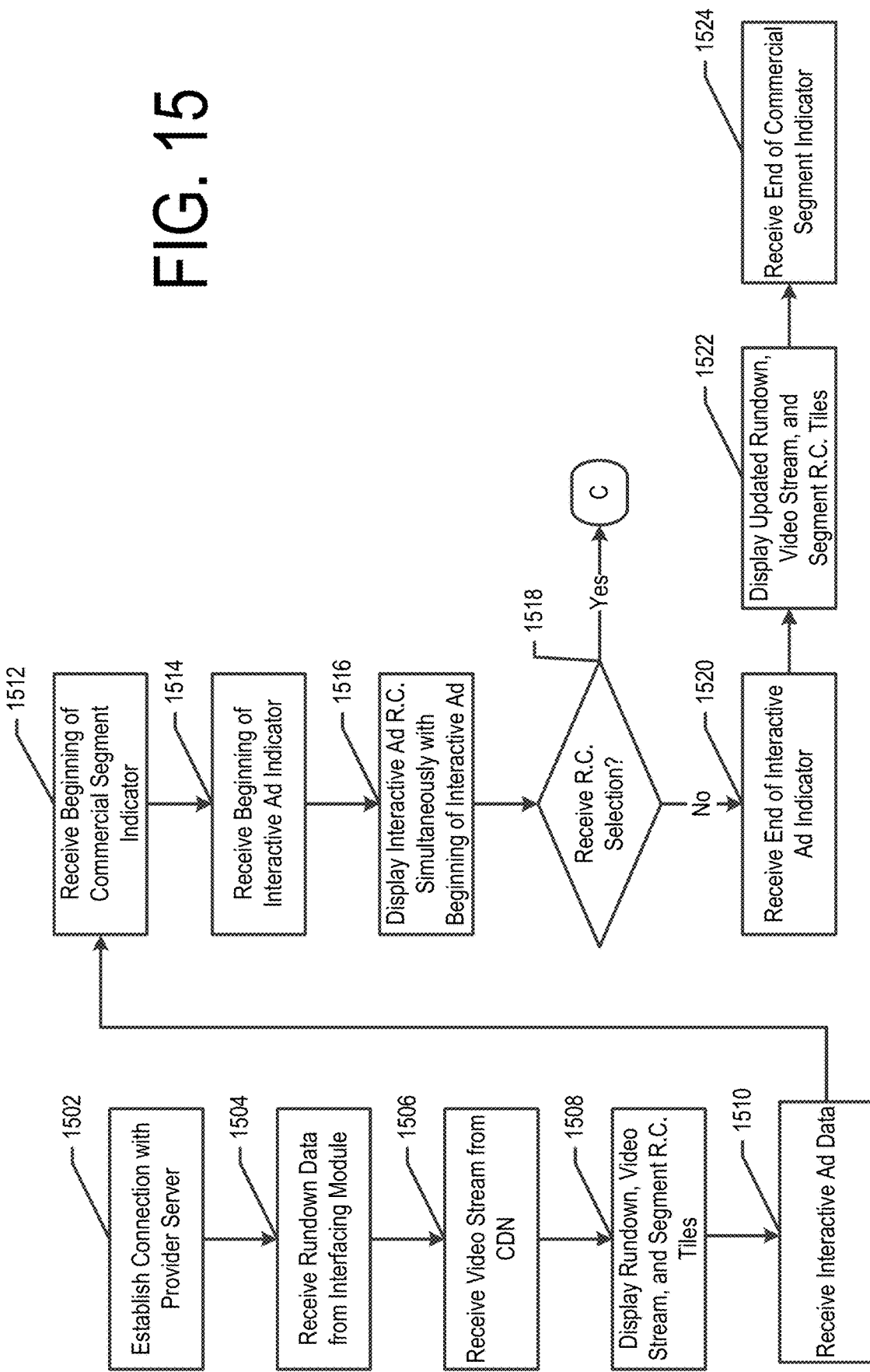

PROVIDING INTERACTIVE ADVERTISEMENTS

CROSS-REFERENCE TO RELATED APPLICATIONS

This application is a continuation of U.S. application Ser. No. 15/008,844, filed Jan. 28, 2016, which is a continuation-in-part application of U.S. application Ser. No. 14/522,739 filed Oct. 24, 2014, which claims priority to U.S. Provisional Application No. 61/895,617, filed Oct. 25, 2013, which are incorporated herein in their entireties by reference.

TECHNOLOGICAL FIELD

Embodiments of the present invention are generally related to providing users with an interactive advertisement in association with a media presentation.

BACKGROUND

As technology advances have provided opportunities for media presentations (e.g., television, live broadcast radio, printed publications, etc.) to become more interactive, the corresponding commercial/advertising content has also become more interactive. For example, while watching a television show via a digital cable box, a viewer may see a commercial for Pigeon Forge including instructions to press the "OK" button on the viewer's remote to learn more. This form of telescoping commercial allows an interested viewer to view extended commercial/advertising content. For example, if the user presses the "OK" button on the viewer's remote, the viewer may be provided with a fifteen minute video about things to do and accommodations in or near Pigeon Forge. However, in order for the viewer to view the extended commercial/advertising content, such telescoping commercials remove the viewer from the channel they were previously watching.

Therefore, a need exists for improved methods, apparatus, systems, computer program products, computing devices, computing entities, and/or the like for providing improved interactive advertisements.

BRIEF SUMMARY

In general, embodiments of the present invention provide methods, apparatus, systems, computer program products, computing devices, computing entities, and/or the like for providing interactive advertisements (referred to as interactive advertisements herein) in association with a media presentation.

According to one aspect of the present invention, a method for providing an interactive advertisement is association with a media presentation is provided. In various embodiments, the method comprises storing a commercial identifier in association with an interactive advertisement. The commercial identifier is configured to uniquely identify a commercial associated with the interactive advertisement and the interactive advertisement is associated with interactive advertisement data comprising a related content identifier identifying a related content object. The method further comprises, before a commercial segment begins, receiving a list of commercials to be provided during the commercial segment. The list of commercials comprises the commercial identifier uniquely identifying the commercial associated with the interactive advertisement. The method further comprises, responsive to a determination that the commercial associated with the interactive advertisement is to be provided during the commercial segment, determining whether the commercial segment is eligible for hosting the interactive advertisement. Responsive to determining that the commercial segment is eligible for hosting the interactive advertisement, providing at least a portion of the interactive advertisement data, the portion of the interactive advertisement data configured to provide access to the related content object. The commercial and access to the related content object are provided for simultaneous display.

In another aspect of the present invention, a system is provided. In various embodiments, the system comprises at least one memory and at least one processor. The system is configured to at least store a commercial identifier in association with an interactive advertisement. The commercial identifier uniquely identifies a commercial associated with the interactive advertisement. The interactive advertisement is associated with interactive advertisement data comprising a related content identifier identifying a related content object. The system is further configured to, before a commercial segment begins, receive a list of commercials to be provided during the commercial segment. The list of commercials comprises the commercial identifier uniquely identifying the commercial associated with the interactive advertisement. The system is further configured to, responsive to a determination that the commercial associated with the interactive advertisement is to be provided during the commercial segment, determine whether the commercial segment is eligible for hosting the interactive advertisement. Responsive to determining that the commercial segment is eligible for hosting the interactive advertisement, the system is further configured to provide at least a portion of the interactive advertisement data. The portion of the interactive advertisement data is configured to provide access to the related content object. The commercial and access to the related content object are provided for simultaneous display.

In yet another aspect of the present invention, a computer program product for providing an interactive advertisement in association with a media presentation is provided. In one embodiment, the computer program product comprises at least one non-transitory computer-readable storage medium having computer-readable program code portions stored therein. The computer-readable program code portions comprise an executable portion configured to store a commercial identifier in association with an interactive advertisement. The commercial identifier uniquely identifies a commercial associated with the interactive advertisement and the interactive advertisement is associated with interactive advertisement data comprising a related content identifier identifying a related content object. The computer-readable program code portions further comprise an executable portion configured to, before a commercial segment begins, receive a list of commercials to be provided during the commercial segment. The list of commercials comprising the commercial identifier uniquely identifying the commercial associated with the interactive advertisement. The computer-readable program code portions further comprise an executable portion configured to, responsive to a determination that the commercial associated with the interactive advertisement is to be provided during the commercial segment, determine whether the commercial segment is eligible for hosting the interactive advertisement and an executable portion configured to, responsive to determining that the commercial segment is eligible for hosting the interactive advertisement, provide at least a portion of the interactive advertisement data. The portion of the interactive advertisement data is configured to provide access to the related content object. The commercial and access to the related content object are provided for simultaneous display.

In still another aspect of the present invention, a method for providing an interactive advertisement in association with a media presentation is provided. In one embodiment, the method comprises storing a commercial identifier in association with an interactive advertisement. The commercial identifier uniquely identifies a commercial associated with the interactive advertisement and the interactive advertisement is associated with interactive advertisement data comprising a related content identifier identifying a related content object. The method further comprises monitoring a linear broadcast to identify an indicator comprising a next commercial identifier. The next commercial identifier identifies a next commercial that will be provided subsequent to a current video portion of the linear broadcast. The method further comprises, responsive to identifying the indicator, determining whether the next commercial identifier is the same as the commercial identifier associated with the interactive advertisement; and, responsive to determining that the next commercial identifier is the same as the commercial identifier associated with the interactive advertisement, determining whether a current commercial segment is eligible for hosting the interactive advertisement. The method further comprises, responsive to determining that the current commercial segment is eligible for hosting the interactive advertisement, providing at least a portion of the interactive advertisement data. The at least a portion of the interactive advertisement data provides access to the related content object. The commercial and access to the related content object are provided for simultaneous display.

In another aspect of the invention, a system for providing an interactive advertisement in association with a media presentation is provided. In one embodiment, the system comprises at least one memory and at least one processor. The system is configured to at least store a commercial identifier in association with an interactive advertisement. The commercial identifier uniquely identifies a commercial associated with the interactive advertisement. The interactive advertisement is associated with interactive advertisement data comprising a related content identifier identifying a related content object. The system is further configured to monitor a linear broadcast to identify an indicator comprising a next commercial identifier. The next commercial identifier identifies a next commercial that will be provided subsequent to a current video portion of the linear broadcast. Responsive to identifying the indicator, the system is further configured to determine whether the next commercial identifier is the same as the commercial identifier associated with the interactive advertisement. Responsive to determining that the next commercial identifier is the same as the commercial identifier associated with the interactive advertisement, the system is further configured to determine whether a current commercial segment is eligible for hosting the interactive advertisement. Responsive to determining that the current commercial segment is eligible for hosting the interactive advertisement, the system is further configured to provide at least a portion of the interactive advertisement data. The at least a portion of the interactive advertisement data provides access to the related content object and the commercial and access to the related content object are provided for simultaneous display.

In yet another aspect of the present invention, a computer program product for providing an interactive advertisement in association with a media presentation is provided. In one embodiment, the computer program product comprises at least one non-transitory computer-readable storage medium having computer-readable program code portions stored therein. The computer-readable program code portions comprise an executable portion configured to store a commercial identifier in association with an interactive advertisement. The commercial identifier uniquely identifies a commercial associated with the interactive advertisement. The interactive advertisement is associated with interactive advertisement data comprising a related content identifier identifying a related content object. The computer read-able program code portions further comprise an executable portion configured to monitor a linear broadcast to identify an indicator comprising a next commercial identifier. The next commercial identifier identifies a next commercial that will be provided subsequent to a current video portion of the linear broadcast. The computer-readable program code portions further comprise an executable portion configured to, responsive to identifying the indicator, determine whether the next commercial identifier is the same as the commercial identifier associated with the interactive advertisement; an executable portion configured to, responsive to determining that the next commercial identifier is the same as the commercial identifier associated with the interactive advertisement, determine whether a current commercial segment is eligible for hosting the interactive advertisement; and an executable portion configured to, responsive to determining that the current commercial segment is eligible for hosting the interactive advertisement, provide at least a portion of the interactive advertisement data. The at least a portion of the interactive advertisement data is configured to provide access to the related content object. The commercial and access to the related content object are provided for simultaneous display.

In still another aspect of the present invention, a method for determining whether a commercial should be provided as an interactive advertisement is provided. According to one embodiment, the method comprises storing interactive advertisement data associated with an interactive advertisement. The interactive advertisement data (a) identifies an associated commercial and (b) comprises at least one characteristic requirement identifying one or more characteristics that must be satisfied by a commercial segment for the interactive advertisement to be provided during the commercial segment. The method further comprises receiving an indication that the associated commercial is to be provided during a first commercial segment and determining whether the one or more characteristics that must be satisfied by a commercial segment for the interactive advertisement to be provided during the commercial segment are satisfied by the first commercial segment. Responsive to determining that the one or more characteristics that must be satisfied by a commercial segment for the interactive advertisement to be provided during the commercial segment are satisfied by the first commercial segment, providing at least a portion of the interactive advertisement data for the first commercial segment, wherein the associated commercial and at least a portion of the interactive advertisement data are provided for simultaneous display to a user.

In another aspect of the present invention, a system for determining whether a commercial should be provided as an interactive advertisement is provided. In one embodiment, the system comprises at least one memory and at least one processor. The system is configured to at least store interactive advertisement data associated with an interactive advertisement, the interactive advertisement data (a) identifying an associated commercial and (b) comprising at least one characteristic requirement identifying one or more characteristics that must be satisfied by a commercial segment for the interactive advertisement to be provided during the commercial segment. The system is further configured to receive an indication that the associated commercial is to be provided during a first commercial segment and determine whether the one or more characteristics that must be satisfied by a commercial segment for the interactive advertisement to be provided during the commercial segment are satisfied by the first commercial segment. Responsive to determining that the one or more characteristics that must be satisfied by a commercial segment for the interactive advertisement to be provided during the commercial segment are satisfied by the first commercial segment, the system is configured to provide at least a portion of the interactive advertisement data for the first commercial segment. The associated commercial and at least a portion of the interactive advertisement data are provided for simultaneous display to a user.

In yet another aspect of the present invention, a computer program product for determining whether a commercial should be provided as an interactive ad is provided. In one embodiment, the computer program product comprises at least one non-transitory computer-readable storage medium having computer-readable program code portions stored therein. The computer-readable program code portions comprise an executable portion configured to store interactive advertisement data associated with an interactive advertisement, the interactive advertisement data (a) identifying an associated commercial and (b) comprising at least one characteristic requirement identifying one or more characteristics that must be satisfied by a commercial segment for the interactive advertisement to be provided during the commercial segment. The computer-readable program code portions further comprise an executable portion configured to receive an indication that the associated commercial is to be provided during a first commercial segment and an executable portion configured to determine whether the one or more characteristics that must be satisfied by a commercial segment for the interactive advertisement to be provided during the commercial segment are satisfied by the first commercial segment. The computer-readable program code portions further comprise an executable portion configured to responsive to determining that the one or more characteristics that must be satisfied by a commercial segment for the interactive advertisement to be provided during the commercial segment are satisfied by the first commercial segment, provide at least a portion of the interactive advertisement data for the first commercial segment. The associated commercial and at least a portion of the interactive advertisement data are provided for simultaneous display to a user.

In still another aspect of the present invention, a method for providing an interactive advertisement is provided. In one embodiment, the method comprises receiving interactive advertisement data, the interactive advertisement data comprising (a) a commercial identifier uniquely identifying a commercial associated with the interactive advertisement and (b) one or more related content tiles, each related content tile (i) associated with a related content identifier and (ii) configured to provide a user with access to a related content object. The method further comprises providing for simultaneous display, via a user interface, of (a) the one or more related content tiles and (b) the commercial; receiving input, via the user interface, indicating a user selection of a first related content tile of the one or more related content files; and providing for display, via the interface, of a first related content object associated with the first related content tile while simultaneously displaying the commercial via the user interface.

In another aspect of the present invention, a system for providing an interactive advertisement is provided. In one embodiment, the system comprises at least one memory and at least one processor. The system is configured to at least receive interactive advertisement data, the interactive advertisement data comprising (a) a commercial identifier uniquely identifying a commercial associated with the interactive advertisement and (b) one or more related content tiles, each related content tile (i) associated with a related content identifier and (ii) configured to provide a user with access to a related content object. The system is further configured to provide for simultaneous display, via a user interface, of (a) the one or more related content tiles and (b) the commercial; receive input, via the user interface, indicating a user selection of a first related content tile of the one or more related content files; and provide for display, via the interface, of a first related content object associated with the first related content tile while simultaneously displaying the commercial via the user interface.

In yet another aspect of the present invention, a computer program product for providing an interactive advertisement is provided. In one embodiment, the computer program product comprising at least one non-transitory computer-readable storage medium having computer-readable program code portions stored therein. The computer-readable program code portions comprise an executable portion configured to receive interactive advertisement data, the interactive advertisement data comprising (a) a commercial identifier uniquely identifying a commercial associated with the interactive advertisement and (b) one or more related content tiles, each related content tile (i) associated with a related content identifier and (ii) configured to provide a user with access to a related content object. The computer-readable program code portions further comprise an executable portion configured to provide for simultaneous display, via a user interface, of (a) the one or more related content tiles and (b) the commercial; an executable portion configured to receive input, via the user interface, indicating a user selection of a first related content tile of the one or more related content files; and an executable portion configured to provide for display, via the interface, of a first related content object associated with the first related content tile while simultaneously displaying the commercial via the user interface.

BRIEF DESCRIPTION OF THE SEVERAL VIEWS OF THE DRAWINGS

Figure 1:
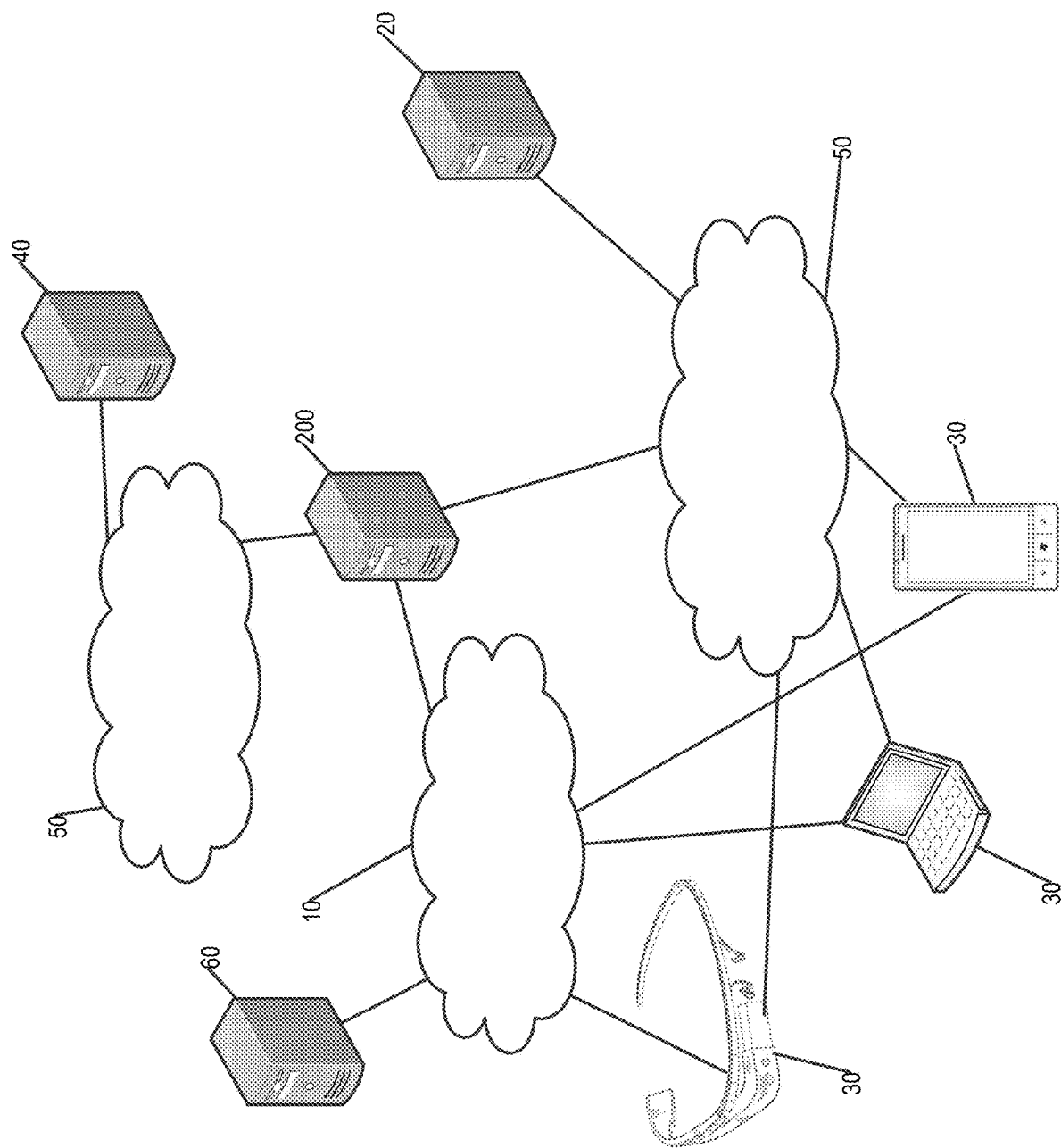
Figure 2:
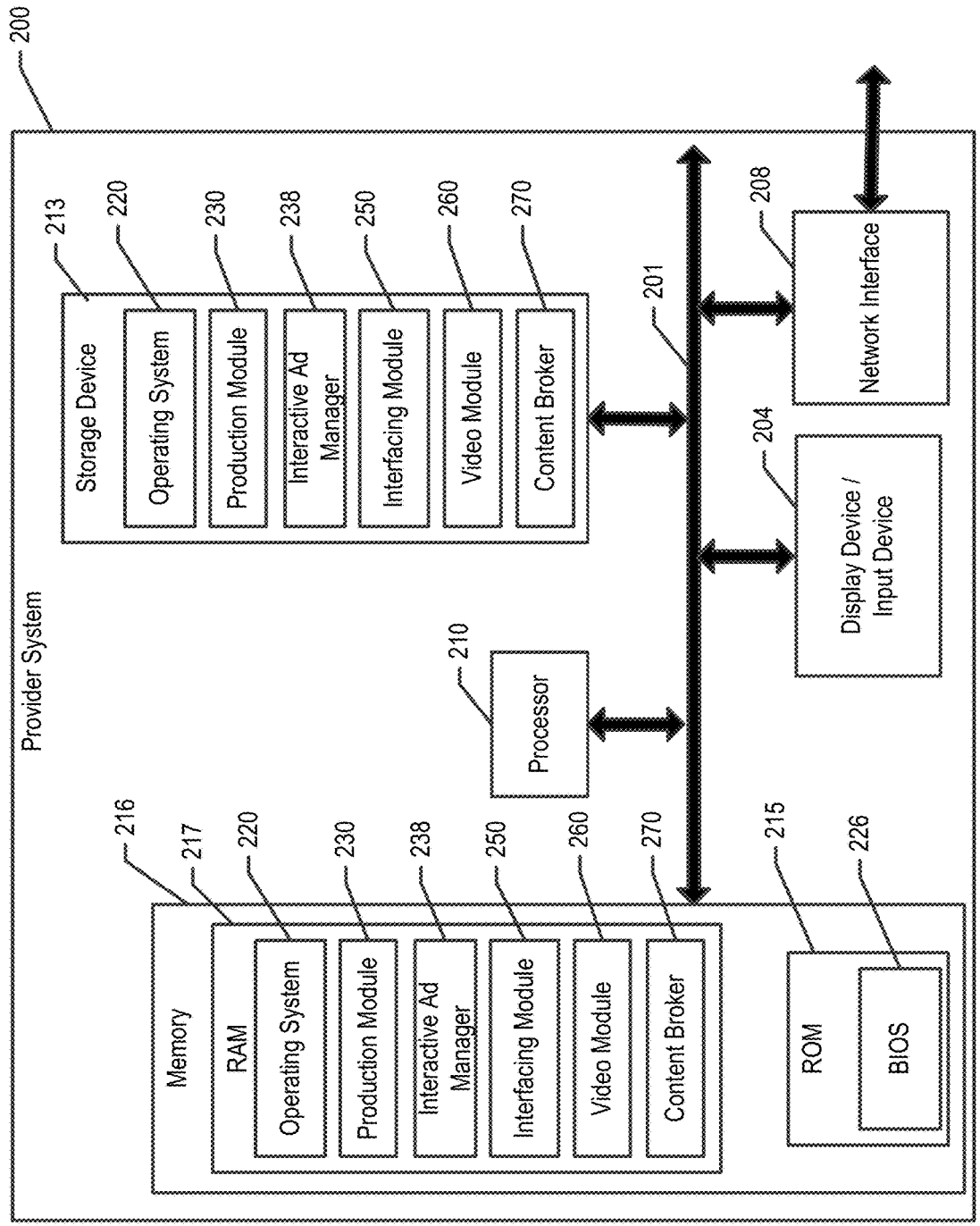
Figure 3:
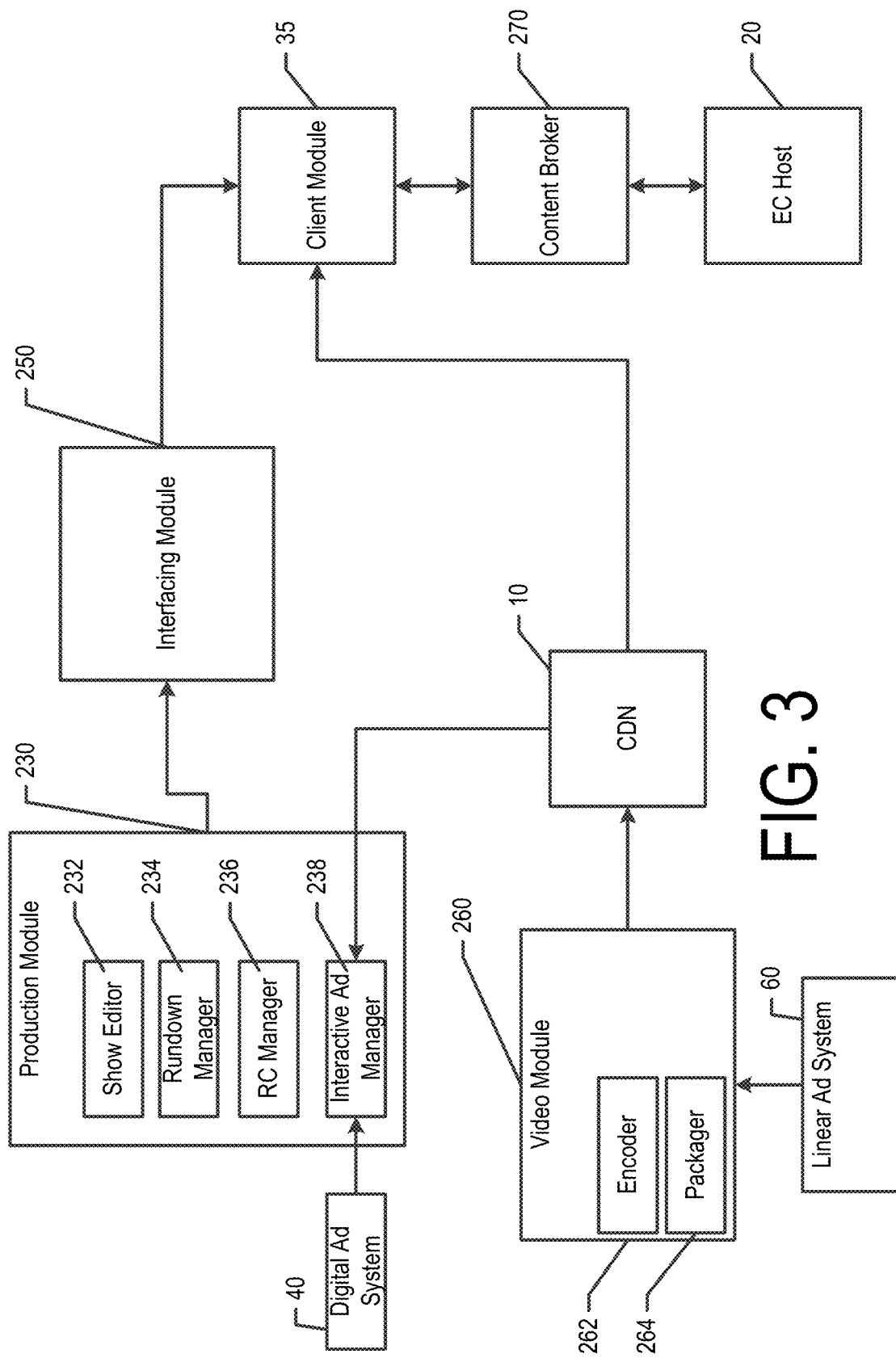
Figure 13:
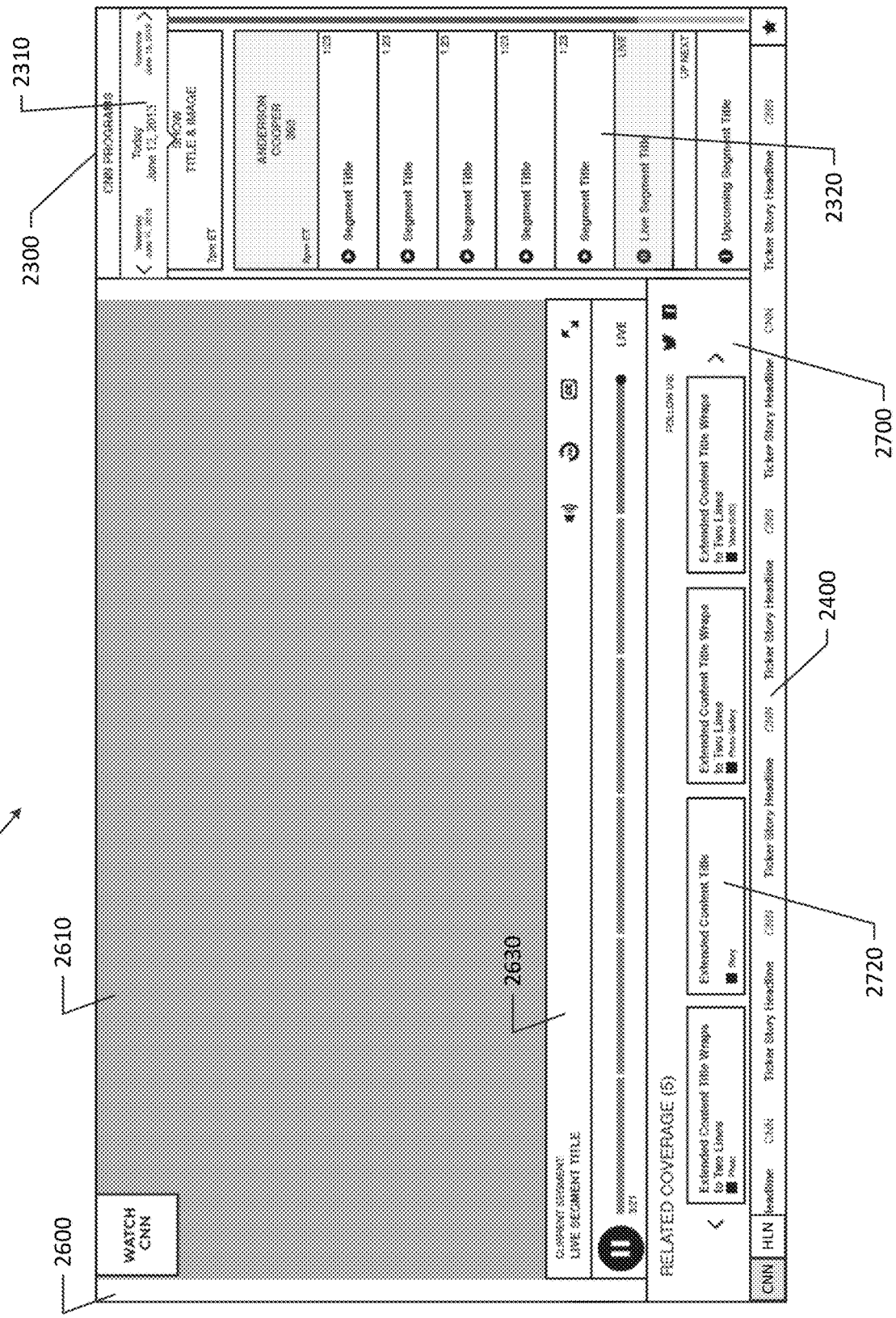
Figure 16:
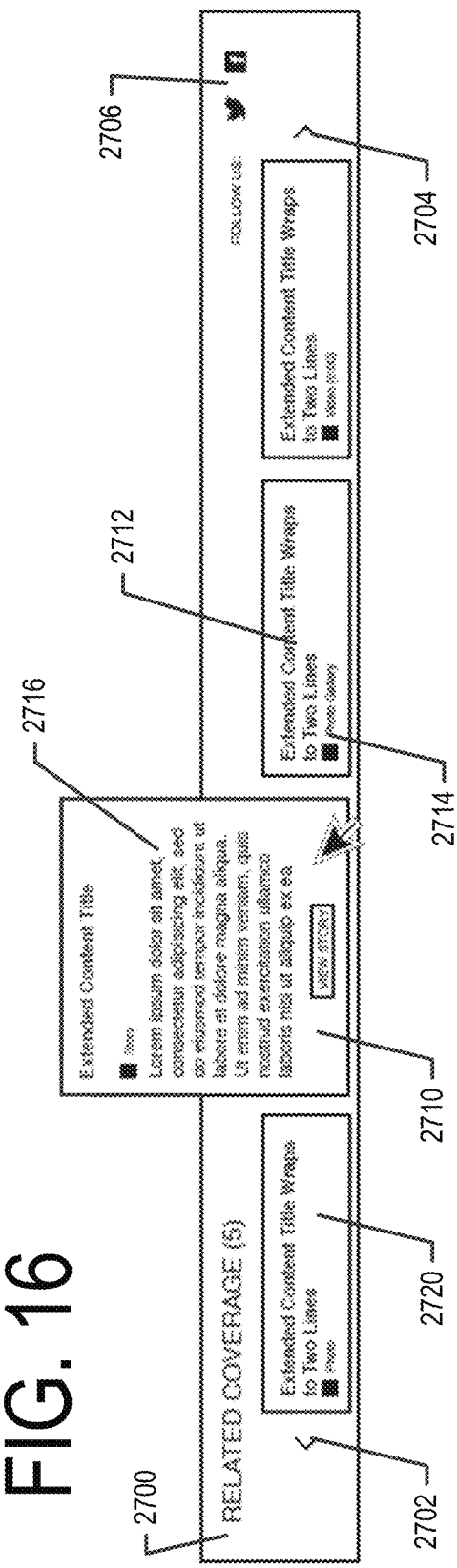
Figure 17:
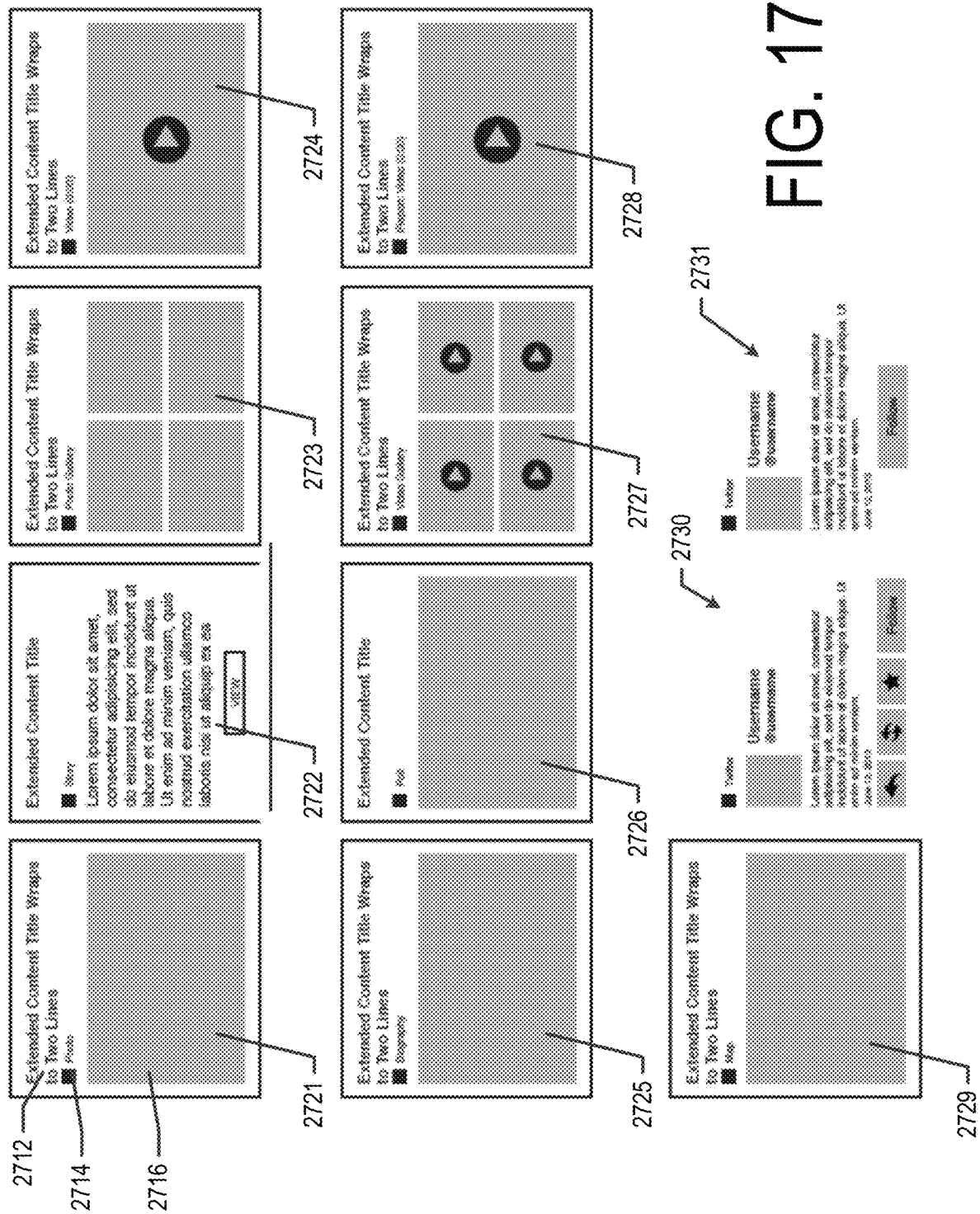
Figure 19:
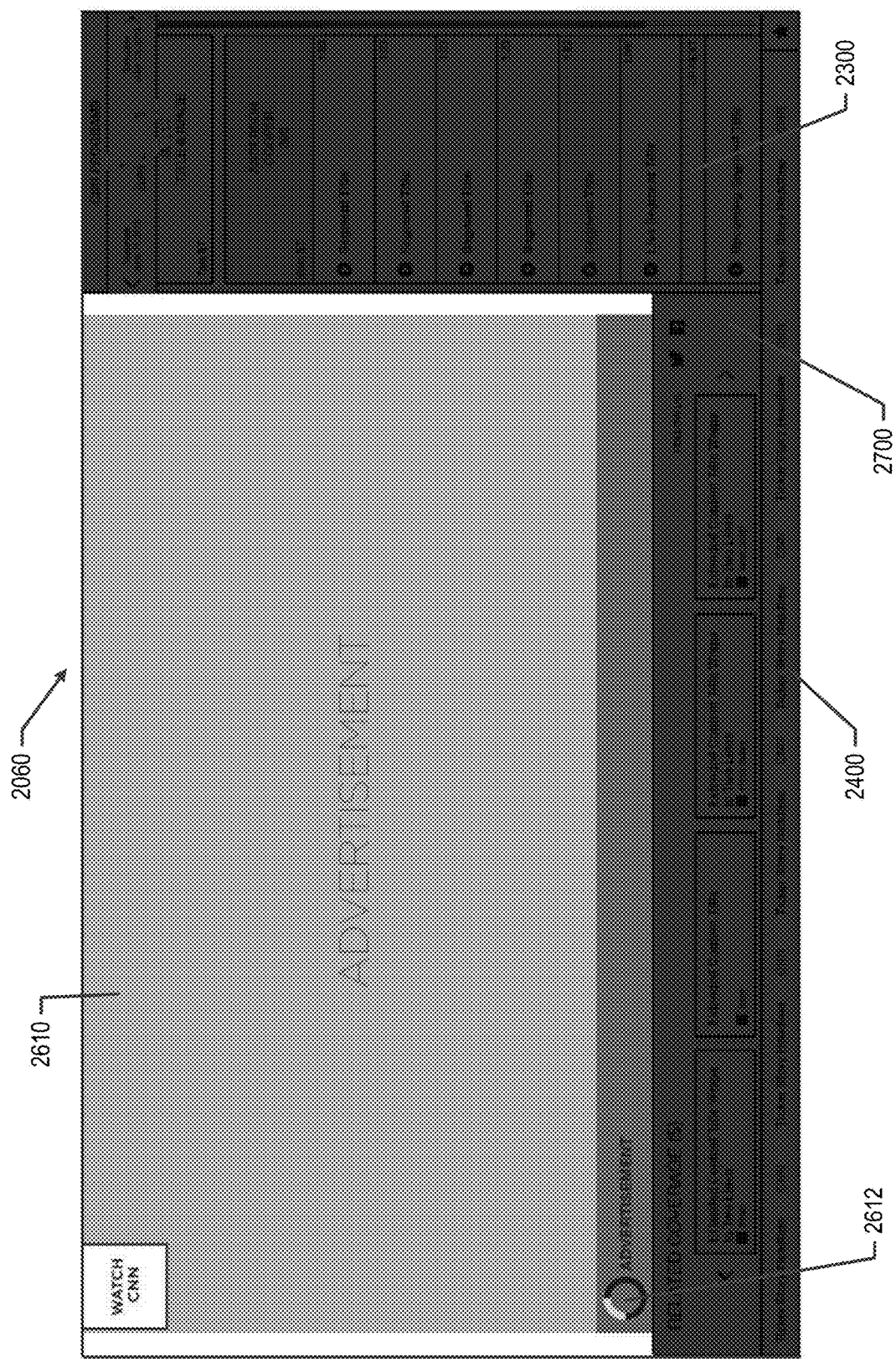
Figure 21:
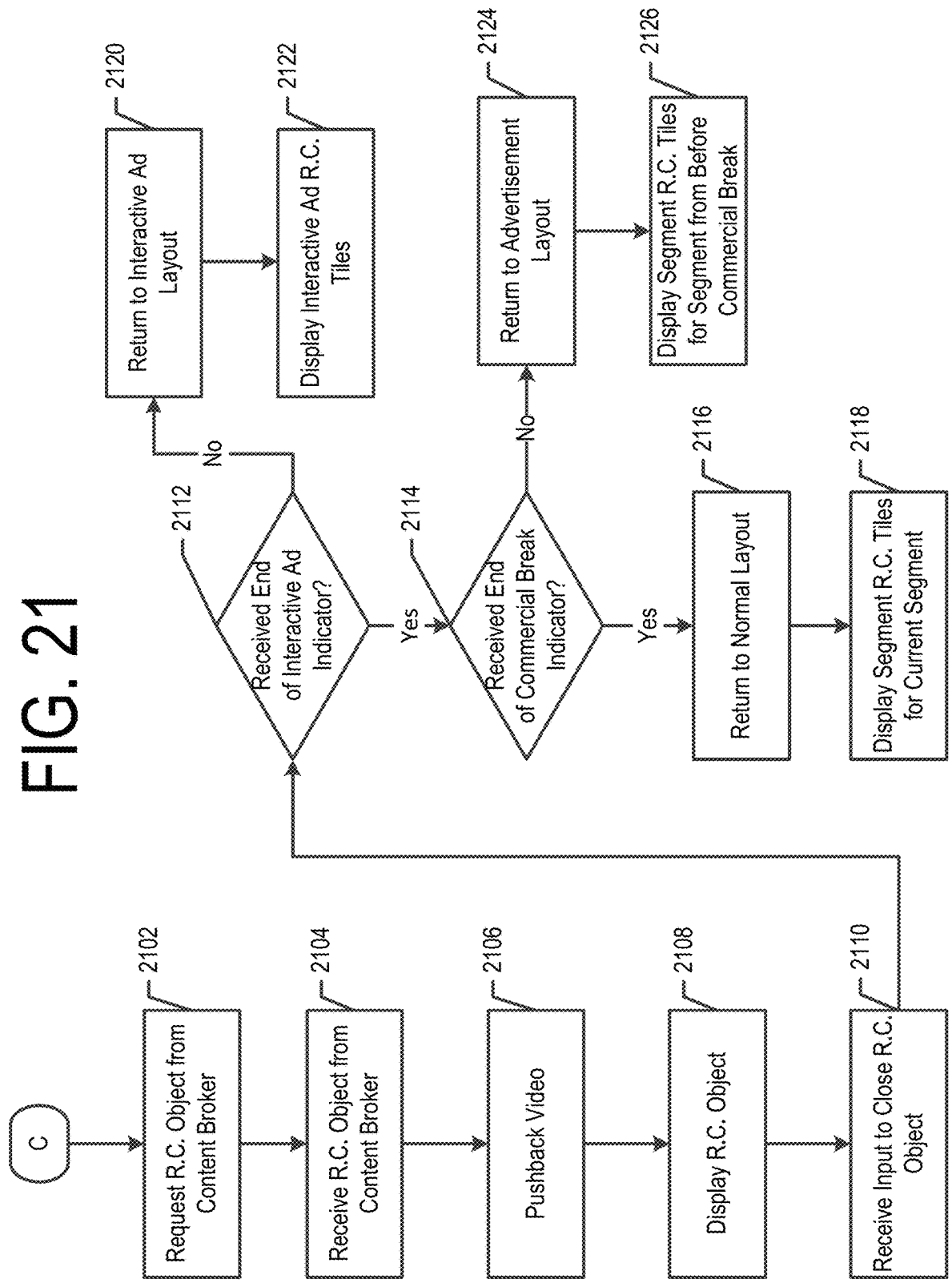
Figure 22:
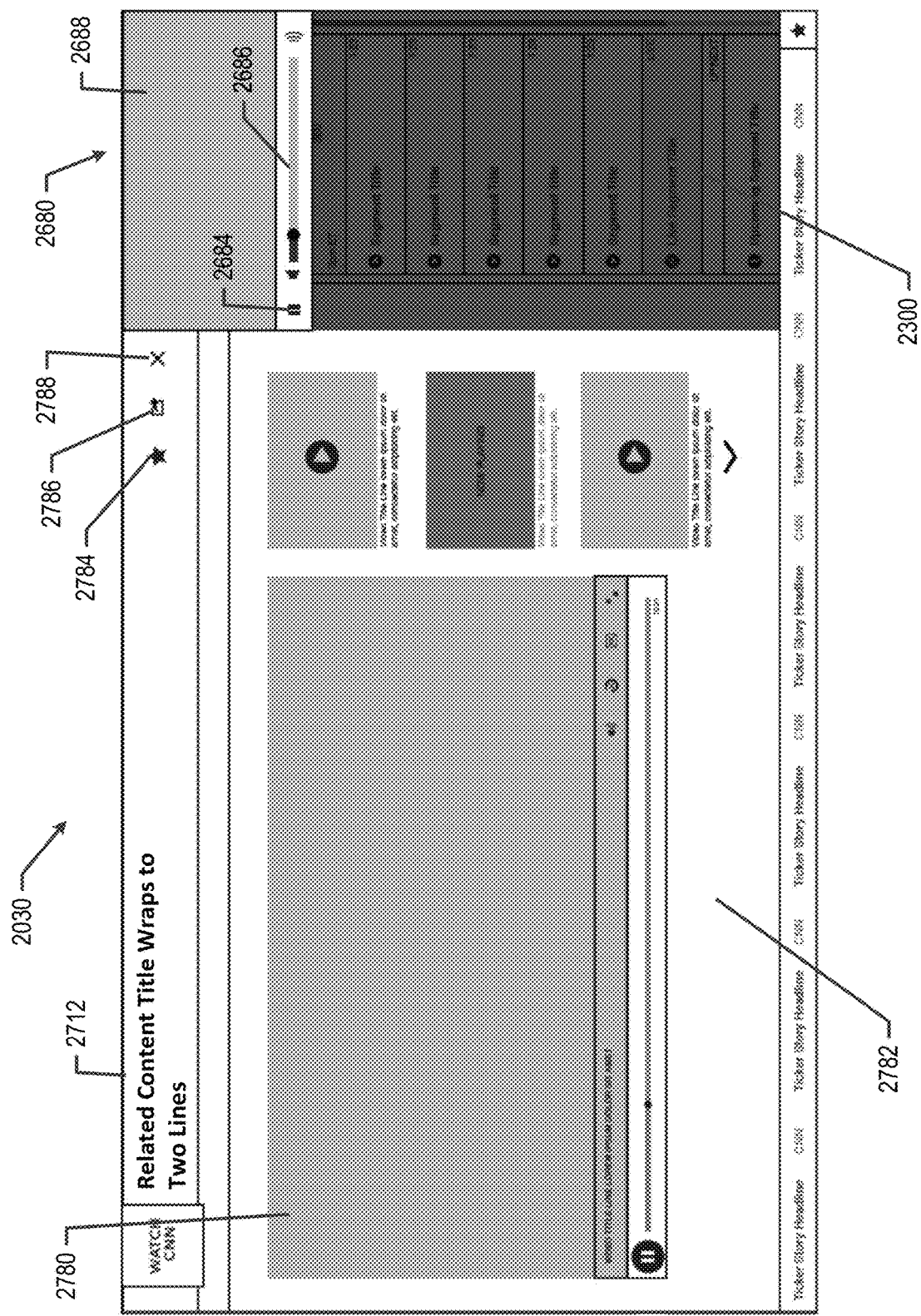

Having thus described the invention in general terms, reference will now be made to the accompanying drawings, which are not necessarily drawn to scale, and wherein:

FIG. 1 illustrates one embodiment of a system for producing and providing a user with an interactive advertisement in association with a media presentation, in accordance with one embodiment the present invention;

FIG. 2 is a schematic diagram of a provider system, in accordance with one embodiment of the present invention;

FIG. 3 is a system flow diagram illustrating the workflow in an example media presentation and interactive advertisement system, in accordance with one embodiment of the present invention;

FIGS. 4-12 each provide a flowchart illustrating process and operations related to providing an interactive advertisement in association with a media presentation, in accordance with an embodiment of the present invention;

FIG. 13 is a schematic diagram showing the layout of an interactive user interface for experiencing an interactive advertisement and the associated media presentation, in accordance with an embodiment of the present invention;

FIGS. 14A and 14B illustrate example layouts of an interactive user interface for experiencing an interactive advertisement and the associated media presentation, in accordance with various embodiments of the present invention;

FIGS. 15, 18A, 18B, and 20 each provide a flowchart illustrating processes and operations related to providing a user with an interactive advertisement in association with a media presentation, in accordance with an embodiment of the present invention;

FIG. 16 is a partial view of an example interactive user interface for experiencing an interactive advertisement, in accordance with an embodiment of the present invention;

FIG. 17 illustrates a variety of example enhanced content tiles, in accordance with an embodiment of the present invention; and FIGS. 19, 21, and 22 show various views of an example interactive user interface for experiencing an interactive advertisement, in accordance with an embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like. In some embodiments, the non-volatile storage medium may be accessed remotely (e.g., via "the cloud").

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data/information rate synchronous dynamic random access memory (DDR SDRAM), double data/information rate type two synchronous dynamic random access memory (DDR2 SDRAM), double data/information rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide methods, apparatus, systems, computer program products, computing devices, computing entities, and/or the like for providing users with an interactive advertisement in association with a media presentation. In various embodiments, an interactive advertisement may comprise a commercial (e.g., video and/or audio content that is associated with a brand, product, and/or the like) that is presented simultaneously with user selectable options for viewing additional/related data/information or content associated with the content of the commercial and/or options for a user to interact with information, content, applications, retailers, and/or the like related to the content of the commercial. In various embodiments, the media presentation may be an enhanced media presentation, some examples of which are described in U.S. application Ser. No. 14/522,739. The disclosure provided herein relates to a wide variety of interactive advertisements; however, the concepts disclosed herein will be exemplified via discussion of providing an interactive advertisement in association with a media presentation (e.g., an enhanced media presentation that is a television show, such as an enhanced news show or sporting event). However, as will be recognized, such concepts can be applied to a variety of formats and environments.

In various embodiments, an interactive advertisement may be provided to a user in association with a live or on demand media presentation. In various embodiments, the live or on demand media presentation may be divided into segments, wherein each segment represents a period of time in the media event (e.g., show or event). When a user is viewing the media presentation via the provided user interface, a rundown may be displayed via the user interface. The rundown may be populated by segment tiles representing the segments of the media presentation being watched. Segment tiles for other enhanced news shows may also be displayed in a rundown viewer. In various embodiments, the rundown may include an interactive advertisement rundown tile. For example, after and/or during the airing of an interactive advertisement, an interactive advertisement rundown tile may be inserted into the rundown. Thus, the rundown may be configured to provide the user with a visual and/or interactive mechanism of selecting segments for viewing. One or more related content (R.C.) objects may be associated with each segment and/or interactive advertisement. Related content objects may also be referred to as extended or enhanced content objects. An R.C. object may be any type of media, including audio, videos, text, images, graphics, articles, photos, photo galleries, video galleries, infographics, maps, polls, guest biographies, uniform resource identifiers (URIs), tweets or other social media post, blog posts, and/or the like. Each R.C. object associated with an interactive advertisement may be configured to enhance a user's experience of the commercial/advertising content by providing additional data/information related to the interactive advertisement and/or allowing the user to interact with content related to the interactive advertisement. Thus, the R.C. objects associated with the interactive advertisement may facilitate user interaction with the advertisement content and/or the like. In various embodiments, R.C. objects associated with a segment or interactive advertisement provide editorial content. In some embodiments, an R.C. object associated with a segment may provide an advertisement or a promotional message. In various embodiments, a ticker may also be provided that may be configured to provide the user with an interactive streaming of, for example, current news headlines, relevant statistics, and/or the like.

Various system architectures that may be used in accordance with the present invention will now be described herein.

III. Exemplary System Architecture

FIG. 1 illustrates one embodiment of a system that may implement the present invention. In this particular embodiment, the illustrated system may include one or more content distribution/delivery networks (CDNs) 10, one or more R.C. systems 20, one or more user computing entities 30, one or more digital commercial systems 40, one or more linear commercial systems 60, and one or more provider networks/systems 200, and/or the like. The one or more CDNs 10, the one or more R.C. systems 20, the one or more user computing entities 30, and the one or more provider networks/systems 200 may communicate with each other and/or a variety of other computing entities via one or more wired or wireless networks 50. Although described separately, it will be recognized that two or more of the above entities can be combined or included in a single platform.

Content Distribution/Delivery Networks 10

In various embodiments, the one or more CDNs 10 may comprise networks configured for distributing media content. Generally, the term "content" may refer to any type of media—audio, videos, datacasts, music, text, images, URIs, surveys, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a variety of delivery/distribution networks, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Over-the-Air Content Delivery/Distribution Network

An over-the-air (OTA) CDN 10 can be used in conjunction with embodiments of the present invention. The OTA CDN 10 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City- Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 10 depending on the geographic area (e.g., DMA, zip code, block group, census tract, cartographic level, government-established area/zone, geographic area, and/or the like) the broadcast area includes.

An OTA CDN 10 may include various components to transmit/broadcast content and/or data/information via an OTA broadcast (e.g., an OTA broadcast signal) to be received by one or more distribution devices 105. In one embodiment, the OTA CDN 10 may include one or more channel coding elements, one or more modulation elements, and one or more transmitters. Although not shown, the OTA CDN 10 may also include various other components, such as audio subsystems, video subsystems, multiplexers, exciters, drivers, amplifiers, network interfaces, processing elements, and/or the like. Via these elements, for instance, the OTA CDN 10 can transmit/broadcast OTA broadcasts (comprising content and/or data) within a broadcast area. The OTA CDN 10 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting—Terrestrial (DVB-T), Digital Video Broadcasting—Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

Cable Content Delivery/Distribution Network

Although not shown, a cable CDN 10 (also referred to as a CDN 10) may be used with embodiments of the present invention. A cable CDN 10 may include various components to transmit/broadcast content and/or data/information via the cable provider's CDN 10 to the cable provider's subscribers. For example, in various embodiments, the cable CDN 10 may include a network operations center, a cable modem termination system, and a headend to transmit cable broadcasts (e.g., digital cable signals) through the cable provider's CDN 10 to user computing entities 30. Thus, user computing entities 30 may communicate with a headend over a distribution network.

To perform such functions, the cable CDN 10 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 10 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 10 and/or further including various versions of data/information over cable service interface specification (DOCSIS).

Satellite Content Delivery/Distribution Network

Although not shown, a satellite CDN 10 (also referred to as a CDN 10) may be used with embodiments of the present invention. A satellite CDN 10 may include various components to transmit/broadcast content and/or data/information (e.g., transmit broadcast signals in a one-to-many or broadcast configuration) via the satellite provider's CDN 10 to user computing entities 30 (e.g., subscribers). For example, in various embodiments, the satellite CDN 10 may include uplink facilities (with transmitting antennae), satellites (with transponders), receiving satellite dishes, and/or user computing entities 30. Thus, the satellite CDN 10 can transmit/broadcast satellite broadcasts (comprising content and/or data) to user computing entities 30 using a variety of standards and protocols, such as those described with regard to the OTA CDN 10 and/or further including direct broadcast satellite (DBS), television receive only (TVRO), and/or the like.

IP-Based Delivery/Distribution Network

Although not shown, an IP-based CDN 10 (also referred to as a CDN 10) may be used with embodiments of the present invention. An IP-based CDN 10 may include various components to transmit/broadcast content and/or data/information (e.g., transmit broadcast signals in a one-to-many or broadcast configuration) via the provider's CDN 10 to user computing entities 30 (e.g., subscribers). Thus, the IP-based CDN 10 can transmit/broadcast broadcasts (comprising content and/or data) to user computing entities 30 using a variety of standards and protocols, such as those described previously.

Provider System 200

Herein the term "provider" is used to indicate any entity, individual, organization, company, group or the like that provides or assists in providing one or more users with at least one interactive advertisement in association with a media presentation. The term "production staff" is used to indicate any individual involved with the production of at least one interactive advertisement and/or the associated media presentation. The term "user" is used herein to indicate any individual, family, entity, organization, company, group, and/or the like that accesses, receives, views, and/or experiences at least one interactive advertisement and/or at least a portion of an associated media presentation provided by the provider. In some embodiments, the user may access, receive, view, and/or experience at least one media presentation from the provider via a paid or unpaid subscription service for example.

In various embodiments, a provider system 200 may be configured to provide production staff (e.g., operating an appropriate computing entity) with an interactive user interface configured for producing at least one media presentation. The provider system 200 may be further configured to provide at least one media presentation to at least one user. The media presentation may be in the form of a live stream of the media presentation or an on demand stream of the media presentation (e.g., Video on Demand (VOD) or the like). The provider system 200 may be further configured to provide at least one interactive advertisement in association with the at least one media presentation.

In various embodiments, the provider system 200 is a system operated by, on behalf of, or in association with a media presentation provider to provide at least one media presentation (e.g., an enhanced media presentation) and any associated interactive advertisements to one or more users. In general, the terms computing entity, network, network entity, entity, device, system, and/or similar words used herein interchangeably may refer to, for example, one or more computers, computing entities, desktops, mobile phones, tablets, phablets, notebooks, laptops, distributed systems, watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining/identifying, creating/generating, monitoring, evaluating, comparing, and/or similar terms used herein interchangeably. In one embodiment, these functions, operations, and/or processes can be performed on data/information, content, information, and/or similar terms used herein interchangeably.

FIG. 2 provides a schematic diagram of an example provider system 200. The provider system 200 comprises a processor 210, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiments illustrated in FIG. 4, when configured accordingly. The processor 210 is used to execute software instructions for carrying out the defined steps of the method of the various embodiments of the present invention. The processor 210 communicates using a data/information bus 201 that is used to convey data/information and program instructions, typically, between the processor and memory 216.

The provider system 200 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data/information, applications, programs, program modules, scripts, source code, object code, byte code, compiled code, interpreted code, machine code, executable instructions, and/or the like. Such code may include the production module 230, interfacing module 250, video module 260, content broker module 270, and/or client module 35 (shown in FIG. 3). The terms database, database instance, database management system, and/or similar terms used herein interchangeably may refer to a structured collection of records or data/information that is stored in a computer-readable storage medium, such as via a relational database, hierarchical database, and/or network database.

In at least one embodiment, the provider system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the provider system 200 with the assistance of the processor 210 and operating system 220, production module 230, interfacing module 250, video module 260, content broker module 270, and/or client module 35.

As indicated, a number of program modules may be stored by the non-volatile and/or volatile memory. Such program modules may include the production module 230, interfacing module 250, video module 260, content broker module 270, and/or client module 35. Those skilled in the art will appreciate that other modules may be present in RAM 217 to effectuate the various embodiments of the present invention. Furthermore, rather than described modules, other modules may be used or embodiments may not be modular.

In various embodiments, memory 216 can be considered primary memory such as RAM memory or other forms which retain the contents only during operation, or it may be a non-volatile memory, such as ROM, EPROM, EEPROM, FLASH, or other types of memory that retain the memory contents. The memory 216 could also be secondary memory, such as disk storage, that stores a relatively large amount of data/information. The memory may also comprise any application program interface, system, libraries and any other data/information by the processor to carry out its functions. ROM 215 is used to store a basic input/output system 226 (BIOS), containing the basic routines that help to transfer data/information between components of the provider system 200, including the production module 230, interfacing module 250, video module 260, content broker 270, and/or the operating system 220. In some embodiments, the disk storage may communicate with the processor 210 using an I/O bus instead of a dedicated bus. The secondary memory may be a floppy disk, hard disk, compact disk, DVD, or any other type of mass storage type known to those skilled in the computer arts.

In addition, the provider system 200 includes at least one storage device 213, such as a hard disk drive, a floppy disk drive, a CD-ROM drive, or optical disk drive, for storing data/information on various computer-readable media, such as a hard disk, a removable magnetic disk, or a CD-ROM disk. As will be appreciated by one of ordinary skill in the art, each of these storage devices 213 is connected to the system bus 201 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and/or the like.

As indicated, in one embodiment, the provider system 200 may also include one or more communications interfaces 208 for communicating with various computing entities, such as by communicating data/information, content, information, and/or similar terms used herein interchangeably that can be transmitted, received, operated on, processed, displayed, stored, and/or the like. For instance, the provider system 200 may be in communication with one or more R.C. host systems 20, one or more digital commercial systems 40, and/or one or more user computing entities 30 via various wired or wireless network 50. Such communication may be executed using a wired data/information transmission protocol, such as fiber distributed data/information interface (FDDI), digital subscriber line (DSL), Ethernet, asynchronous transfer mode (ATM), frame relay, DOCSIS, Programming Metadata Communication Protocol (PMCP), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, any other wireless protocol, and/or any other appropriate communications protocol. In various embodiments, the provider system 200 may be configured to communicate with various computing entities to provide at least one media presentation (e.g., an enhanced media presentation) to a user computing entity 30.

Various data/information is input by a user or production staff member (e.g., operating an appropriate computing entity) to the provider system 200 via the network interface 208 and/or input/output device 204. This input data/information may include data/information related to a media presentation, enhanced content associated with a media presentation, metadata or other data/information associated with a media presentation, data/information associated with one or more users, or other information. This input data/information may vary, however, depending on the configuration and informational requirements of the provider system 200.

As mentioned above, the provider system 200 also includes an input/output device 204 for receiving and displaying data/information. The provider system 200 may include or be in communication with one or more input elements, such as a keyboard input, a mouse input, a touch screen/display input, audio input, pointing device input, joystick input, keypad input, and/or the like, as indicated by input/output device 204. The provider system 200 may also include or be in communication with one or more output elements, as indicated by input/output device 204, such as audio output, video output, screen/display output, motion output, movement output, and/or the like.

The provider system 200 may be configured to facilitate production and provide users with an interactive advertisement in association with a media presentation (e.g., an enhanced media presentation). The provider system 200 may further be configured to receive one or more R.C. objects from one or more R.C. host systems 20, and provide a media presentation to one or more user computing entities 30 such that the media presentation and any associated interactive advertisements may be displayed via a user interface that may be provided by client module 35. In various embodiments, the provider system 200 may be configured to request and/or receive a commercial list for an upcoming commercial break/segment from a digital commercial system 40 and/or to monitor a linear video broadcast for tags (or other indicia) identifying upcoming commercials, and/or the like. The provider system 200 may be further configured to provide production staff (e.g., operating an appropriate computing entity) with an interactive production interface for use in producing the media presentation. The provider system 200 may be further configured to complete processes related to producing the media presentation and providing any associated interactive advertisements.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the provider system 200 may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances.

R.C. Host System 20

In various embodiments, the R.C. host system 20 may be configured for storing, hosting and/or providing one or more R.C. objects and/or data/information related to one or more R.C. objects that can each be associated with one or more media presentations and/or interactive advertisements. In various embodiments, an R.C. host system 20 is any system hosting one or more R.C. objects and/or data/information associated with one or more R.C. objects that each can be associated with one or more media presentations and/or interactive advertisements. In one embodiment, the R.C. host system 20 may include one or more components that are functionally similar to those of the provider system 200 or the CDNs 10. For example, in one embodiment, the R.C. host system 20 may include one or more processing elements, one or more display device/input devices, volatile and non-volatile storage or memory, and/or one or more communications interfaces. The R.C. host system 20 may also comprise various other systems. In particular, the R.C. host system 20 may include components configured to store and/or host one or more R.C. objects and/or associated data/information, provide one or more R.C. objects and/or associated data/information to the provider system 200, and/or the like. The R.C. host system 20 may be in communication with the provider system 200, and/or other computing devices, via one or more wireless or wired networks 50. In various embodiments, the R.C. host system 20 of an R.C. objects associated with an interactive advertisement may be operated by and/or on behalf of an entity responsible for at least some of the content of the interactive advertisement (e.g., the advertiser, an advertising agency, and/or the like).

User Computing Entity 30

In various embodiments, the user computing entity 30 may be configured to receive at least one interactive advertisement in association with a media presentation (and associated interactive advertisement data/information and/or data/information associated with the media presentation) and provide the user with the media presentation. The user computing entity 30 is any system used by a user to receive, view, and/or experience at least one interactive advertisement in association with a media presentation. For example, as described above, a user computing entity 30 may be one or more computers, mobile phones, gaming consoles (e.g., Xbox, Play Station, Wii), desktops, tablets, notebooks, phablets, set-top devices in communication with a television or other display device (e.g., projector or the like), smart televisions, laptops, wearable computer, and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet.

In one embodiment, the user computing entity 30 may include one or more components that are functionally similar to those of the provider system 200. In one embodiment, the user computing entity 30 may include one or more processing elements, one or more display device/input devices, volatile and non-volatile storage or memory, and/or one or more communications interfaces. The user computing entity 30 may also comprise various other systems. In particular, the user computing entity 30 may include components configured to receive an interactive advertisement in association with a media presentation and/or related data/information with audio, visual, and/or other output for experiencing the interactive advertisement in association with the media presentation, and/or the like. The user computing entity 30 may also be in communication with a variety of computing entities.

In various embodiments, the user computing entity 30 may include or otherwise be in communication with a variety of input devices that may be configured to receive input from a user such that a user may control his/her experience of the interactive advertisement in association with the media presentation. For example, in some embodiments, the user computing entity 30 may include or be in communication with a pointing device such as a computer mouse, infrared pointing device, motion detecting device, and/or the like. In other embodiments, the user computing entity 30 may include or be in communication with a joy stick, remote control, handheld controller, and/or the like. Thus, the user computing entity 30 may be configured to receive user input through a variety of input approaches and techniques.

Digital Commercial System 40

In various embodiments, the digital commercial system 40 may be configured for determining/identifying the commercials to be played/provided/provided during one or more upcoming commercial break/segments and inserting the commercials into the video stream (or providing them for insertion) received by the user computing entity 30. For example, the digital commercial system 40 may be configured to provide one or more commercials via digital commercial insertion methods. In various embodiments, the digital commercial system 40 is configured to provide a list or schedule of commercials to be played/provided/provided during an upcoming commercial break/segment to the provider system 200. In one embodiment, the digital commercial system 40 may include one or more components that are functionally similar to those of the provider system 200 or the CDNs 10. For example, in one embodiment, the digital commercial system 40 may include one or more processing elements, one or more display device/input devices, volatile and non-volatile storage or memory, and/or one or more communications interfaces. The digital commercial system 40 may also comprise various other systems. In particular, the digital commercial system 40 may include components configured to store commercial/advertising content, data/information (e.g., metadata) associated with commercial/advertising content, provide commercial/advertising content and/or associated data/information to the provider system 200, and/or the like. The digital commercial system 40 may be in communication with the provider system 200, and/or other computing devices, via one or more wireless or wired networks 50. In various embodiments, the digital commercial system 40 is a module of the production system 200.

Linear Commercial System 60

In various embodiments, the linear commercial system 60 may be configured for determining/identifying the commercials to be played/provided/provided during one or more upcoming commercial break/segments and inserting the commercials (or providing them for insertion) into the linear broadcast received by the user computing entity 30. For example, in various embodiments, the linear commercial system 60 may be configured to provide one or more commercials via linear and/or dynamic commercial insertion methods. In various embodiments, the linear commercial system 60 is configured to embed one or more tags (or other indicia) into a video stream to be provided via a linear broadcast, and/or provide commercial identifying data/information in association with commercial/advertising content. In one embodiment, the linear commercial system 60 may include one or more components that are functionally similar to those of the provider system 200 or the CDNs 10. For example, in one embodiment, the linear commercial system 60 may include one or more processing elements, one or more display device/input devices, volatile and non-volatile storage or memory, and/or one or more communications interfaces. The linear commercial system 60 may also comprise various other systems. In particular, the linear commercial system 60 may include components configured to store commercial/advertising content, data/information (e.g., metadata) associated with commercial/advertising content, provide commercial/advertising content and/or associated data/information via a linear broadcast, and/or the like. The linear commercial system 60 may be in communication with the provider system 200, and/or other computing devices, via one or more wireless or wired networks 50 and/or CDN 10. In various embodiments, the linear commercial system is a module of the production system 200.

IV. Exemplary System Operation

Figure 20:
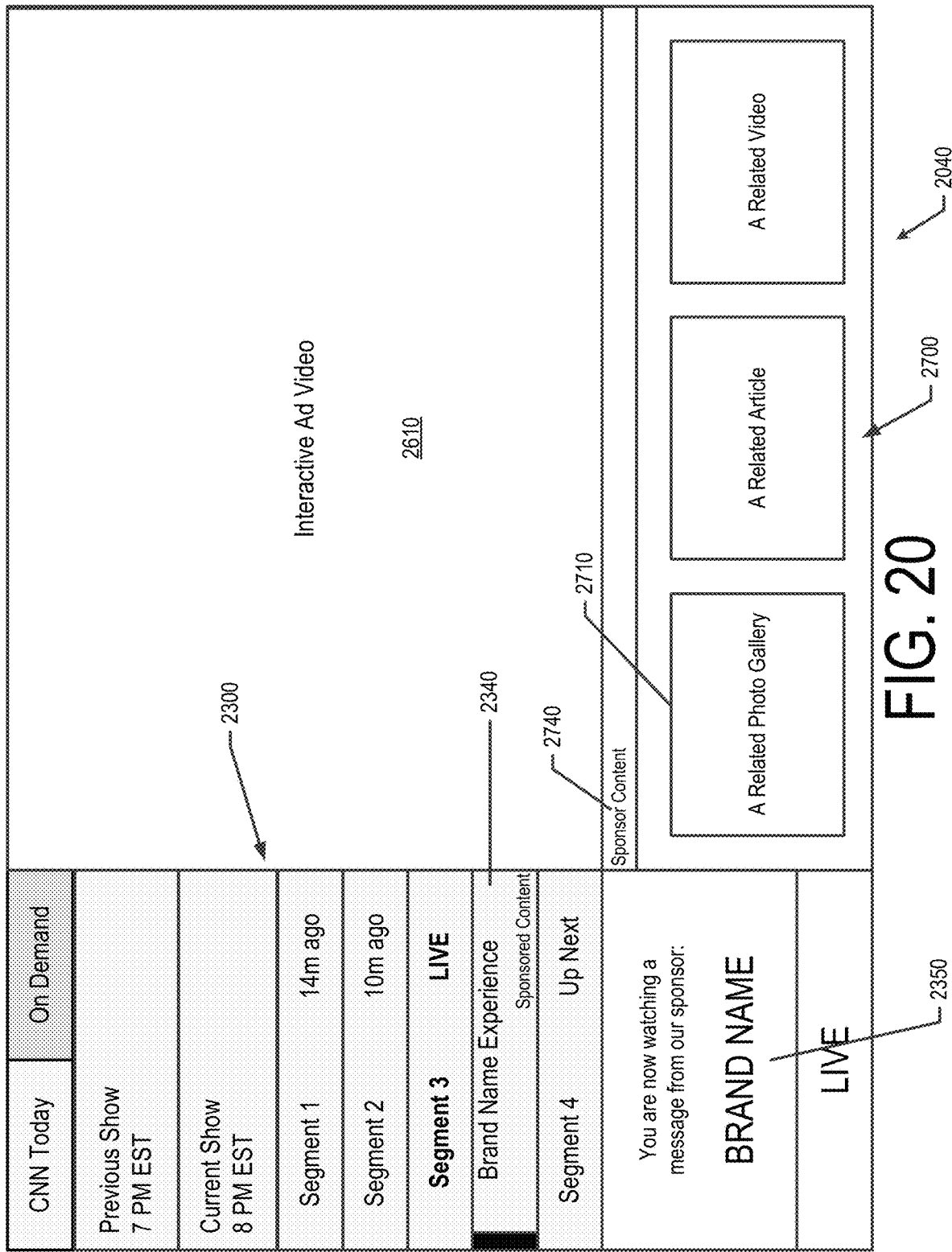

Reference will now be made to FIGS. 3-13, 14A, 14B, 15-17, 18A, 18B, and 19-22. FIG. 3 is a system flow diagram illustrating the workflow in an example media presentation system configured to provide at least one interactive advertisement to at least one user, in accordance with one embodiment of the present invention. FIGS. 4-12 each provide a flowchart illustrating processes and operations related to providing an interactive advertisement in association with a media presentation (e.g., an enhanced media presentation), in accordance with an embodiment of the present invention. FIG. 13 is a schematic diagram showing the layout of an interactive user interface for experiencing a media presentation (e.g., an enhanced media presentation) and any associated interactive advertisements, in accordance with an embodiment of the present invention. FIGS. 14A and 14B illustrate various layouts of an interactive user interface for experiencing a media presentation, in accordance with an embodiment of the present invention. FIGS. 15, 18A, 18B and 21 each provide a flowchart illustrating processes and operations related to providing a user with an interactive advertisement in association with a media presentation, in accordance with an embodiment of the present invention. FIG. 16 is a partial view of an example interactive user interface for experiencing an interactive advertisement in association with a media presentation, in accordance with an embodiment of the present invention. FIG. 17 illustrates a variety of example R.C. tiles, buttons, fields, icons, images, indicators, controls, functions, and/or similar words used herein interchangeably, in accordance with an embodiment of the present invention. And FIGS. 19, 20, and 22 show various views of an example interactive user interface for experiencing an interactive advertisement in association with a media presentation, in accordance with an embodiment of the present invention.

In various embodiments, the production module 230 may be configured to provide production staff (e.g., operating an appropriate computing entity) with an interactive interface for producing a media presentation (e.g., an enhanced media presentation) with which one or more interactive advertisements may be associated. In various embodiments, an interactive advertisement may comprises a commercial (e.g., video and/or audio content that is associated with a brand, product, and/or the like) that is presented simultaneously with user selectable options for viewing additional/related data/information or content associated with the content of the commercial and/or options for a user to interact with information, content, applications, retailers, and/or the like related to the content of the commercial. The terms advertisement, commercial, and similar other words are used herein interchangeably. For example, an interactive advertisement featuring a commercial for a digital camera may be presented simultaneously with access to an article that includes a review of the camera, an image gallery of images taken with or of the camera, a video showing how to use the camera, an application to aid the user in finding local camera shops that sell that brand of camera, a video game in which the user captures action shots with the camera to gain points, and/or the like. In various embodiments, an interactive advertisement is provided in association with a media presentation. For example, one commercial during a commercial break/segment of an enhanced media presentation may be an interactive advertisement.

As noted, in various embodiments, the production module 230 may be configured to provide production staff (e.g., operating an appropriate computing entity) with an interactive interface for producing a media presentation and providing an interactive advertisement. Further, although the following is described in the context of production staff and/or users manually performing certain tasks by operating computing entities, such tasks may be performed in a semi-automatic or fully-automatic manner. Thus, in instances where the following describes production staff or users performing tasks, it will be recognized that appropriate computing entities can perform the same in a semi-automatic or fully-automatic manner. In the illustrated embodiment, the production module 230 may comprises a show editor 232, a rundown manager 234, an R.C. manager 236, and an interactive advertisement manager 238. The show editor 232 may be configured to manage the metadata related to a show (e.g., show title, show description, show logo, etc.). The rundown manager 234 may provide the production staff (e.g., operating an appropriate computing entity) with a tool for pre-populating a rundown with show segments, managing metadata associated with each segment, and/or the like. The R.C. manager 236 may be configured to associate one or more R.C. objects and/or data/information associated with one or more R.C. objects each with one or more segments. Additionally, the interactive advertisement manager 238 may be configured to manage the metadata associated with an interactive advertisement (e.g., unique commercial identifiers, interactive advertisement identifiers, associated R.C. objects, associated sponsorship package data/information, and/or the like). The interactive advertisement manager 238 may be further configured to request and/or receive a list or schedule of commercials to be digitally inserted in or as an upcoming commercial break/segment, monitor a linear broadcast for tags (or other indicia) identifying an upcoming commercial, determining/identifying whether a commercial should be provided as an interactive advertisement, and/or the like.

The show and/or sets of segment data/information and/or interactive advertisement data/information managed via the production module 230 may be passed to the interfacing module 250 configured to provide an interface between the provider system 200 and the user computing entity 30. Particularly, the interfacing module 250 can provide an application programming interface (API) between the production module 230 and the client module 35. In various embodiments, the interfacing module 250 may also service as an API between a ticker module configured for providing ticker data/information and the client module 35. For example, the ticker module may be configured to receive, aggregate, and/or manage ticker data/information (e.g., a set of current headlines and/or the like).

The video module 260 may be configured to receive live or pre-filmed video data/information (e.g., video, slide show, sound track, collection of image data/information, one or more commercials, and/or the like). In various embodiments, the video module 260 may be configured to receive video data/information that has already been edited. The video module 260 may comprise an encoder 262 and a packager 264. The encoder 262 may be configured to encode the video data/information in accordance with one of various formats, such as those described above. The packager 264 may be configured to provide or embed tags (or other indicia) comprising metadata to each video segment (e.g., the video data/information associated with a particular segment or commercial) and otherwise package each video segment in preparation for providing the video segment to the CDN 10. The CDN 10 may be configured to provide the video segments to the user computing entity 30 (e.g., client module 35).

In various embodiments, a user may provide input indicating the user would like to view an R.C. object that is part of an interactive advertisement (or an associated enhanced media presentation). For example, the user may select an R.C. tile that is part of an interactive advertisement via the interactive user interface, as will be discussed in greater detail below. The client module 35 may pass the request for the R.C. object to the content broker module 270. The content broker module 270 may then request the R.C. object from the R.C. host system 20. In various embodiments, upon receiving the R.C. object, the content broker module 270 may normalize the R.C. object, as discussed in greater detail below, and pass the normalized R.C. object to the client module 35 of the user computing entity 30. The client module 35 may then provide, present, display, and/or similar words used herein interchangeably the R.C. object to the user (e.g., via an appropriate computing entity).

In various embodiments, digital or linear commercials may be inserted (or provided for insertion) or otherwise provided into a video stream. In various embodiments, the digital commercial system 40 is configured to perform digital commercial insertion, as is commonly known and understood in the art. The digital commercial system 40 may be further configured to provide a list or schedule of commercials to be provided as an upcoming commercial break/segment, perhaps in response to a request from the interactive advertisement manager 238. In various embodiments, the linear commercial system 60 may be configured to insert and/or provide commercials to a linear broadcast as is commonly known and understood in the art. The linear commercial system 60 may be further configured to provide data/information regarding the one or more commercials of a commercial break/segment via one or more tags (or other indicia) encoded into the linear broadcast feed.

Figure 4:
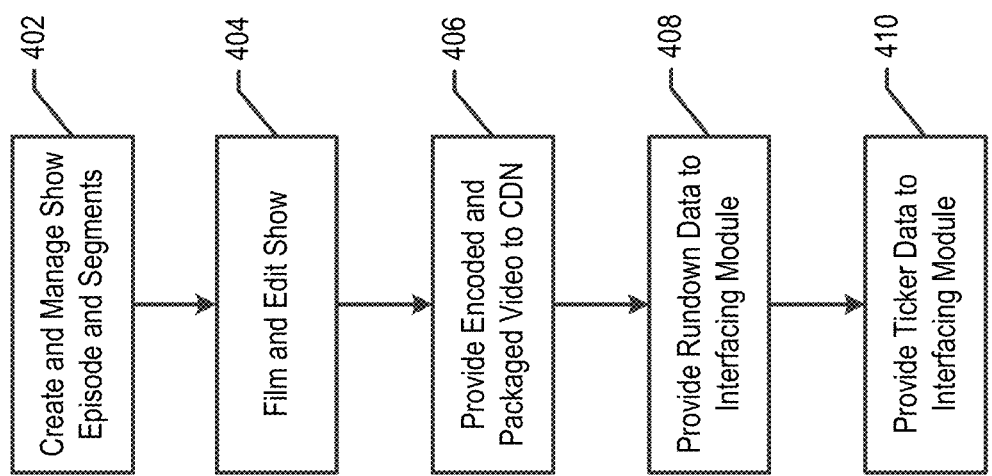

FIG. 4 provides a high level flowchart of operations performed to produce and provide a user with a media presentation (e.g., an enhanced media presentation), during which, or otherwise associated therewith, an interactive advertisement may be provided. Particularly, FIG. 4 illustrates operations performed to produce an episode of an enhanced news show. At step 402, one or more members of the production staff (e.g., operating an appropriate computing entity) may use the production module 230 to create and manage a show episode and the segments that make up the show episode. For example, one or more R.C. objects may be associated with a segment (and/or an interactive ad). At step 404, the show episode may be filmed and edited or such may be performed via a live or delayed live feed of a show. The video data/information may then be provided to the video module 260 to be encoded, packaged, and/or processed using a variety of other processing steps. At step 406, the video data/information is provided to the CDN 10 for broadcasting, streaming, and/or the like such that a user computing entity 30 may be provided with the video data/information associated with the show episode. At step 408, the rundown data/information is provided to the interfacing module 250 such that client module 35 may populate the rundown viewer/portion and R.C. viewer/portion of the user interface 2000 (shown in FIG. 13), wherein the rundown data/information is a set of data/information comprising at least the data/information needed to populate the rundown for a particular show episode. At step 410, the ticker data/information is provided to the interfacing module 250 such that the client module 35 may populate the ticker viewer/portion of the user interface 2000 (e.g., of the user computing entity 30).

As should be appreciated, various embodiments may combine the functionality of the modules 230, 250, 260, 270 and/or 35 or may substitute the one or more modules for other methods to incorporate the functionality described herein with respect to the modules 230, 250, 260, 270 and/or 35. Various functions that may be performed by modules 230, 250, 260, 270, and 35 to provide an interactive advertisement in association with a media presentation will now be discussed in more detail with respect to FIGS. 5-17, 18A, and 18B-38.

Production Module 230

In various embodiments, the production module 230 may operate on the provider system 200. The production module 230 may be configured to provide production staff (e.g., operating an appropriate computing entity) with an interactive production interface for managing rundown data/information. As noted, such concepts may also be implemented in an automatic or semi-automatic nature. In various embodiments, rundown data/information may comprise metadata associated with a show or show episode, one or more sets of segment data/information each associated with one of the one or more segments of a show episode, data/information associated with one or more R.C. objects each associated with a segment of a show episode, interactive advertisement data/information and/or the like. The production module 230 may comprise the show editor 232, rundown manager 234, R.C. manager 236, and interactive advertisement manager 238.

In various embodiments, a show episode may comprise one or more segments. As noted above, a segment may represent a period of time within a show. For example, in one embodiment, a show episode may be associated with a segment array populated by one or more segment identifiers, each determining/identifying a segment. In various embodiments, a segment may be a content segment comprising a portion of a show, a commercial segment comprising commercial/advertising content, or an interactive advertisement segment comprising an interactive advertisement. Each segment may be associated with a set of segment data/information. In various embodiments, each set of segment data/information may comprise a segment identifier, segment title, and/or the like, as described in detail below. The segment data/information may comprise at least a portion of the rundown data/information associated with the show episode.

As noted above, each segment may be associated with a set of segment data/information. In various embodiments, a set of segment data/information may comprise a segment state. In one embodiment, each segment may be associated with a state selected from the group of estimated, floated, current, actual, and killed. An estimated segment is one which has not yet been produced and therefore does not have an actual start time and duration, but rather has an estimated start time and duration. A segment in the estimated state is one that is likely to change its start time and duration. Within the production interface, an estimated segment can be floated and/or taken, and the start time may change automatically based on segments around it. An actual segment is one which has been produced and did, or will, air at the start time identified. This state also indicates that the duration is known. Segments in the actual state can change if a mistake was made in programming, but would not normally change frequently. A floated segment is an estimated segment that is not currently being used in a rundown. Particularly, the interfacing module 250 may be configured to ignore floated segments. The start time and duration of a floated segment are estimated and are not used to calculate the start times of segments around it. In some embodiments, once a segment is floated it may not be displayed in various views of the production interface. A current segment is a segment that was an estimated segment but has been "taken;" thus, the segment that is currently being produced live. This state means that the start time is correct but the duration is still an estimate. A current segment may be changed back to an estimated segment if the segment is "un-taken" via the production interface. In one embodiment, only one segment may be a current segment at any given time. A killed segment is treated like an actual segment by the production module 230 but is ignored by the interfacing module 250. Thus, a killed segment will not be aired when the show is broadcast. Thus, a killed segment is an actual segment that will not be accessible to a user.

In various embodiments, an estimated segment may be taken to become the current segment or floated to become a floated segment; a floated segment may be un-floated to become an estimated segment; the current segment may be performed to become an actual segment; and an actual segment may be broadcasted or killed. For example, an interactive advertisement may be created as a segment having a status of float and one or more R.C. objects may be associated therewith. When the commercial associated with the interactive advertisement is inserted into the video stream associated with the media presentation, by the digital commercial system 40 or the linear commercial system 60, the interactive advertisement segment may be taken (e.g., become the current segment).

In various embodiments, the set of segment data/information may comprise a variety of data/information in addition to or instead of the segment state. For example, each set of segment data/information may comprise a segment identifier, a show identifier of the show or show episode the segment is a part of, the start time (e.g., timestamp) of the segment, the duration of the segment, a segment type, a topic identifier, a segment title, an array of related R.C. identifiers, video format identifier, segment subject matter, segment key words, segment text, segment context, and/or the like. The segment identifier may be configured to determine/identify the segment uniquely, uniquely within the associated show, or uniquely within the associated show episode. In various embodiments, the segment identifier may be further configured to identify the video data/information associated with the segment. In one embodiment, the start time may be a UNIX timestamp (seconds since 01/01/1970 UTC) that represents the start time of the segment. A variety of other time formats may also be used. The start time of the segment reflects the estimated time at which a segment is expected to be aired or the actual time the segment started to be aired, depending on the state of the segment. The duration of the segment reflects the length of the segment. The segment type may indicate whether the segment includes show content, one or more commercials, an interactive advertisement, and/or the like. The topic identifier may indicate one or more topics associated with the segment. For example, a segment may be associated with the topic identifier "guncon" indicating that the topic of gun control is associated with the segment. In various embodiments, the topic identifier may be an alphanumeric code, tag, hashtag, and/or the like. In some embodiments, the topic identifier may be configured to determine/identify subject matter associated with the segment. In various embodiments, the segment data/information may include a transcript of the segment; a list of key words, subject matter, and/or topics associated with the segment; and a context of the segment. The segment title may indicate a title for the particular segment. This may be the segment title that is displayed in the rundown viewer/portion of the user interface 2000 (e.g., of the user computing entity 30) in association with the segment tile representing the segment. The segment title may be configured for optimal display on the display device associated with the user computing entity 30 (e.g., television, tablet, phablet, desktop). The array of related R.C. identifiers may comprise data/information determining/identifying various numbers of R.C. objects. In some instances, the array of R.C. identifiers may be empty, while in other instances the array of R.C. identifiers may comprise data/information determining/identifying one or more corresponding R.C. objects. In one embodiment, the maximum number of R.C. objects that may be identified in the array of R.C. identifiers, and therefore the maximum number of R.C. objects that may be associated with a given segment may vary to accommodate various needs and circumstances. The video format identifier may comprise data/information configured to determine/identify the format of the video associated with the segment. In other embodiments, a variety of other segment data/information may be associated with a segment as appropriate for the application.

In various embodiments, one or more R.C. objects may be associated with a segment or interactive advertisement. This step is performed using the R.C. manager 236, which may be configured to receive input indicating the R.C. object selection and associate the R.C. object with the indicated segment. For example, the R.C. identifier associated with the R.C. object may be added to the array of R.C. identifiers associated with the set of segment data/information of a particular segment. An R.C. object may be configured to provide editorial content, content related to a segment, and/or the like. In some embodiments, an R.C. object may provide commercial/advertising content or a promotional message. For example, an R.C. object providing data/information about a camera manufactured by a sponsor may be associated with a segment related to ecotourism in Australia. In another example, the segment related to ecotourism in Australia may also be associated with an R.C. object providing data/information about an upcoming special show about koalas.

In various embodiments, potential R.C. objects for a segment may be identified in a variety of ways. For example, a product staff member may identify a potential R.C. object for a segment or potential R.C. objects for a segment may be automatically identified. In some embodiments, an R.C. object associated with a segment may comprise sponsored or commercial/advertising content or a promotional message. For example, if a segment is discussing technological advances in digital cameras, one of the associated R.C. objects may be an advertisement for a particular brand of digital camera. In another example, an advertiser may provide one or more potential R.C. objects associated with one or more interactive advertisements. In various embodiments, potential R.C. objects for a segment may be identified based on the text, transcript, topic identifier, key words, context, and/or the like associated with a segment. For example, the potential R.C. objects may be related to a story or a theme or topic associated with the segment or the target product of an interactive advertisement. For example, if the interactive advertisement is for a car, the associated R.C. content may include a gallery of images showing the car or related cars, an article talking about or reviewing the car, a program that allows a user to build a car (e.g., select color, trim, options, etc.), contact data/information for a local car dealership, an infographic illustrating various features of the car, and/or the like.

A potential R.C. object may be modeled by the R.C. manager 236 thereby creating an abstract representation of the potential R.C. object. The modeling may depend on the type of potential R.C. object being modeled and how various types of content may react in different contexts. For example, a text story may be modeled in a different manner than a photo gallery, video, or social media content. The resulting abstract representation, or R.C. object, comprises a portable data/information set. Thus, an R.C. object may be a modular, portable abstract representation of the content of the associated or corresponding potential R.C. object. The R.C. manager 236 receives input indicating data/information associated with an R.C. object. In one embodiment, the data/information associated with an R.C. object may be received via manual input provided by a production staff member or agent of an advertiser operating an appropriate computing entity or using automated approaches. The data/information may comprise an R.C. identifier, a URI associated with the R.C. object and/or a source of the R.C. object, a title of the R.C. object, a type of R.C. object, a thumbnail associated with the R.C. object, a payload associated with the R.C. object, and/or the like. The R.C. identifier may be generated by the R.C. manager 236 or other mechanism and be configured for determining/identifying the particular R.C. object with which it is associated. The URI and/or source associated with the R.C. object may indicate a location on the Internet or some other accessible network address indicating the location where the R.C. object may be accessed and/or retrieved. The title of the R.C. object may be the title for the R.C. object displayed via the user interface 2000 (e.g., of the user computing entity 30). The type of R.C. object may indicate whether the R.C. object is an article, photo, photo gallery, video, video gallery, infographic, map, poll, guest biography, a tweet or other social media R.C. object, a blog post, and/or the like. The thumbnail may be displayed via the user interface 2000 that is part of or in communication with the user computing entity 30 to offer a preview of the R.C. object to a user. In some embodiments, a URI or other network address where a published thumbnail associated with the R.C. object is available may be provided in place of the thumbnail itself. The payload associated with the R.C. object may depend on the type of the R.C. object. For example, if the R.C. object is a video, the payload may comprise the video.

The R.C. manager 236 may associate the R.C. object and/or data/information associated with the R.C. object with one or more segments, show episodes, or interactive advertisements. For example, in one embodiment, the R.C. manager 236 may generate a unique R.C. identifier configured to determine/identify the R.C. object. This R.C. identifier may then be associated with both the data/information associated with the R.C. object and the selected segment or interactive advertisement. For example, the R.C. identifier may be added to the R.C. array associated with the set of segment data/information for the selected segment and/or interactive advertisement data/information for the selected interactive advertisement.

In various embodiments, the R.C. manager 236 may associate one or more R.C. objects with a segment or interactive advertisement and/or otherwise manage the R.C. objects associated with a segment at any time during the production process. For example, the R.C. manager 236 may associate an R.C. object with an estimated, floated, current, actual and/or killed segment. Thus, the R.C. manager 236 may be used to associate one or more R.C. objects with one or more segments before the show starts, during the show, after the show has ended, and/or the like. In another example, the R.C. manager 236 may be used to associate one or more R.C. objects with one or more interactive advertisements before the interactive advertisement is provided, during the interactive advertisement being provided, or after the interactive advertisement has been provided.

Figure 5:
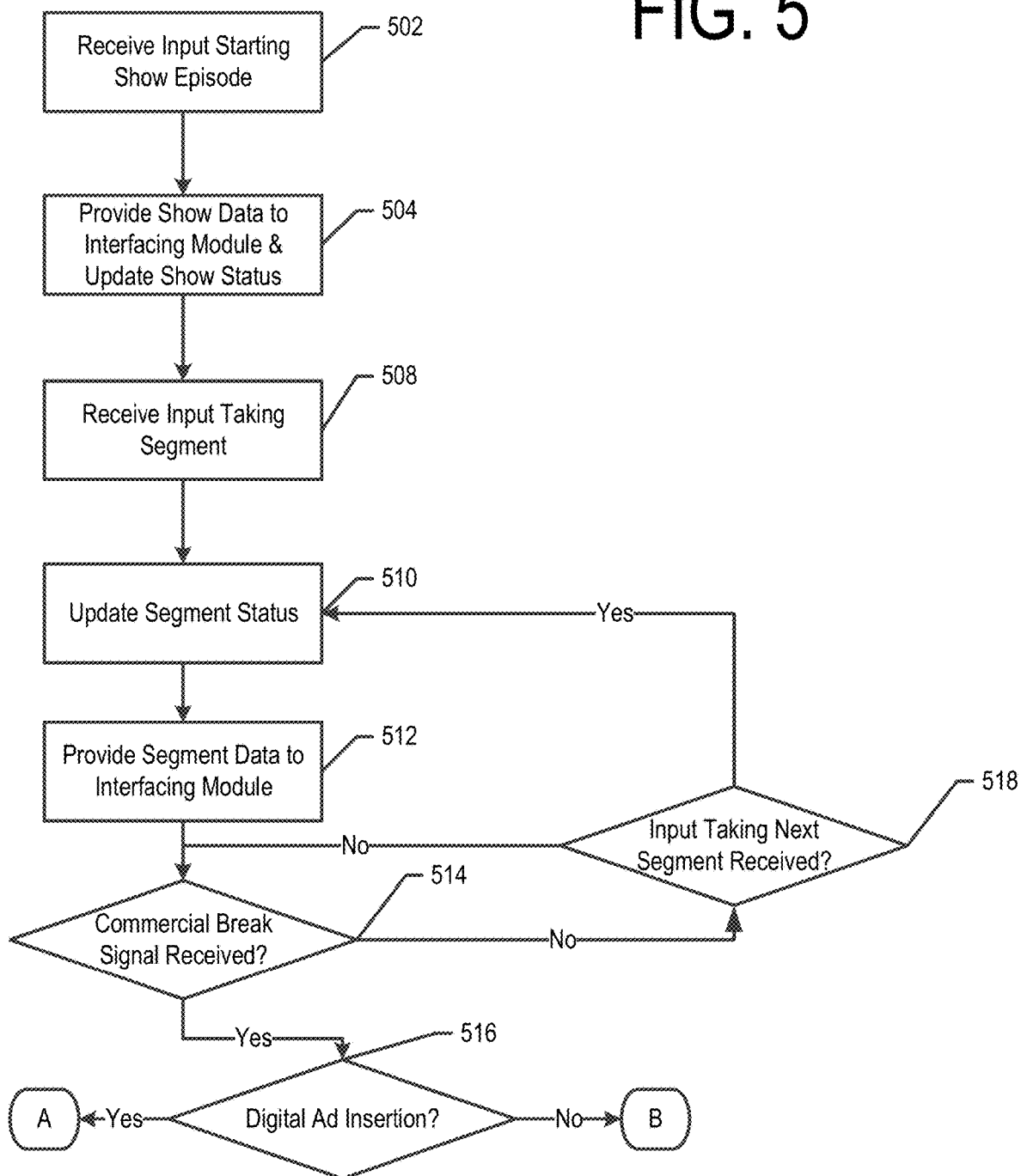

FIG. 5 provides a flowchart illustrating various processes and procedures that may be performed or carried out in providing an interactive advertisement in association with a media presentation (e.g., an enhanced news show). Starting at step 502, input indicating the start of the show episode is received. For example, the rundown manager 234 may receive input indicating the start of the show episode. At step 504, the show data/information is provided to the interfacing module 250 and the show status is updated. For example, the rundown manager 234 may provide the interfacing module 250 with show data/information and possibly other rundown data/information associated with the show episode. The interfacing module 250 may then provide (e.g., push) at least a portion of the show data/information and/or other rundown data/information to one or more client modules 35 operating on corresponding user computing entities 30. The show status may be updated to indicate that the show is At step 508, input taking a segment is received. For example, input causing an estimated segment to become the current segment may be received. For example, the rundown manager 234 may receive an indication that a segment has been taken. In various embodiments, the taken segment will be the next segment in the rundown (e.g., the segment located directly below the current segment in the rundown). When the segment is taken, the segment status is updated from "estimated" to "current," at step 510. For example, the rundown manager 234 may update the segment status from "estimated" to "current" after (e.g., responsive to) the segment being taken. Thus, the start time of the segment is now the actual start time of the segment but the duration is still estimated. If there was a current segment at the time the input to take the segment was received, the status of the current segment is updated from "current" to "actual," indicating the start time and duration of that segment are known. At step 512, the set of segment data/information associated with the taken segment is provided to the interfacing module 250. For example, the rundown manager 234 may provide segment data/information associated with the taken segment to the interfacing module 250. For example, a rundown comprises segments A, B, and C with segment A being located directly above segment B and segment B being located directly above segment C in the rundown. If segment A is the current segment, input from a production staff member (e.g., operating an appropriate computing entity) may be received indicating segment B should be taken. The status of segment A is updated from current to actual. The status of segment B is then updated from estimated to current and indicating that the video data/information associated with segment B is currently being broadcasted live. Also, the segment data/information associated with segment B is provided to the interfacing module 250 and the interfacing module 250 may provide (e.g., push) the segment data/information associated with segment B to one or more client modules 35 operating on corresponding user computing entities 30. In various embodiments, if A is the current segment, it may still be possible to take segment C. As previously noted, in some embodiments, an interactive advertisement may be a floated segment that is updated to an estimated or current segment when it is determined/identified that the interactive advertisement should be provided in association with the show.

At step 514, it may be determined/identified whether a commercial break/segment start signal has been received. For example, the rundown manager 234 may determine whether a commercial break/segment start signal has been received. If a commercial break/segment start signal has not been received, the rundown manager 234 may continue to step 518 and determine whether input taking the next and/or a new segment has been received.

If a commercial break/segment start signal has been received at step 514, it is determined/identified whether the commercials of the commercial break/segment at being provided via digital commercial insertion or via linear commercial insertion at step 516. For example, if the rundown manager 234 determines that a commercial break/segment start signal has been received, the rundown manager 234 may determine whether the commercials of the commercial break/segment at to be provided via digital commercial insertion or linear commercial insertion. If the commercials for the commercial break/segment are to be inserted via digital commercial insertion, the process continues with step 602 shown in FIG. 6. If the commercials for the commercial break/segment are to be inserted via linear or dynamic commercial insertion, the process continues to step 702 shown in FIG. 7.

Figure 6:
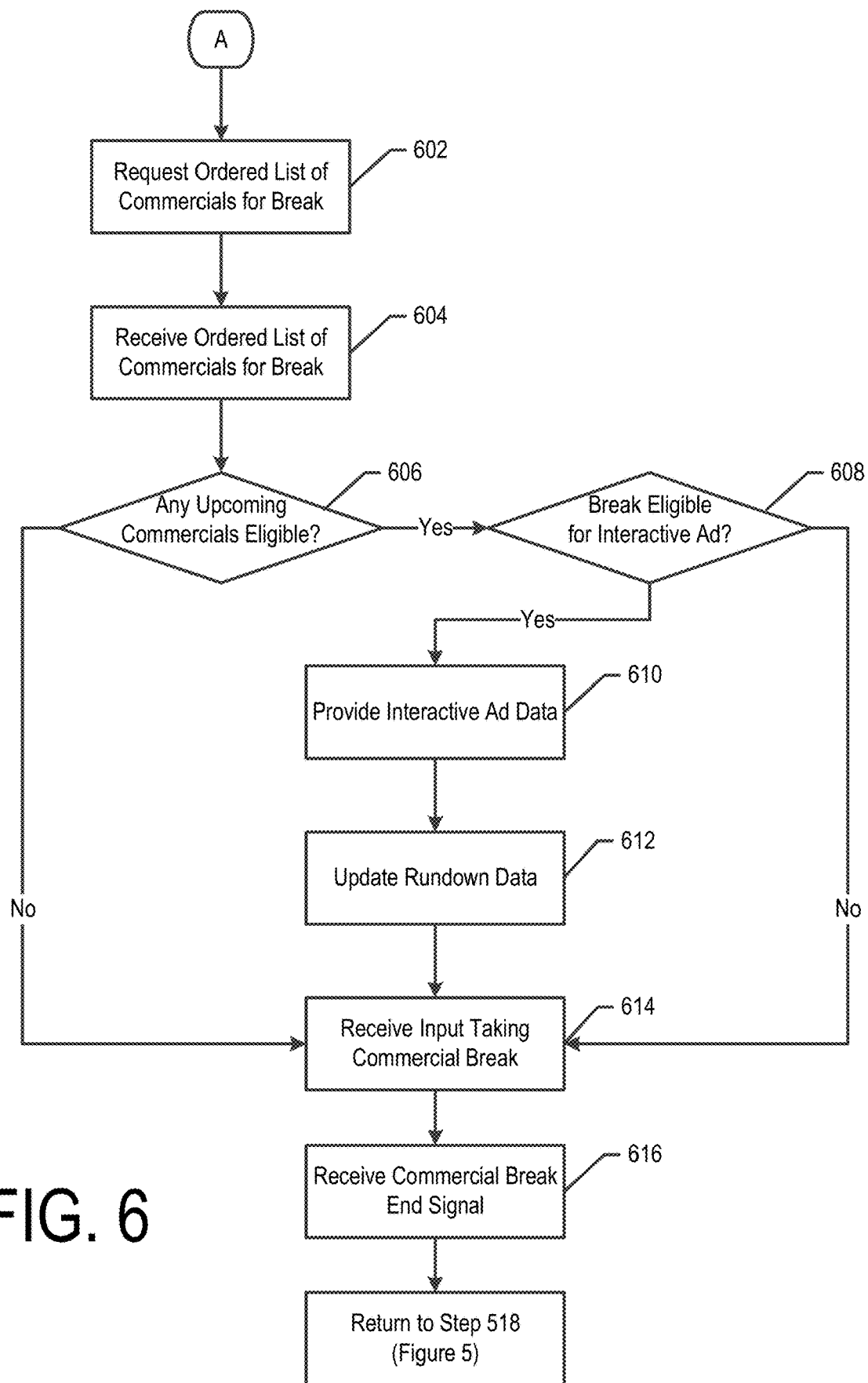

FIG. 6 provides a flowchart of various operations and procedures that can be performed or carried out in accordance with providing a commercial break/segment via digital commercial insertion. If, at step 516 (shown in FIG. 5), it is determined/identified that the commercials for the commercial break/segment are to be provided via digital commercial insertion, the process may continue to step 602 (shown in FIG. 6). At step 602, an ordered list or schedule of commercials to be provided during the break is requested. For example, the interactive advertisement manager 238 may request a list or schedule of the commercials for the break from the digital commercial system 40. In various embodiments, the commercials to be provided during the next commercial break/segment may be determined/identified before the break begins. The digital commercial system 40 store a list or schedule commercials to be provided during the next commercial break/segment and the order in which the commercials will be provided. Thus, in such embodiments, the list or schedule of commercials for the next break may be requested before the begin break signal is received.

At step 604, the list or schedule of commercials to be provided during the break is received. For example, the digital commercial system 40 may provide the list or schedule of commercials for the next commercial break/segment and/or the interactive advertisement manager 238 may receive the list or schedule of commercials for the next commercial break/segment. In various embodiments, the list may comprise one or more unique commercial identifiers configured to identify the one or more commercials that will be provided for the next break. In some embodiments, the one or more commercial identifiers may be ordered in an order indicative of the order the commercials will be provided during the break. In another embodiment, the list may comprise some other indication of the order in which the commercials will be provided during the commercial break/segment or which commercial will appear in each position of the break.

At step 606, it is determined/identified whether any of the commercials for the next break are eligible to be interactive advertisements. For example, the interactive advertisement manager 238 may access a list or schedule and/or database of commercials which are eligible to be interactive advertisements to determine whether any of the commercials for the next break are eligible to be provided as interactive advertisements. For example, the interactive advertisement manager 238 may maintain and/or access a database comprising a unique commercial identifier for each commercial that is eligible to be an interactive advertisement and associated interactive advertisement data/information (e.g., an array of R.C. identifiers, one or more requirements, and/or the like). For example, a commercial may be eligible to be an interactive advertisement if the commercial is associated with a sponsorship package that comprises an interactive advertisement, there is interactive advertisement data/information associated with the commercial identifier, and/or the like. In various embodiments, more than one commercial for the next break may be eligible to be an interactive advertisement. For example, for a particular commercial break it may be determined that the first and fourth commercial of the break are eligible to be provided as interactive advertisements (e.g., the advertiser associated with the commercial may be flagged as a premium advertiser and/or the like in a commercial/advertiser database).

If, at step 606, it is determined/identified that there are no commercials planned for the next break that are eligible to be interactive advertisements, then the process continues to step 614, which will be described in more detail below. If, at step 606, it is determined/identified there is at least one commercial planned for the next break that is eligible to be an interactive advertisement, then the process continues to step 608.

At step 608, it is determined/identified whether the commercial break/segment is eligible for hosting the at least one interactive advertisement. For example, it may be determined if the commercial break/segment is eligible for the at least one interactive advertisement to be provided during the commercial break/segment. For example, the interactive advertisement data/information associated with the interactive advertisement may comprise one or more break/segment characteristic (and/or parameter, attribute, and similar words used herein interchangeably) requirements that may be configured to indicate if a commercial break/segment is eligible for a particular interactive advertisement. For example, break/segment characteristic requirements associated with an interactive advertisement data/information may comprise one or more frequency requirements, content requirements, time of day requirements, position requirements, and/or other break/segment characteristic requirements. For example, a break/segment characteristic requirement may indicate one or more acceptable values for one or more commercial break/segment characteristics. For example, commercial break/segment characteristics may include, time of day, associated show, segment data/information for the proceeding segment, segment data/information for the segment following the commercial break/segment, the time or number of commercial break/segments since the last interactive advertisement was provided, and/or the like. Therefore, to determine whether the commercial break/segment is eligible for hosting the interactive advertisement, it may be determined/identified whether one or more characteristics of the commercial break/segment are in accordance/compliance with (e.g., satisfied by) the allowable characteristics as described by the break/segment characteristic requirements associated with the interactive advertisement. Additionally, the interactive advertisement manager 238 may determine whether the commercial break/segment is eligible for hosting the interactive advertisement based on one or more universal break/segment characteristic requirements. For example, a universal break/segment characteristic requirement may not be associated with a particular interactive advertisement but may be applied to all or a subset of all of the interactive advertisements.

FIG. 8 illustrates an example procedure for determining/identifying whether a commercial break/segment is eligible for hosting an interactive advertisement. Starting at step 802, it is determined/identified whether the frequency requirements provided by any break/segment characteristic requirements associated with the interactive advertisement and any applicable universal break/segment characteristic requirements are satisfied. For example, the break/segment characteristic requirements may require that the interactive advertisement only be provided during one commercial break/segment each day, one to three commercial break/segments a week, and/or the like. In an example of a universal frequency requirement, a network may decide to provide no more than one interactive advertisement each hour, each day portion (e.g., morning, afternoon, evening, primetime, late night, and/or the like), each day, and/or the like. Thus, if an interactive advertisement has already been provided during the particular time frame, the commercial break/segment might not be eligible for any interactive advertisement. If the commercial break/segment is in accordance/compliance with (e.g., satisfied by) any applicable frequency requirements as indicated by any break/segment characteristic requirements associated with the interactive advertisement data/information and any applicable universal break/segment characteristic requirements, the process continues to step 804.

At step 804, it is determined/identified whether the commercial break/segment is in accordance/compliance with (e.g., satisfied by) any applicable time of day requirements. For example, a break/segment characteristic requirement associated with the interactive advertisement may require that the associated interactive advertisement only be provided during a particular time of day (e.g., in the early morning, in the late morning, in the afternoon, in the early evening, in the late evening, in the night, between 4 am and 8 am, between 8 am and noon, between noon and 4 pm, between 4 pm and 8 pm, between 8 pm and midnight, and/or the like). In some embodiments, a break/segment characteristic requirement may require that the interactive advertisement only be provided during a particular hour (e.g., 8 am and 9 am) or during a particular show. In various embodiments, a universal break/segment characteristic requirement may require that interactive advertisements only be provided during one or more particular times of day, and/or the like. If the commercial break/segment is in accordance/compliance with (e.g., satisfied by) any applicable time of day requirements as indicated by any break/segment characteristic requirements associated with the interactive advertisement data/information and any applicable universal break/segment characteristic requirements, the process continues to step 806.

At step 806, it is determined/identified whether the commercial break/segment is in accordance/compliance with (e.g., satisfied by) any applicable position requirements. For example, a break/segment characteristic requirement associated with the interactive advertisement may require that the associated interactive advertisement only be provided on a certain network or channel or only be provided in a particular position in a commercial break/segment. For example, the break/segment characteristic requirement may require that the associated interactive advertisement only be provided in particular positions of the commercial break/segment (e.g., only in the A or first position, only in the Z or last position, only in a position that is not the A or Z position, and/or the like). In some embodiments, a universal break/segment characteristic requirement may require that applicable interactive advertisements only be shown on a particular channel or only in a particular position or set of positions in a commercial break/segment. If the commercial break/segment is in accordance/compliance with (e.g., satisfied by) any applicable position requirements, as indicated by any break/segment characteristic requirements associated with the interactive advertisement data/information and any applicable universal break/segment characteristic requirements, the process continues to step 808.

At step 808, it is determined/identified whether the commercial break/segment is in accordance/compliance with (e.g., satisfied by) any applicable context requirements. In various embodiments, the break/segment characteristic requirements require (a) that the segment immediately preceding and/or following the commercial break/segment be associated with a particular key word, context, or topic, and/or (b) that the transcript should include a particular word or phrase. In some embodiments, the break/segment characteristic requirements may require that the segment immediately preceding and/or following the commercial break/segment should not be associated with a particular key word, context or topic, and/or that the transcript should not include a particular word or phrase. For example, an interactive advertisement about a particular car may be associated with a break/segment characteristic requirement that requires the segment preceding the commercial break/segment to be associated with the topic of transportation, but that the transcript of the segment does not include the phrases "mass transit," "bus," or "subway." Similarly, an interactive advertisement about a particular car may be associated with a break/segment characteristic requirement that requires the segment preceding the commercial break/segment not be associated with accidents or recalls involving "mass transit," "buses," or "vehicles."

If the commercial break/segment is in accordance/compliance with (e.g., satisfied by) any applicable context requirements, as indicated by any break/segment characteristic requirements associated with the interactive advertisement data/information and any applicable universal break/segment characteristic requirements, the commercial break/segment is determined/identified to be eligible to host the interactive advertisement, as shown by block 810. If the commercial break/segment is not in accordance with at least one of any applicable frequency, time of day, position, or context requirements, as indicated by any break/segment characteristic requirements associated with the interactive advertisement data/information and any applicable universal break/segment characteristic requirements, the commercial break/segment is determined/identified to not be eligible to host the interactive advertisement, as shown by block 812.

Returning to FIG. 6, if it is determined/identified at step 608, based on one or more break/segment characteristic requirements associated with the interactive advertisement and/or one or more universal break/segment characteristic requirements, that the commercial break/segment is not eligible to include the interactive advertisement, the process continues to step 614 (described below). If, at step 608, it is determined/identified, based on the one or more break/segment characteristic requirements associated with the interactive advertisement and/or the one or more universal break/segment characteristic requirements, that the commercial break/segment is eligible to include the interactive advertisement, then the process continues to step 610.

At step 610, at least a portion of the interactive advertisement data/information is provided. For example, the interactive advertisement manager 238 may provide a least a portion of the interactive advertisement data/information to the interfacing module 250. The interfacing module 250 may then provide (e.g., push) at least a portion of the interactive advertisement data/information to one or more client modules 35 operating on corresponding user computing entities 30. For example, the provided interactive advertisement data/information may include an array of R.C. identifiers and/or other R.C. data/information for R.C.

objects associated with the interactive advertisement, a length of the commercial associated with the interactive advertisement, one or more images to be displayed in association with the interactive advertisement, an estimated start time, and/or the like. At step 612, the rundown data/information is updated to include the interactive advertisement. For example, the rundown manager 234 may update the rundown data/information to indicate the presence of the interactive advertisement. For example, an interactive advertisement segment may be inserted into the rundown data/information. The updated rundown data/information may also be provided to the interfacing module 250 and the interfacing module 250 may in turn provide (e.g., push) the updated rundown data/information to one or more client modules 35 operating on corresponding user computing entities 30. In various embodiments, the rundown data/information is updated in response to receiving an indication that the commercial break/segment is over. In various embodiments, if a commercial break includes more than one interactive advertisement, the rundown data is only updated to indicate the presence of one of the interactive advertisements (e.g., the first interactive advertisement, based on the sponsorship packages associated with the interactive advertisements, based on the status of the advertiser associated with each of the interactive advertisements, and/or the like).

At step 614, input is received taking and/or beginning the commercial break/segment. For example, a commercial break/segment start signal may be received. The commercials of the commercial break/segment may then be digitally inserted into the video feed associated with the show. If any interactive advertisement data/information was provided to the client module, the user will experience the corresponding commercial as an interactive advertisement. At step 616, input may be received ending the commercial break/segment. For example, a commercial break/segment end signal may be received. The process may then continue to step 518 (shown in FIG. 5).

Figure 7:
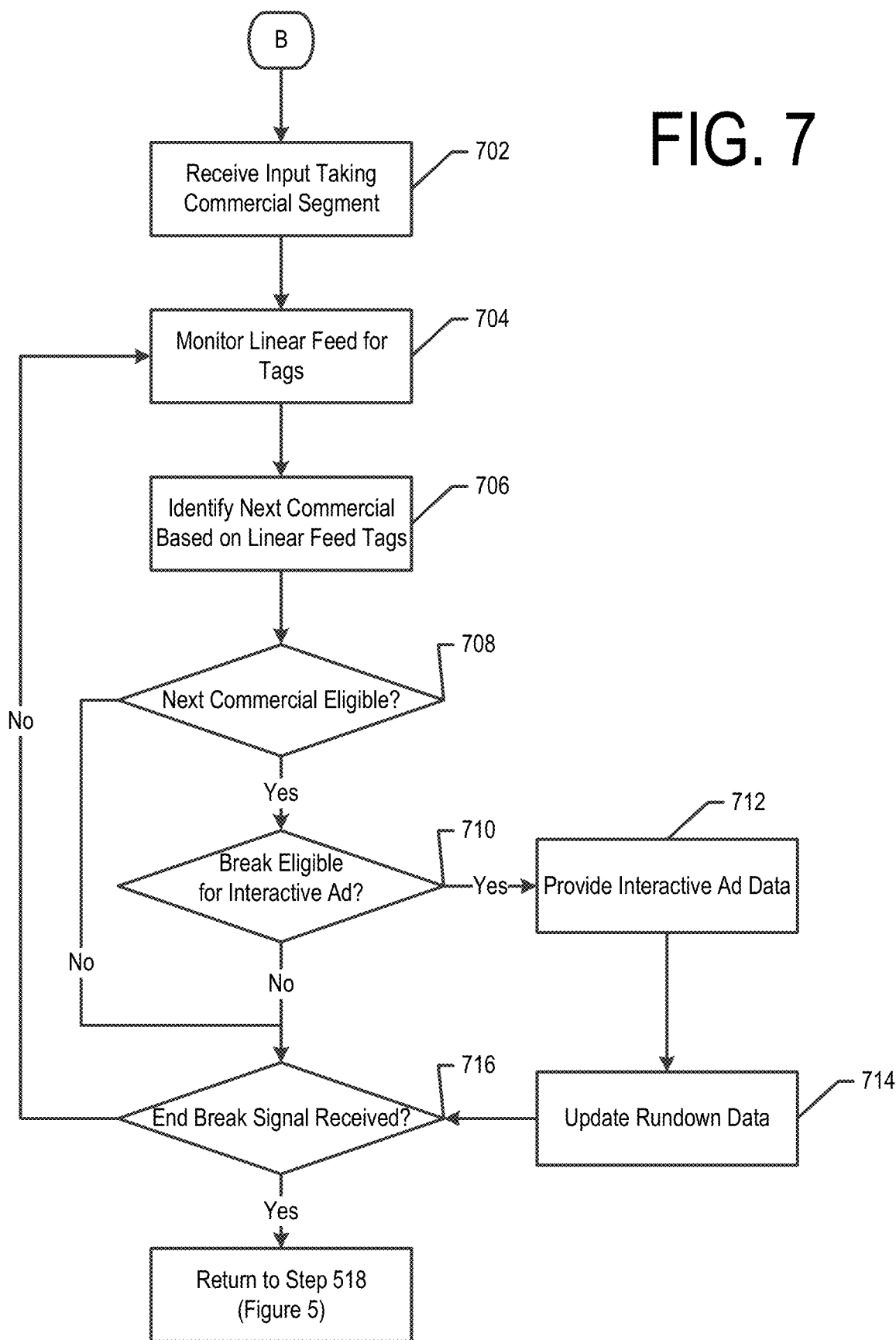

Returning to FIG. 5, if at step 516 it is determined/identified that the commercials for the commercial break/segment will not be provided via digital commercial insertion and the commercials will instead be provided via linear commercial insertion, the process continues to step 702 (shown in FIG. 7).

FIG. 7 provides a flowchart of processes and procedures that can be performed or carried out to provide an interactive advertisement in an embodiment in which the commercial is provided via a linear broadcast feed and/or the commercials are dynamically inserted. For example, FIG. 7 provides an example of how digital content associated with an interactive advertisement may be triggered by a linear feed. Starting at step 702, input is received taking the commercial break/segment. For example, a commercial break/segment start signal may be received. At step 704, the interactive advertisement manager 238 may monitor the linear broadcast feed for tags (or other indicia) embedded therein. For example, the tags (or other indicia) may identify the next commercial to be broadcast via the linear broadcast feed. In various embodiments, the tags (or other indicia) may be embedded such that the tag (or other indicator) is broadcasted identifying the next commercial a few seconds before the commercial begins. For example, a tag (or other indicator) may be embedded into the linear broadcast feed such that 2.5 seconds before the next commercial begins, a tag (or other indicator) is provided that identifies the next commercial (e.g., comprises the unique commercial identifier associated with the next commercial).

At step 706, a tag (or other indicator) embedded into the linear broadcast feed is received and the next commercial is identified therefrom. For example, the interactive advertisement manager 238 may identify a tag (or other indicator) in the linear broadcast feed and extract a unique commercial identifier identifying the next commercial therefrom. For example, the linear broadcast feed may have metadata embedded therein and the embedded metadata may comprise a unique commercial identifier identifying the next commercial. In various embodiments, the embedded tag or metadata may use a proprietary protocol or various industry standard metadata messaging. In some embodiments, the tag or other indicator (e.g., metadata) may be received as out-of-band data from the linear network's automated ad playout system. For example, the networks' master control automation system might transmit one or more messages comprising a tag, metadata, or other indicator of the next commercial to be provided via the linear broadcast feed to the interactive ad manager 238 or other commercial management system in communication therewith.

At step 708, it may be determined/identified whether the next commercial is eligible to be provided as an interactive advertisement. For example, the interactive advertisement manager 238 may access a list and/or database of commercials which are eligible to be interactive advertisements to determine whether the next commercial is eligible to be provided as an interactive advertisement. For example, the interactive advertisement manager 238 may access a database comprising a unique commercial identifier for each commercial that is eligible to be an interactive advertisement and associated interactive advertisement data/information (e.g., an array of R.C. identifiers, break/segment characteristic requirements, and/or the like). As will be recognized, a commercial may be eligible to be an interactive advertisement if the commercial is associated with a sponsorship package that comprises an interactive advertisement, there is interactive advertisement data/information associated with the commercial identifier, and/or the like.

If, at step 708, it is determined/identified that the next commercial is not eligible to be provided as an interactive advertisement, the process continues to step 716, which will be discussed in more detail below. If, at step 708, it is determined/identified that the next commercial is eligible to be provided as an interactive advertisement, the process continues to step 710.

At step 710, it is determined/identified whether the commercial break/segment is eligible for hosting the interactive advertisement. For example, the interactive advertisement data/information associated with the interactive advertisement may comprise one or more commercial break/segment requirements that may be configured to indicate if a commercial break/segment is eligible for a particular interactive advertisement. For example, break/segment characteristic requirements associated with an interactive advertisement data/information may comprise one or more frequency requirements, content requirements, time of day requirements, position requirements, and/or other break/segment characteristic requirements. For example, a break/segment characteristic requirement may indicate one or more acceptable values for one or more commercial break/segment characteristics. For example, commercial break/segment characteristics may include, time of day, associated show, segment data/information for the proceeding segment, segment data/information for the segment following the commercial break/segment, the time or number of commercial break/segments since the last interactive advertisement was provided, and/or the like. Therefore, to determine whether the commercial break/segment is eligible for hosting the interactive advertisement, it may be determined/identified whether one or more characteristics of the commercial break/segment are in accordance/compliance with (e.g., satisfied by) the allowable characteristics as described by the break/segment characteristic requirements.

Additionally, the interactive advertisement manager 238 may determine whether the commercial break/segment is eligible for hosting the interactive advertisement based on one or more universal break/segment characteristic requirements. For example, a universal break/segment characteristic requirement may not be associated with a particular interactive advertisement but may be applied to all or a subset of all of the interactive advertisements. In various embodiments, to determine whether the commercial break/segment is eligible for hosting the interactive advertisement, it may be determined/identified whether the commercial break/segment is in accordance/compliance with (e.g., satisfied by) any break/segment characteristic requirements associated with the interactive advertisement data/information and/or applicable universal break/segment characteristic requirements. For example, a procedure similar to that shown in FIG. 8 and described above may be used to determine whether the commercial break/segment is in accordance/compliance with (e.g., satisfied by) any break/segment characteristic requirements associated with the interactive advertisement data/information and/or applicable universal break/segment characteristic requirements. In other embodiments, various other methods may be used to determine whether the commercial break/segment is in accordance/compliance with (e.g., satisfied by) any break/segment characteristic requirements associated with the interactive advertisement data/information and/or applicable universal break/segment characteristic requirements.

If, at step 710, it is determined/identified that the current commercial break/segment is not eligible for hosting the interactive advertisement, the process continues to step 716, which is described in more detail below. If, at step 710, it is determined/identified that the current commercial break/segment is eligible for hosting the interactive advertisement, the process continues to step 712.

At step 712, at least a portion of the interactive advertisement data/information is provided. For example, the interactive advertisement manager 238 may provide a least a portion of the interactive advertisement data/information to the interfacing module 250. The interfacing module 250 may then provide (e.g., push) at least a portion of the interactive advertisement data/information to one or more client modules 35 operating on corresponding user computing entities 30. For example, the provided interactive advertisement data/information may include an array of R.C. identifiers and/or other R.C. data/information for R.C. objects (e.g., R.C. tiles) associated with the interactive advertisement, a length of the commercial associated with the interactive advertisement, one or more images to be displayed in association with the interactive advertisement, an estimated start time, and/or the like. At step 714, the rundown data/information is updated to include the interactive advertisement. For example, the rundown manager 234 may update the rundown data/information to indicate the presence of the interactive advertisement. For example, an interactive advertisement segment may be inserted into the rundown data/information. The updated rundown data/information may also be provided to the interfacing module 250 and the interfacing module 250 may in turn provide (e.g., push) the updated rundown data/information to one or more client modules 35 operating on corresponding user computing entities 30. In various embodiments, the determining/identifying whether the commercial is eligible to be provided as an interactive advertisement, the determining/identifying whether the current commercial break/segment is eligible to host the interactive advertisement, providing the interactive advertisement data/information and updating and providing the rundown data/information occur in the few seconds between when the tag (or other indicator) identifying the next commercial is received and when the next commercial begins such that the R.C. tiles associated with the interactive advertisement may be displayed simultaneously to the beginning of the commercial associated with the interactive advertisement.

At step 716, it is determined/identified whether input ending the commercial break/segment has been received. For example, the interactive advertisement manager 238 may receive input indicating the ending the commercial break/segment. For example, a commercial break/segment end signal may be received. If it is determined/identified that the commercial break/segment end signal has been received, the process returns to step 518 (shown in FIG. 5). If it is determined, at step 716, that the commercial break/segment end signal has not been received, the process returns to step 704 to monitor the linear broadcast feed for a tag (or other indicator) identifying the next commercial.

Interfacing Module 250

In various embodiments, the interfacing module 250 may be configured to provide an API or other communication interface between the production module 230 and the client module 35. Thus, the interfacing module 250 may be configured to manage one or more socket hosts associated with the provider system 200 that may each be configured for providing (e.g., pushing) rundown data/information, interactive advertisement data/information, and/or the other data/information (e.g., ticker data/information) to each connected user computing entity 30.

Figure 9:
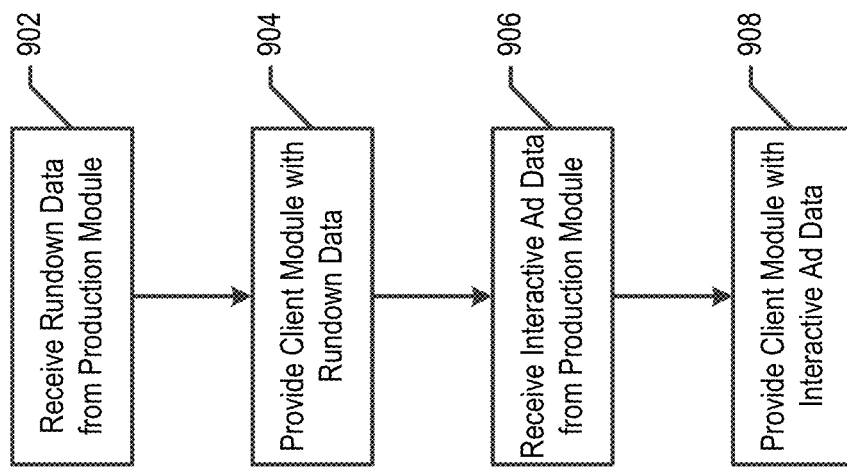

FIG. 9 provides a flowchart of some of the processes that may be performed by the interfacing module 250 in accordance with one embodiment. At step 902, the interfacing module 250 receives rundown data/information from the production module 230 (e.g., the rundown manager 234). As detailed above, the rundown data/information may comprise show data/information, one or more sets of segment data/information, and/or data/information associated with one or more R.C. objects (e.g., R.C. object data). At step 904, the interfacing module 250 may push the rundown data/information to the client module 35 for display via the rundown viewer/portion 2300 of the user computing entity 30.

At step 906, the interfacing module 250 may receive interactive advertisement data/information for an upcoming interactive advertisement from the production module 230 (e.g., the interactive advertisement manager 238). The interfacing module 250 may push the interactive advertisement data/information to the client module 35 for simultaneous display with the commercial associated with the interactive advertisement via the interactive user interface 2000 displayed by the user computing entity 30 at step 908.

In various embodiments, a user may provide input to the client module 35 requesting to view a previously aired show, segment, or interactive advertisement (e.g., via a touchscreen, mouse, remote control, and/or the like). In such an instance, the interfacing module 250 may receive a request from the client module 35 for rundown data/information and/or interactive advertisement data/information associated with the user-selection. The interfacing module 250 may provide the client module 35 with the requested rundown data/information and any associated interactive advertisement data/information.

Video Module 260

In various embodiments, the video module 260 may be configured to run on the provider system 200. The video module 260 may be configured to receive video data/information. In some embodiments, the video module 260 may be configured to receive edited video; in other embodiments, the video module 260 comprises a video editor. The video module 260 may comprise an encoder 262 and a packager 264. The video module 260 may be further configured to transmit a digital or analog video file or video stream to the CDN 10.

Figure 10:
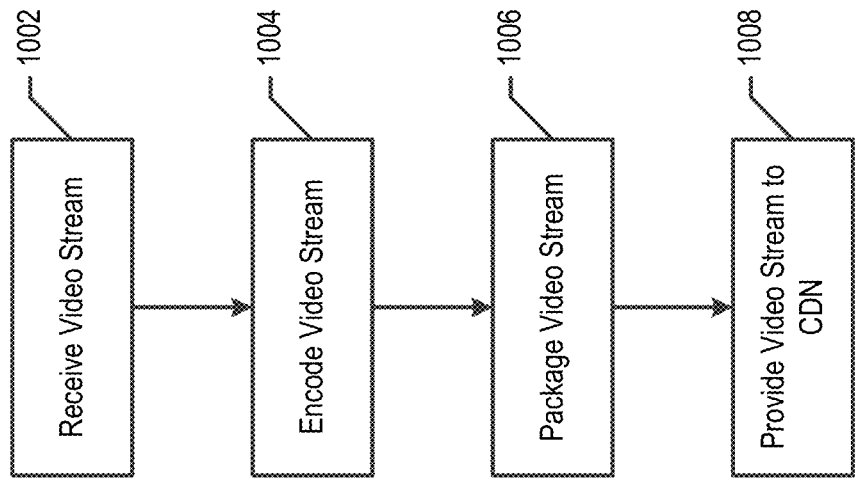

FIG. 10 provides a flowchart of processes and operations that may be performed by the video module 260. At step 1002, the video module 260 receives a video stream or video file comprising video data/information. In various embodiments, the video module 260 may receive one or more commercial video files and/or streams. For example, the video module 260 may receive one or more commercial video files and/or streams from the digital commercial system 40, the linear commercial system 60, and/or another system in accordance with instructions from the digital commercial system 40 and/or the linear commercial system 60.

At step 1004, the encoder 262 encodes the video stream or video file. In various embodiments, the encoder 262 may encode the video stream or file using any of a variety of standards for video compression, as will be recognized. In one embodiment, the encoder 262 may encode the video stream or file using H.264/MPEG-4 AVC, H.262/MPEG-2, and/or various other video compression formats and/or standards.

The packager 264 may then tag the video stream or file with determining/identifying information, at step 1006. For example, the video stream may be tagged with a show identifier, segment identifier or commercial identifier, start time (timestamp), duration, segment type (content, commercials), topic identifier, segment title, and/or other data/information that may be used to determine/identify the video stream as being associated with a particular show episode or rundown segment. For example, the video stream or file may comprise a tag (or other indicator) that identifies a commercial that will start in a few seconds (e.g., 2.5 seconds), a tag (or other indicator) that indicates the beginning of a commercial, and/or the like. In another example, the segment and/or show identifier may be used to identify one or more sets of segment data/information associated with the video data/information of the video stream or file. In various embodiments, the video stream or file may be further tagged with contextual data/information including one or more relevant categories, key words, locations, individuals, characterization of the quality or sentiment of the video, and/or the like. In various embodiments, the video stream or file may be tagged with an ID3 tag and/or other tag (or other indicator) that may be detectable by the user computing entity 30 and provided to the client module 35. In some embodiments, ID3 frames comprising the determining/identifying data/information may be tagged onto the front of a segment of streaming video or onto the beginning of the video file. In various embodiments, the video stream or file may be tagged at various points within the video stream or file to indicate segment start and stop point or times within the video stream or file. It should be understood that a variety of methods may be used to tag a segment of streaming video or video file with the determining/identifying data/information.

At step 1008, the video module 260 provides the encoded and packaged video stream or file to the CDN 10. The CDN 10 may then provide the video stream or file to the client module 35 for displaying the video to a user via a video viewer/portion 2600 of the user interface 2000 (e.g., of the user computing entity 30).

In various embodiments, the video data/information for an entire show episode may be handled as a single video stream or file by the video module 260. Therefore, if a user wishes the access, via the user interface 2000 (e.g., of the user computing entity 30), a particular segment of the show episode or a particular interactive advertisement provided during the show episode, the portion of the video stream or file associated with the segment or interactive advertisement is identified via the timestamp associated with the segment or interactive advertisement start time. In other embodiments, the video stream or file associated with each segment or interactive advertisement is handled by the video module 260 as an individual video stream or file.

Content Broker 270

In various embodiments, the content broker 270 may be configured to operate on the provider system 200 and/or an associated computing entity. In various embodiments, the client module 35 may cause display of one or more R.C. tiles each representing an R.C. object to the R.C. viewer/portion 2700 of the user interface 2000 (e.g., of the user computing entity 30). Each R.C. tile may be configured to provide access to an associated R.C. object. For example, a user may select an R.C. tile to request that the associated R.C. object be displayed via the user computing entity 30. The client module 35 may then receive input from a user selecting an R.C. tile. After receiving the input from the user selecting the R.C. tile, the client module 35 may submit a request to the content broker 270 to retrieve the user-selected R.C. object (e.g., in response to a user selecting the same via a touchscreen, mouse, remote control, and/or the like). The content broker 270 may be configured to receive a request for a user-selected R.C. object and retrieve the user-selected R.C. object from an R.C. host system 20 where the R.C. object is stored, hosted, or otherwise available. In some embodiments, the content broker 270 may be further configured to normalize the retrieved R.C. object. The content broker may then provide the R.C. object and/or the normalized R.C. object to the client module 35 of the user computing entity 30. In various embodiments, if the R.C. object is associated with an interactive advertisement, the content broker 270 and/or the host system 20 may be operated by and/or on behalf of an organization, company, corporation, and/or the like associated with the interactive advertisement. For example, the host system 20 may be a server operated by the advertiser. In another example, the content broker 270 may be a module operating on a computing system operated by an advertising agency responsible for at least a portion of the content of the interactive advertisement. In various embodiments, when a request for an R.C. object is received, the request may be counted such that the number of user interactions with the R.C. object may be tracked. For example, the number of user interactions with an R.C. object via the client module 35 may be tracked via counting user requests for an R.C. object.

Figure 11:
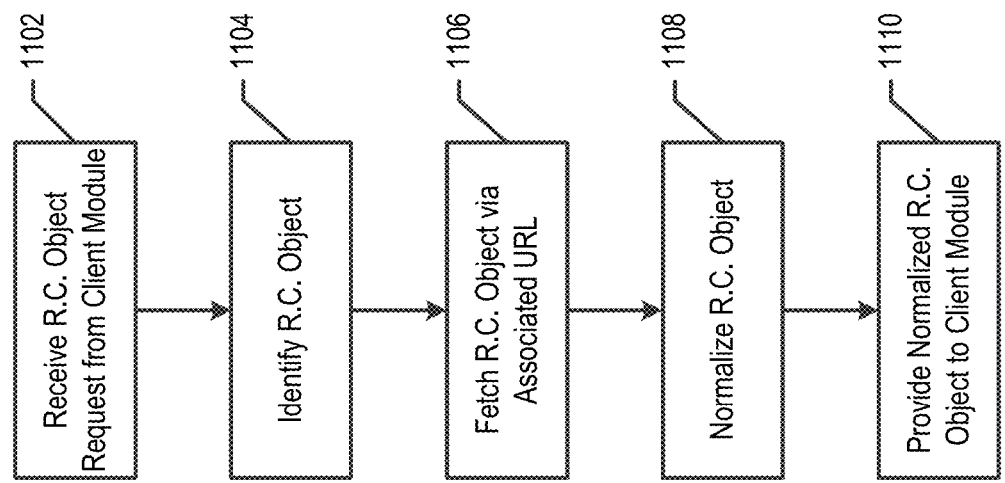

FIG. 11 provides a flowchart of processes and operations that may be performed by the content broker 270 in accordance with one embodiment. At step 1102, the content broker 270 receives a request for an R.C. object from the client module 35 (e.g., in response to a user of the user computing entity 30 selecting the same via a touchscreen, mouse, remote control, and/or the like). In various embodiments, the request may comprise the R.C. identifier or other data/information associated with the R.C. object. At step 1104, the R.C. object is identified. For example, in various embodiments, a request for an R.C. object from the client module 35 may not uniquely identify an R.C. object. Some examples of how an R.C. object may be identified is discussed below with respect to FIG. 12. At step 1106, the content broker 270 requests and receives the R.C. object from the R.C. host system 20. In various embodiments, the R.C. object is requested and/or received via a URI or other network address associated with the R.C. object.

At step 1108, the content broker 270 may normalize the R.C. object. In various embodiments, the R.C. object may be normalized such that the R.C. object can be displayed via a template that may depend on the R.C. type indicator associated with the R.C. object, parameters associated with the user computing entity 30, the parameters associated with the client module 35 (e.g., version), and/or the like. In various embodiments, normalizing the R.C. object may comprise reformatting the R.C. object and/or editing the R.C. object for optimal length or viewing by the user via the user interface 2000 (e.g., of the user computing entity 30). At step 1110, the content broker provides the R.C. object to the client module 35 so that the R.C. object may be displayed via the user interface 2000 (e.g., of the user computing entity 30) provided by the client module 35.

Figure 12:
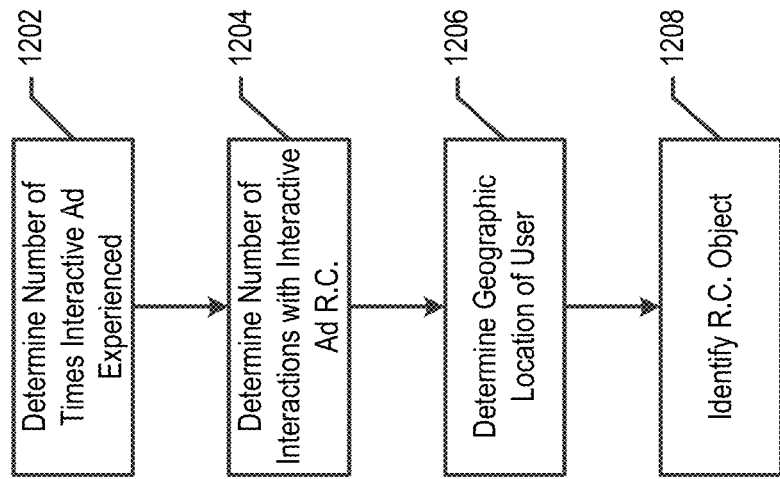

In various embodiments, a particular R.C. tile may be associated with a plurality (e.g., two or more) R.C. objects. Thus, if a request for the R.C. object associated with a particular tile is received, the R.C. object to be provided may be determined. In various embodiments, the client module 35 may determine which R.C. object should be provided and request the appropriate R.C. object. In some embodiments, the content broker 270 may determine which R.C. object should be provided to the user (e.g., via the user computing entity 30). FIG. 12 provides a flowchart illustrating an example method for determining/identifying which R.C. object associated with a user selected R.C. tile to provide to the user. (e.g., via the user computing entity 30) in the example where the R.C. tile and/or objects are associated with an interactive advertisement.

Starting at step 1202, it is determined/identified how many times the user has experienced the interactive advertisement. For example, the content broker 270 may determine, based at least in part on data/information provided by the client module 35, the number of times the user has experienced the interactive advertisement. For example, one R.C. object may be provided if the user selects the R.C. tile upon the first viewing of the interactive advertisement and a different R.C. object may be provided if the user experiences the interactive advertisement for a second or third time by selecting to view the interactive advertisement by selecting the interactive advertisement tile from the rundown (e.g., if the user views the advertisement on demand or other than live).

At step 1204, it is determined/identified how many times the user has interacted with R.C. associated with the interactive advertisement. For example, the content broker 270 may determine, based at least in part on data/information provided by the client module 35, the number of times the user has interacted with R.C. objects associated with the interactive advertisement. For example, a first R.C. object may be provided if the request is associated with user's first selection of an R.C. tile associated with the interactive and a different R.C. object may be provided if the user has already accessed one or more other R.C. objects associated with the interactive advertisement.

At step 1206, the geographic location of the user (e.g., the location of the user computing entity 30) may be determined. For example, the content broker 270 may determine the location of the user based at least in part on data/ information received from the client module 35. For example, the location of the user may be determined/ identified based at least in part on a GPS location of the user (e.g., the user computing entity 30), an IP address associated with the user's user computing entity 30, a location or address stored in association with a user profile associated with the user, and/or the like. For example, if the R.C. object provides contact data/information for a retailer (e.g., a car dealership, etc.) the contact data/information provided may be based on the location of the user. In another example, an R.C. object may provide a find a retailer location function, the results of which may be based on a location associated with the user.

At step 1208, the R.C. object to be provided to the user (e.g., via the user computing entity 30) is identified. For example, the content broker 270 may identify the R.C. object to be provided to the user. In various embodiments, the R.C. object to be provided to the user may be identified based at least in part on one or more of the number of times the user has experienced the interactive advertisement, the number of times the user has interacted with R.C. associated with the interactive advertisement, the location of the user, and/or the like. The identified R.C. object may then be provided to the user via the user interface 2000 as described above.

User Interface 2000

In various embodiments, the client module 35 of the user computing entity 30 may be configured to provide an interactive user interface 2000 with various viewers, portions, and/or similar words used herein interchangeably. The user interface 2000 (e.g., of the user computing entity 30) may be viewed via a web browser, separate application, interface, dedicated window or screen, and/or the like, depending on the user computing entity 30 and/or the embodiment. The user interface 2000 may be configured to allow a user to interact with one or more components of an interactive advertisement and/or the associated media presentation (e.g., an enhanced news show, an enhanced sporting event, and/or the like). The user may be able to select a media presentation from a set of available media presentations for viewing. The media presentation may then be displayed via the user interface 2000 (e.g., of the user computing entity 30).

An example user interface 2000 (e.g., of the user computing entity 30) view is shown in FIG. 13. The example user interface 2000 (e.g., of the user computing entity 30) shown in FIG. 13 is divided into four viewers/portions: a video viewer/portion 2600, a rundown viewer/portion 2300, an R.C. viewer/portion 2700, and a ticker viewer/portion 2400. The video viewer comprises a video display area 2610 of the video viewer/portion 2600 configured for displaying a video (e.g., streaming video) to the user and a video control area 2630 configured for providing data/information related to the streaming video and controls for interacting with the streaming video (e.g., comprising video data)—received from the CDN. The rundown viewer/portion 2300 comprises a data/information picker 2310 and a rundown frame 2320. The data/information picker 2310 allows the user to choose which rundown frame 2320 the user would like to view. For example, in one embodiment, the user may use the data/ information picker to display the rundown frame 2320 from yesterday, today, or tomorrow or view a coming soon rundown frame or a featured segment rundown frame. In another embodiment, the data/information picker may be configured to allow the user to select between a video on demand rundown frame and a today's programming rundown frame. Thus, the data/information picker 2310 allows the user to select a date or category for which the associated rundown frame 2320 may be displayed. The rundown frame 2320 is configured for displaying one or more show tiles and/or segment tiles configured to represent show episodes and associated segments corresponding to the user-selected rundown frame 2320, for instance. The R.C. viewer/portion 2700 comprises one or more R.C. tiles (e.g., represented via R.C. thumbnails) or R.C. minimized tiles 2720 (e.g., represented via R.C. thumbnails), each configured to represent an R.C. object. The ticker viewer/portion 2400 may be configured to display the various headlines or the like comprising the current ticker data/information and/or add other functionality to the user interface 2000 (e.g., of the user computing entity 30).

In various embodiments, the layout of the user interface 2000 (e.g., of the user computing entity 30) may be based on the user computing entity 30. The parameters of the display device associated with the user computing entity 30 may be particularly important in determining/identifying the appropriate layout of the user interface 2000 (e.g., of the user computing entity 30), for example. FIGS. 14A and 14B offer another example of how the layout of the user interface may depend on the user computing entity 30. In the embodiments shown in FIGS. 14A and 14B, the user computing entity is a tablet that may be used in either a landscape or portrait orientation. Landscape user interface view 2010 shows how a user interface may be configured for a tablet in the landscape orientation. Portrait user interface view 2020 shows how a user interface may be configured for a tablet in the portrait orientation. The user interface views 2010 and 2020 both comprise the video viewer/portion 2600, rundown viewer/portion 2300, ticker viewer/portion 2400, and R.C. viewer/portion 2700. In the embodiments shown in FIGS. 14A and 14B, the R.C. viewer/portion 2700 comprises R.C. tiles, rather than the R.C. minimized tiles 2720 shown in FIG. 13. Similar to the user interface 2000 (e.g., of the user computing entity 30) shown in FIG. 13, in the landscape user interface view 2010 the video viewer/portion 2600 is presented above the R.C. viewer/portion 2700 and to the right (or to the left) of the rundown viewer 2300. However, in the portrait user interface view 2020, the video viewer/portion 2600 is presented above both the R.C. viewer/portion 2700 and the rundown viewer 2300. In some embodiments, particularly where the viewable region of the display associated with the user computing entity 30 is small (e.g., when the user computing entity 30 is a smartphone, PDA, phablet, and/or the like), the user interface may not display the video viewer/portion 2600, the rundown viewer 2300, the ticker viewer/portion 2400, and the R.C. viewer/portion 2700 at the same time. For example, the video viewer/portion 2600 may take up the entire viewable region until input is received indicating the user would like to view the contents of the rundown viewer 2300 and/or the R.C. viewer/portion 2700. In another embodiment, the ticker viewer/portion 2400 may be shown with the video viewer/portion 2600, but the rundown viewer 2300 and R.C. viewer/portion 2700 are not viewable until input is received indicating the user would like to view the contents of the rundown viewer 2300 and/or the contents of the R.C. viewer/portion 2700. Such may be activated by touching the screen, mousing over an area, hovering over an area, selecting a configurable icon or button, and/or the like. In one embodiment, a user interface comprising the R.C. viewer/portion 2700 and/or the rundown viewer 2300 can be displayed on a user computing entity, such as a tablet, while the video is displayed via a television set attached to a set top box. As should be appreciated, a variety of layouts may be used to provide the user interface to the user via the user computing entity 30 and the layout may depend on the parameters of the user computing entity 30, the version of the client module 35, and/or the like to adapt to various needs and circumstances.

In some embodiments, the first time the user interface 2000 (e.g., of the user computing entity 30) is displayed and/or every time the user interface 2000 (e.g., of the user computing entity 30) is opened, a user may be asked to sign up, log in (or this may occur automatically), and/or otherwise authenticate his/her identity. For example, a user may be asked to enter a user account associated with his/her television provider to ensure that the user is subscribed to a television service that offers the enhanced news channel or the like. In various embodiments, a user may set up a user account that may be used to store user preferences and/or the like that may be used to control the user interface 2000 or other portions of the user's experience of the interactive advertisement and/or the associated media presentation. In other embodiments, no user authentication is requested.

In various embodiments, user login may be required for accessing live segment. However, in such embodiments, a user may access various R.C. objects (e.g., R.C. objects for the top news stories), selected previously aired show segments, and/or the like without providing login information. For example, in one embodiment, a user operating a user computing entity 30 may login to access content via the CDN 10, but content available via the provider system 200 may be available regardless of whether the user logs in or not. It should be understood that, in various embodiments, logging in may have various effects on the user's experience of the user interface 2000 and, in one embodiment, the user interface 2000 does not provide a log in option.

In some embodiments, the first time the user interface 2000 (e.g., of the user computing entity 30) is displayed and/or every time the user interface 2000 (e.g., of the user computing entity 30) is opened, a dialog box or the like may be displayed. In various embodiments, the dialog box or the like may cause display of a message and one or more buttons that may be configured, when selected to facilitate closing the dialog box or the like and displaying an enhanced news show. In one embodiment, the message may state something along the lines of: "Congratulations! Thanks to [your TV provider], you can now experience the bigger picture with CNN's new extended live view." The message may be accompanied by a "Go Live" button, configured to, when selected by the user (e.g., operating a user computing entity 30), cause display of the live segment. In various embodiments, other messages may also be displayed the first time and/or every time the user interface 2000 is opened. However, as noted above, in some embodiments, such a message may not be displayed.

In various embodiments, the first time the user interface 2000 (e.g., of the user computing entity 30) is displayed and/or every time the user interface (e.g., of the user computing entity 30) is opened, a splash screen may be displayed for a preset amount of time (e.g., 15 seconds, 30 seconds, and/or the like) or until the user interacts with the user interface 2000 (e.g., clicks the mouse, touches the touch screen, and/or the like). The splash screen may display a commercial image for a target product or brand associated with a sponsor, a promotional image for a media presentation, and/or the like.

In one embodiment, when the user interface 2000 is opened, accessed, and/or similar words used herein interchangeably, the video stream or file (e.g., comprising video data) for the live segment will received from the CDN 10 and begin to buffer, and rundown data/information will be received from the interfacing module 250 (e.g., via wired or wireless network 50). When the video stream or file is appropriately buffered, the video may be displayed in the video display area 2610 (e.g., at least a portion of the video data/information may be displayed in the video display area 2610). The rundown frame 2320 of the rundown viewer/portion 2300 may then be populated with show tiles. Segment tiles may also be displayed in the rundown frame 2320 of the rundown viewer/portion 2300 as the segment data/information is received. The R.C. objects associated with the current segment may be identified based on the set of segment data/information associated with the current segment. Thus, the corresponding R.C. tiles 2710 and/or R.C. minimized tiles 2720 may be displayed in the R.C. viewer/portion 2700 when at least part of the set of segment data/information associated with live segment is received.

As noted above, in some embodiments, when the user interface 2000 is first opened, the live segment is displayed. When the user interface 2000 is displaying a live show episode, the live video stream (e.g., comprising video data) is received via the CDN 10. Additionally, the rundown data/information is received via the interfacing module 250. As described above, the rundown data/information comprises show and one or more sets of segment data/information each associated with a segment of one or more show episodes. Thus, the rundown data/information includes all the data/information needed to populate the rundown frame 2320 with the appropriate show, segment, and/or interactive advertisement tiles. Based on the set of segment data/information associated with the live segment or interactive advertisement, the client module 35 may determine/identify R.C. objects that are to be displayed in association with the live segment or interactive advertisement. For example, the set of interactive advertisement data/information associated with a live interactive advertisement may include an array of R.C. identifiers configured to determine/identify the R.C. objects associated with the interactive advertisement. Based on the R.C. identifiers and/or the identified R.C. objects, the appropriate R.C. tiles 2710 and/or minimized tiles 2720 may be displayed.

In various embodiments, video data/information associated with a show episode and/or segment may be provided via the CDN 10. The rundown data/information and/or R.C. objects associated with the show episode and/or segment may be provided via the interfacing module 250 (e.g., via wired or wireless network 50) such that the data/information provided by the interfacing module 250 is synchronized with video data/information being provided via the CDN 10. For example, automatic content recognition (ACR) and/or the like may be used to synchronize the video data/information received via the CDN 10 and the data/information received via the interfacing module 250. This method of experiencing an interactive advertisement in association with a media presentation (e.g., enhanced news shown) may be particularly relevant for embodiments where the rundown data/information and/or R.C. objects are offered as a companion experience to a traditional television show aired via a linear broadcast. In such embodiments, a user may not need to log in and/or have his/her identity authenticated in order to access the rundown data/information and/or R.C. objects.

The client module 35 may be configured to provide functionality to the user interface 2000 (e.g., of the user computing entity 30). The functionality of the user interface 2000 (e.g., of the user computing entity 30) will be discussed below with regard to the client module 35.

Client Module 35

In various embodiments, the client module 35 may be configured to run on the user computing entity 30 to provide the user with a user interface 2000. In another embodiment, the client module 35 may be configured to run on the provider system 200 or an associated computing device and to provide the user with a user interface 2000 via the user computing entity 30. As noted above, the user interface 2000 may be configured to allow the user to experience and/or interact with one or more interactive advertisements provided in association with a media presentation.

FIG. 15 illustrates a flowchart illustrating some processes and procedures that can be performed or carried out in providing an interactive advertisement in association with a media presentation. Starting at step 1502, a connection is established with the provider system 200. For example, the client module 35 may cause the computing entity 30 to establish a connection with provider system 200 (e.g., via the interfacing module 250). For example, the user computing entity 30 may connect to the provider system 200 via a socket host connection. The connection between the user computing entity 30 and provider system 200 may occur over a wired or wireless network 50. In one embodiment, the connection between the user computing entity 30 and the provider system 200 may occur via the Internet, for instance.

At step 1504, the client module 35 can receive rundown data/information and/or ticker data/information from the interfacing module 250. At step 1506, the client module 35 can receive streaming video or a video file (e.g., comprising video data) via the CDN 10. As noted above, the video stream or file may be received via broadcast or over-the-air methods, via a cable provider network, via a satellite television provider network, via an IP-based distribution network, and/or the like. In various embodiments, the client module 35 may request a particular video stream or file or a particular portion of a video stream based on at least a portion of the received rundown data/information. In some embodiments, the client module 35 may receive a live video stream by default unless a particular video stream or file is requested by the client module 35.

At step 1508, the rundown data/information, video stream or file, and ticker data/information are displayed to the user. As noted above, the rundown data/information may comprise show and one or more sets of segment data/information. The show and segment data/information may comprise data/information used to populate the rundown frame 2320 of the user interface 2000 (e.g., of the user computing entity 30) with show and/or segment tiles representing the show episodes and associated segments for the date or category selected via the data/information selector 2310. Each set of segment data/information may further comprise an array of R.C. identifiers that may be used to populate the R.C. viewer/portion 2700 of the user interface 2000 (e.g., of the user computing entity 30). For example, the R.C. identifiers may be used to determine/identify and/or generate one or more R.C. tiles or minimized tiles, each associated with an R.C. object associated with one of the R.C. identifiers. The ticker data/information may be used to populate the ticker viewer/portion 2400 of the user interface 2000 (e.g., of the user computing entity 30). For example, the ticker viewer/ portion 2400 may display a set of streaming headlines. The video stream or file may be used to populate the video portion 2610 of the video viewer/portion 2600 of the user interface 2000 (e.g., of the user computing entity 30). In one embodiment, the client module 35 may be configured to receive the rundown data/information, the video stream or file, and ticker data/information in order to optimize the loading of the data/information and/or to minimize video lag times.

FIG. 16 shows an example R.C. viewer/portion 2700. The R.C. viewer/portion 2700 is populated by one or more minimized R.C. tiles 2720, forward and backward scroll controls 2702 and 2704, and social media buttons 2706. Each minimized R.C. tile 2720 may comprise an R.C. object title 2712 and an R.C. object type indicator 2714. The R.C. object title 2712 is the title associated with the R.C. data/information associated with the R.C. object. The R.C. object type indicator 2714 indicates the type of R.C. object is represented by the R.C. tile 2710 or minimized R.C. tile 2720. The minimized R.C. tiles 2720 displayed in the R.C. viewer/portion 2700 may correspond to the R.C. identifiers stored in association with the set of segment data/information for the current segment or in association with the interactive advertisement data/information in the case that the current segment is an interactive advertisement. In one embodiment, if a user mouses over a minimized R.C. tile 2720, an R.C. tile 2710 may be displayed. In other embodiments, another form of input indicating a user would like to view the R.C. tile 2710 associated with a particular R.C. minimized tile may be received. In still other embodiments, such as the embodiment shown in FIG. 14A, R.C. tiles 2710 may be displayed by the R.C. viewer/portion 2700 at all times, rather than minimized R.C. tiles 2720. An R.C. tile 2710 may comprise an R.C. object title 2712, an R.C. object type indicator 2714, and an R.C. thumbnail 2716. The R.C. thumbnail may be configured to provide a preview of the content of the R.C. object represented by the R.C. tile 2710. In various embodiments, the forward and backward scroll controls 2702 and 2704 may be configured to allow a user to scroll through additional R.C. tiles 2710 or minimized R.C. tiles 2720. For example, a segment may be associated with eight R.C. objects. However, in the embodiment shown in FIG. 16, only four minimized R.C. tiles 2710 are displayed at one time. Therefore, the forward and backward scroll controls 2702 and 2704 may be used to view the other four minimized R.C. tiles 2710 that are not currently displayed. The social media buttons 2706 may be configured to allow a user to share a segment or an interactive advertisement via a social media network (e.g., twitter, Facebook, and/or the like) or for a user to follow a particular show or show personality on a social media network or the like.

FIG. 17 illustrates R.C. tiles 2710 for a variety of different R.C. object types. For example, R.C. tile 2721 corresponds to an R.C. object with an R.C. object type indicator 2714 of "photo." Thus, the R.C. thumbnail 2716 associated with the R.C. tile 2721 may be a thumbnail image of the photo that comprises the R.C. object. The R.C. object may further comprise a caption and/or other data/information or resources related to the photo. R.C. tile 2722 corresponds to an R.C. object with an R.C. object type indicator 2714 of "story." Thus, the R.C. thumbnail 2716 associated with the R.C. tile 2722 may show the first sentence or first few sentences or a brief summary of the story or article comprising the associated R.C. object. R.C. tile 2723 corresponds to an R.C. object with an R.C. object type indicator 2714 of "photo gallery." Thus, the associated R.C. object may comprise a plurality of photos, their corresponding captions, and/or the like. The thumbnail 2716 shown as part of R.C. tile 2723 may cause display of a small version of one or more photos from the associated photo gallery. R.C. tile 2724 corresponds to an R.C. object with an R.C. object type indicator 2714 of "video." The R.C. tile 2724 may cause display of the length of the video on the R.C. tile. The thumbnail 2716 for R.C. tile 2724 may show a thumbnail version of the video preview image associated with the video comprising the R.C. object. In various embodiments, the R.C. object represented by R.C. tile 2724 may further comprise a caption and/or other data/information related to the video. R.C. tile 2725 corresponds to an R.C. object with an R.C. object type indicator 2714 of "biography." Thus, the R.C. object corresponding to the R.C. tile 2725 may comprise information, one or more images, and/or one or more infographics related to a guest on an episode of a show, a person or group of people who may be discussed on the associated show episode of the show, and/or other person, place or thing related to the associated segment of the show episode. R.C. tile 2725 comprises a thumbnail 2716 corresponding to a screen shot or other preview version of the associated R.C. object. R.C. tile 2726 corresponds to an R.C. object with an R.C. object type indicator 2714 of "poll." Thus, the R.C. object corresponding to the R.C. tile 2726 may comprise one or more questions and at least one option for responding to the question(s). For example, a user may be able to select (e.g., click with a mouse, touch a region of a touch screen, and/or the like) one of two or more multiple choice options or provide input indicating a response to at least one of the one or more questions. After a user provides input indicating a response to at least one question, the user may be provided with a graphical or other representation of the responses received from at least one other user. R.C. tile 2726 comprises a thumbnail 2716 corresponding to a screen shot or other preview version of the associated R.C. object. R.C. tile 2727 corresponds to an R.C. object associated with an R.C. object type indicator 2714 of "video gallery." Thus, the corresponding R.C. object is a collection of two or more videos and may further comprise associated captions and/or other information. Similar to the thumbnail 2716 of R.C. tile 2723, the thumbnail for R.C. tile 2727 may display a small version of one or more video preview images from the associated video gallery. R.C. tile 2728 corresponds to an R.C. object with an R.C. object type indicator of "iReport: Video." In the illustrated embodiment, the length of the corresponding video is also displayed on the R.C. tile 2728. The thumbnail 2716 comprising R.C. tile 2728 is a thumbnail sized video preview image corresponding to the video of the R.C. object. The R.C. tile 2729 corresponds to an R.C. object associated with an R.C. object type indicator 2714 of "map." The R.C. object may comprise a map, an interactive map, a map related infographic, and/or related data/information and/or captions. The thumbnail 2716 associated with R.C. tile 2729 may be a thumbnail image of the corresponding map. R.C. tile 2730 is an example of a social media content R.C. object. Particularly, the R.C. tile 2730 displays a tweet that may correspond to the current segment. R.C. tile 2730 also provides controls for a user to retweet, reply to, and/or favorite the tweet and/or to follow the account to which the tweet was posted (a variety of other social media types may also be used). In various embodiments, controls may be provided for completing one or more of various social media content related actions. R.C. tile 2731 is an example of a social media follow R.C. object. Particularly, the R.C. tile 2731 provides an invitation for a user to follow a particular social media account and a mechanism by which input may be received indicating that the user would like to follow the indicated social media account. In various embodiments, the social media account associated with the social media follow R.C. object 2731 is related to the current segment. Thus, a wide variety of R.C. objects may be associated with a given segment.

Returning to FIG. 15, at step 1510, interactive advertisement data/information is received. For example, the client module 35 may receive interactive advertisement data/information from the interfacing module 250. The interactive advertisement data/information may comprise one or more R.C. identifiers, one or more R.C. thumbnails, tiles, or minimized tiles, a segment tile, a sponsor logo or other image to be provided in association with the interactive advertisement, and/or the like. In various embodiments, the interactive advertisement data/information may be received before a commercial break/segment begins or during the commercial break/segment.

At step 1512, the beginning of a commercial segment is received. For example, the client module may receive an indicator that a commercial segment is beginning from the interfacing module 250. In some embodiments, the commercial segment may begin before the interactive advertisement data/information is received.

Figure 18A:
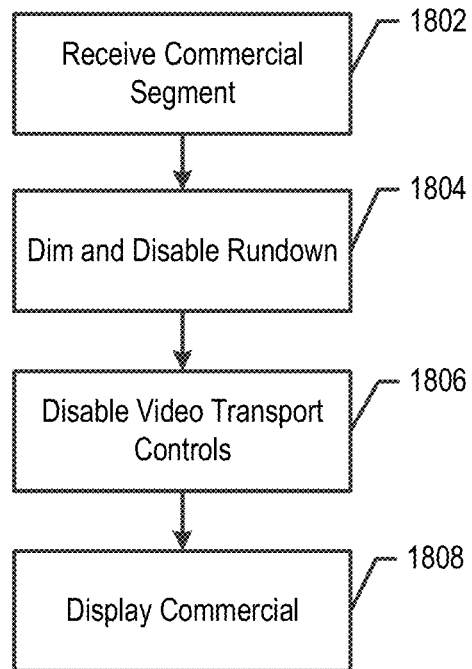
Figure 18B:
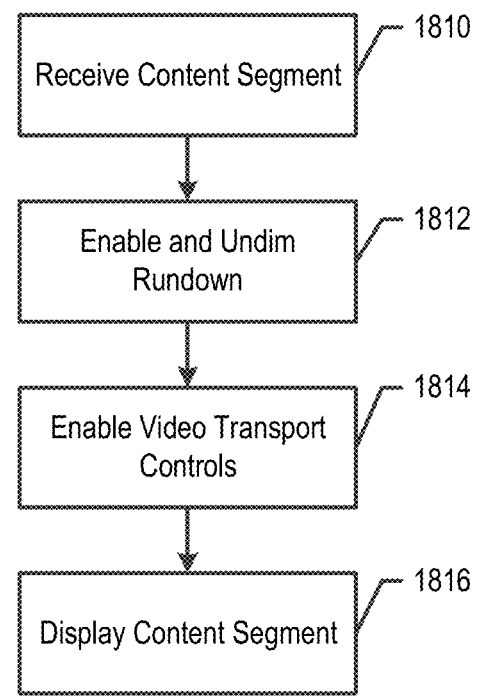

In various embodiments, responsive to receiving the indicator that the commercial segment is beginning, the client module 35 may complete various processes or procedures. FIG. 18A provides an example of a set of processes or procedures that can be performed or carried out in response to receiving the indicator that the commercial segment is beginning. Starting at step 1802, a commercial segment may be received. As noted above, each segment is associated with a set of segment data/information. The set of segment data/information may comprise a segment type. In other embodiments, the interfacing module 250 may communicate to the client module 35 that a specific segment is a commercial segment via another method. During a live or pre-produced show, it is possible that a received segment may be associated with a segment type indicating that the segment is a commercial. In various embodiments, the interfacing module 250 may push commercial segments to the client module 35 periodically, regularly, and/or in response to certain triggers. In other embodiments, the commercial segments may be included as a segment associated with a show episode or may be embedded in a segment of a show.

At step 1804, the client module 35 disables and dims out the rundown such that a user may not be able to select another segment to view during the commercial segment. At step 1806, the client module disables the video controls. In some embodiments, the volume control is not be disabled during this process. For example, the scrubbing controls, play/pause controls, and/or other video transport controls may be disabled and all other video controls (e.g., volume controls, closed captioning controls, full screen controls, and/or the like) remain enabled. At step 1808, the video data/information associated with the commercial segment is displayed and the progress of the commercial may be indicated on the user interface 2000 (e.g., of the user computing entity 30).

FIG. 19 shows an example commercial view 2060 of a user interface 2000 (e.g., of the user computing entity 30). The video data/information associated with the commercial segment may be displayed in the video viewer/portion 2600. The commercial progress indicator 2612 may also be displayed in the video viewer/portion 2600 or elsewhere on the screen. In some embodiments, while the video data/information associated with the commercial segment is being displayed, the rundown, the R.C. tiles 2710 or minimized tiles 2720, and/or the ticker or various combinations thereof, may be disabled. In embodiments in which the R.C. tiles 2710 or minimized tiles 2720 remain enabled during the commercial segment, if an R.C. object is selected, the client module 35 may react in a similar manner as described in relation to FIGS. 21 and 22. Thus, the video data/information associated with the commercial segment may be displayed in the pushed back viewer 2680 while the R.C. object is displayed. In various embodiments, R.C. tiles 2710 or minimized tiles 2720 associated with an interactive advertisement are displayed in the R.C. viewer/portion 2700 during the while the commercial of the interactive advertisement plays.

Returning to FIG. 15, at step 1514, an indicator that an interactive advertisement is starting is received. For example, the client module may receive an indicator that an interactive advertisement is starting from the interfacing module 250. At step 1516, after receiving the indicator that the interactive advertisement is starting, or responsive thereto, the R.C. tiles 2710 or minimized tiles 2720 associated with the interactive advertisement are displayed simultaneously with the beginning of the commercial of the interactive advertisement.

FIG. 20 provides an interactive advertisement view 2040 of the user interface 2000. The interactive advertisement view 2040 may comprise a video viewer/portion 2610 for displaying the commercial associated with the interactive advertisement. The interactive advertisement view 2040 may comprise an interactive advertisement rundown tile 2340 positioned between the current and up next rundown tiles in the rundown viewer 2300. The interactive advertisement rundown tile 2340 may indicate the brand and/or product associated with the interactive advertisement and may indicate that the interactive advertisement is sponsored content. The interactive advertisement view 2040 may also include an R.C. viewer/portion 2700. The R.C. viewer/portion 2700 may comprise one or more R.C. tiles 2710 or minimized tiles 2720 associated with the interactive advertisement. The R.C. viewer/portion 2700 may further comprise a sponsored content indicator 2740 configured to indicate to a user that the R.C. objects associated with the interactive advertisement are sponsored content. In various embodiments, the interactive advertisement view 2040 may further comprise a logo portion 2350 for displaying a logo or other message associated with the brand or product associated with the interactive advertisement or a logo or other message associated with the interactive advertisement.

Returning to FIG. 15, at step 1518, it is determined/identified whether input indicating user selection of an R.C. tile 2710 or minimized tile 2720 has been received. If input indicating user selection of an R.C. tile has been received, the R.C. object associated with the R.C. tile 2710 or minimized tile 2720 is requested from the content broker and displayed via the user interface, as discussed in more detail below with respect to FIGS. 21 and 22. If, at step 1518, it is determined/identified that input indicating user selection of an R.C. tile 2710 or minimized tile 2720 has not been received, the process continues to step 1520.

At step 1520, an interactive advertisement end indicator is received. For example, the client module 35 may receive an indication that the interactive advertisement has ended from the interfacing module 250 (e.g., via the wired or wireless network 50) or via the CDN 10 (e.g., as a tag (or other indicator) embedded in the video stream). In various embodiments, the indicator that the interactive advertisement has ended may be received as part of and/or in association with updated rundown data/information. At step 1522, in response to receiving the indicator that the interactive advertisement has ended, the user interface 2000 may return to the commercial view 2060. For example, the updated rundown data/information may be provided via the rundown viewer/portion 2300, the commercial video may be provided via the viewer/portion 2610, and R.C. tiles 2710 or minimized tiles 2720 may be displayed in the R.C. viewer/portion 2700. In various embodiments, the R.C. tiles 2710 or minimized tiles 2720 displayed may be the R.C. or minimized tiles associated with the segment that was provided previous to the commercial break/segment. For example, the displayed R.C. tiles 2710 may revert to the R.C. tiles that were displayed before the interactive advertisement started. In some embodiments, the R.C. tiles or minimized tiles associated with the interactive advertisement may be displayed in the R.C. viewer/portion 2700 until the commercial break/segment ends. In various embodiments, if the interactive advertisement is the final advertisement in the commercial break/segment, step 1522 may be skipped/bypassed in favor of completing step 1524. For example, the user interface 2000 may not return to the commercial view 2060 after the interactive advertisement ends.

At step 1524, an end of commercial break/segment indicator is received. For example, the client module 35 may receive a content segment associated with the show episode or another indicator that the commercial break/segment is over. In response to receiving the end of commercial break/segment indicator, the client module 35 may complete various processes and procedures, an example of which are provided by FIG. 18B. Starting at step 1810, a content segment is received. For example, the client module 35 may receive a content segment and associated rundown data/information from the interfacing module 250 (e.g., via the wired or wireless network 50) and/or the CDN 10. At step 1812, the rundown may be enabled and undimmed, such that a user may select a segment for viewing if the user so desires. At step 1814, the video transport controls (e.g., pause, scrub, 30 second rewind, and/or the like) are enabled. At step 1816, the content segment and the associated R.C. tiles 2710 (or minimized tiles 2720) are displayed.

As noted above, FIG. 21 provides a flowchart illustrating various processes and procedures that can be performed or carried out in response to a user selecting an R.C. tile or minimized tile associated with an interactive advertisement. For example, if at step 1518, as shown in FIG. 15, it is determined/identified that user selection of an R.C. tile or minimized tile has been received, the client module 35 may continue to step 2102 as shown in FIG. 21. The received input indicating user selection of the R.C. tile or minimized tile may comprise an R.C. identifier configured to identify the R.C. object associated with the user-selected R.C tile or minimized tile.

Starting at step 2102, the R.C. object indicated by the user-selected R.C. tile or minimized tile is requested. For example, the client module 35 may request the user-selected R.C. object from the content broker 270 (e.g., via the wired or wireless network 50). At step 2104, the R.C. object is received. For example, the client module 35 may receive the R.C. object from the content broker 270. In various embodiments, the received R.C. object can be normalized (e.g., formatted for optimal viewing on the particular user computing entity 30, formatted to fit a particular template associated with the R.C. object type indicator 2714, and/or the like). At step 2106, the video data/information displayed in the video viewing portion 2610 of the video viewer/portion 2600 is moved to a pushed back video viewer 2680, as shown in FIG. 22. According to FIG. 21, at step 2108, the R.C. object is displayed. For example, the client module 35 may display the R.C. object in the R.C. object viewer/portion 2782 of an R.C. object view 2030 of the user interface 2000.

FIG. 22 illustrates an R.C. object view 2030 of the user interface 2000, according to one embodiment. In the R.C. object view 2030, the video viewer/portion 2600 is pushed back to the pushed back video viewer/portion 2680, the rundown viewer/portion 2300 is greyed out, and the main portion of the display device associated with the user computing entity 30 displays the user-selected R.C. object 2780 in an R.C. object viewer/portion 2782. Pushed back video viewer/portion 2680 comprises pushed back video portion 2688 for displaying the video associated with the interactive advertisement, play/pause button 2684 configured for receiving user input indicating the user would like to pause or play the video associated with the interactive advertisement, and volume control 2686 configured to receive user input indicating the user would like to adjust the volume of the video associated with the interactive advertisement. In some embodiments, the play/pause button 2684 may be disabled while the commercial of the interactive advertisement is being displayed. In various embodiments, the commercial associated with the interactive advertisement will continue to play when the video is pushed back. In one embodiment, if the R.C. object comprises one or more videos, the video associated with the interactive advertisement may be paused when the video is pushed back. In the embodiment shown in FIG. 22, the pushed back video viewer 2680 covers part of the rundown viewer 2300. The remainder of the rundown viewer 2300 has been dimmed out or greyed out, indicating that the rundown is currently disabled. The remainder of the display associated with the user computing entity 30 displays the R.C. object 2780. Thus, a user may read an article associated with a product or brand while watching a commercial associated with the product or brand, pause the commercial to watch a video associated with the product or brand associated with the commercial, and/or the like. Via social media R.C. objects, a user may also be able to comment on, blog, and/or vlog (video blog) about an interactive advertisement, the associated commercial, and/or the product or brand associated with the interactive advertisement while watching or pausing the interactive advertisement. In various embodiments, a user may share an R.C. object or the interactive advertisement or a portion thereof via social media. In various embodiments, a user may be able to provide comments associated with an R.C. object (e.g., a user may provide input via a user computing entity 30 that is then provided with to the provider system 200 and stored in association with the R.C. object) and/or view comments associated with the R.C. object provided by other users.

In various embodiments, a save story button 2784, share story button 2786, and close E.C. object button 2788 are provided via R.C. object view 2030. The save story button 2784 may be configured to receive input indicating the user would like to save the E.C. object 2780 to the saved story list, which is described below. The share story button 2786 is configured for receiving input indicating the user would like to share the E.C. object 2780 via email and/or social media. The close E.C. object button 2788 may be configured to receive input indicating the user would like to close the E.C. object 2780 and return to the default layout view of the user interface 2000, wherein the default layout view may depend on the user computing entity 30.

As described above and with respect to FIG. 12, an R.C. tile 2710 (or minimized tile 2720) may be associated with two or more R.C. objects. The R.C. object provided to the user may depend on one or more characteristics associated with the user. For example, the R.C. object provided to the user (of the two or more R.C. objects associated with the R.C. tile) may be determined/identified based at least in part on the geographic location of the user, if the user has interacted with or selected other R.C. tiles associated with the interactive advertisement, if the user has returned to the interactive advertisement by selecting the interactive advertisement tile 2340 in the rundown and/or the like. In various embodiments, the client module 35 may receive input indicating user selection of an R.C. tile, identify the appropriate R.C. object to be provided to the user, and request the appropriate R.C. object from the content broker 270. In other embodiments, the client module 35 may receive input indicating user selection of an R.C. tile and request an R.C. object from the content broker 270. The content broker may then determine the appropriate R.C. object to provide to the user.

Returning to FIG. 21, at step 2110, input indicating the user would like to close the R.C. object 2780 is received. For example, the user may select the close R.C. object button 2788. At step 2112, it is determined/identified whether an indication that the interactive advertisement has ended has been received. For example, the client module 35 may receive an indicator from the interfacing module 250 (e.g., via the wired or wireless network 50) that the interactive advertisement has ended. In another example, the client module 35 may have received a tag (or other indicator) embedded in the video stream indicating that another commercial has started and that, therefore, the interactive advertisement has ended.

If, at step 2112, it is determined/identified that no indication that the interactive advertisement has ended has not been received, the process continues to step 2120. At step 2120, the user interface 2000 returns to the interactive advertisement view 2040. At step 2122, the R.C. tiles or minimized tiles associated with the interactive advertisement are displayed in the R.C. viewer/portion 2700.

If at step 2112 it is determined/identified that an indication that the interactive advertisement has ended has been received, the process continues to step 2114. At step 2114, it is determined/identified whether an indication that the commercial break/segment has ended has been received. For example, the client module 35 may receive an indicator from the interfacing module 250 (e.g., via the wired or wireless network 50) that the commercial break/segment has ended. For example, the client module 35 may receive rundown data/information indicating that the current segment is a content segment. In another example, the client module 35 may receive a tag (or other indicator) via the video stream provided by via the CDN 10 that indicates that the commercial break/segment is over or that the current segment is a content segment.

If it is determined/identified at step 2114 that the commercial break/segment has not ended, the process continues to step 2124. At step 2124, the user interface 2000 returns to the commercial view 2060. At step 2126, the R.C. tiles 2710 or minimized tiles 2720 associated with the segment that was displayed before the commercial break/segment was displayed in the R.C. viewer/portion 2700. In some embodiments, however, the R.C. tiles 2710 or minimized tiles 2720 continue to be displayed, rather than the segment R.C. tiles, until the next content segment begins. For example, in such embodiments, the process would continue from step 2124 to step 2122.

If it is determined/identified at step 2114 that an indication that the commercial break/segment has ended has been received, the process continues to step 2116. At step 2116, the user interface 2000 returns to the normal view, an example of which is shown in FIG. 13. At step 2118, the R.C. tiles 2710 or minimized tiles 2720 associated with the current segment are displayed. For example, the video for the current segment may be displayed in the video viewer/portion 2610 and the associated R.C. tiles 2710 or minimized tiles 2720 are displayed in the R.C. viewer/portion 2700. Thus, the user may view and/or interact with an R.C. object associated with the interactive advertisement. The user may continue to view and/or interact with the R.C. object after the interactive advertisement has ended and even after the commercial break/segment has ended and the show has returned. If the show returns while the user is viewing and/or interacting with the R.C. object, the video associated with the show may be displayed in the pushed back video portion 2688. Thus, according to various embodiments of the present invention, an interactive advertisement may be provided to the user in association with a media presentation while maintaining the user as a viewer of the media presentation.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for providing a commercial as an interactive advertisement via a user computing entity, the method comprising:

storing, at a server, interactive advertisement data associated with an interactive advertisement, the interactive advertisement data (a) identifying an associated commercial, (b) identifying at least one related content object, and (c) comprising at least one advertisement indicator identifying one or more characteristics that must be satisfied by a commercial segment for the commercial segment to host the interactive advertisement, wherein at least one of the one or more characteristics is selected from the group consisting of a frequency requirement comprising an occurrence rate corresponding with the interactive advertisement, and a position requirement associated with at least one of a plurality of candidate positions of the commercial segment;

generating, by the server and based at least in part on normalizing the at least one related content object, a normalized related content object configured for simultaneous display with the associated commercial via the user computing entity;

receiving, by the server, an indication that the associated commercial is to be provided during a first commercial segment, the first commercial segment associated with at least one show;

prior to the airing of the associated commercial during the first commercial segment, determining, by the server, whether the one or more characteristics that must be satisfied by a commercial segment for the interactive advertisement to be provided during the commercial segment are satisfied by the first commercial segment; and responsive to determining that the one or more characteristics that must be satisfied by a commercial segment for the interactive advertisement to be provided during the commercial segment are satisfied by the first commercial segment, pushing, by an interfacing module operating on the server, at least one portion of the interactive advertisement data for the associated commercial to the user computing entity, the at least one portion of the interactive advertisement data providing access to the normalized related content object.

2. The method of claim 1, further comprising identifying at least one universal characteristic requirement applicable to the interactive advertisement, and wherein providing the at least one portion of the interactive advertisement data is responsive to determining that one or more characteristics of the first commercial segment satisfy the at least one universal characteristic requirement.

3. The method of claim 1, wherein the at least one portion of the interactive advertisement data is pushed to a client module operating on a user computing entity via an application programming interface (API) of the client module.

4. The method of claim 1, wherein at least one of the one or more characteristic requirements is a time of day indicator, or a content indicator.

5. The method of claim 1, wherein the indication that the associated commercial is to be provided during the first commercial segment is received before a beginning of the first commercial segment.

6. The method of claim 1, wherein the indication that the associated commercial is to be provided during the first commercial segment is received via a linear broadcast after a beginning of the first commercial segment.

7. The method of claim 1, wherein at least one of the one or more characteristic requirements is selected from the group consisting of a keyword, topic, or content associated with a segment preceding the first commercial segment.

8. A system for providing a commercial as an interactive advertisement via a user computing entity, the system comprising at least one memory and at least one processor, the system configured to at least:

store interactive advertisement data associated with an interactive advertisement, the interactive advertisement data (a) identifying an associated commercial, (b) identifying at least one related content object, and (c) comprising at least one advertisement indicator identifying one or more characteristics that must be satisfied by a commercial segment for the commercial segment to host the interactive advertisement, wherein at least one of the one or more characteristics is selected from the group consisting of a frequency requirement comprising an occurrence rate corresponding with the interactive advertisement, and a position requirement associated with at least one of a plurality of candidate positions of the commercial segment;

generate, based at least in part on normalizing the at least one related content object, a normalized related content object configured for simultaneous display with the associated commercial via the user computing entity;

receive an indication that the associated commercial is to be provided during a first commercial segment, the first commercial segment associated with at least one show;

prior to the airing of the associated commercial during the first commercial segment, determine whether the one or more characteristics that must be satisfied by a commercial segment for the interactive advertisement to be provided during the commercial segment are satisfied by the first commercial segment; and responsive to determining that the one or more characteristics that must be satisfied by a commercial segment for the interactive advertisement to be provided during the commercial segment are satisfied by the first commercial segment, push at least one portion of the interactive advertisement data for the associated commercial to the user computing entity, the at least one portion of the interactive advertisement data providing access to the normalized related content object.

9. The system of claim 8, wherein the system is further configured to further identify at least one universal characteristic requirement applicable to the interactive advertisement, and wherein providing the at least one portion of the interactive advertisement data is responsive to determining that one or more characteristics of the first commercial segment satisfy the at least one universal characteristic requirement.

10. The system of claim 8, wherein the at least one portion of the interactive advertisement data is configured to provide the user with access to a related content object.

11. The system of claim 8, wherein at least one of the one or more characteristic requirements is a time of day indicator, or a content indicator.

12. The system of claim 8, wherein the indication that the associated commercial is to be provided during the first commercial segment is received before a beginning of the first commercial segment.

13. The system of claim 8, wherein the indication that the associated commercial is to be provided during the first commercial segment is received via a linear broadcast after a beginning of the first commercial segment.

14. The system of claim 8, wherein at least one of the one or more characteristic requirements is selected from the group consisting of a keyword, topic, or content associated with a segment preceding the first commercial segment.

15. A computer program product for providing a commercial as an interactive advertisement via a user computing entity, the computer program product comprising at least one non-transitory computer-readable storage medium having computer-readable program code portions stored therein, the computer-readable program code portions comprising:

an executable portion configured to store interactive advertisement data associated with an interactive advertisement, the interactive advertisement data (a) identifying an associated commercial, (b) identifying at least one related content object, and (c) comprising at least one advertisement indicator identifying one or more characteristics that must be satisfied by a commercial segment for the commercial segment to host the interactive advertisement, wherein at least one of the one or more characteristics is selected from the group consisting of a frequency requirement comprising an occurrence rate corresponding with the interactive advertisement, and a position requirement associated with at least one of a plurality of candidate positions of the commercial segment;

an executable portion configured to generate, based at least in part on normalizing the at least one related content object, a normalized related content object configured for simultaneous display with the associated commercial via the user computing entity;

an executable portion configured to receive an indication that the associated commercial is to be provided during a first commercial segment, the first commercial segment associated with at least one show;

an executable portion configured to, prior to the airing of the associated commercial during the first commercial segment, determine whether the one or more characteristics that must be satisfied by a commercial segment for the interactive advertisement to be provided during the commercial segment are satisfied by the first commercial segment; and an executable portion configured to responsive to determining that the one or more characteristics that must be satisfied by a commercial segment for the interactive advertisement to be provided during the commercial segment are satisfied by the first commercial segment, push at least one portion of the interactive advertisement data for the associated commercial to the user computing entity, the at least one portion of the interactive advertisement data providing access to the normalized related content object.

16. The computer program product of claim 15, wherein the computer-readable program code portions further comprise an executable portion configured to identify at least one universal characteristic requirement applicable to the interactive advertisement, and wherein providing the at least one portion of the interactive advertisement data is responsive to determining that one or more characteristics of the first commercial segment satisfy the at least one universal characteristic requirement.

17. The computer program product of claim 15, wherein the at least one portion of the interactive advertisement data is configured to provide the user with access to a related content object.

18. The computer program product of claim 15, wherein at least one of the one or more characteristic requirements is a time of day indicator, or a content indicator.

19. The computer program product of claim 15, wherein the indication that the associated commercial is to be provided during the first commercial segment is received before a beginning of the first commercial segment.

20. The computer program product of claim 15, wherein the indication that the associated commercial is to be provided during the first commercial segment is received via a linear broadcast after a beginning of the first commercial segment.

21. The computer program product of claim 15, wherein at least one of the one or more characteristic requirements is selected from the group consisting of a keyword, topic, or content associated with a segment preceding the first commercial segment.

* * * * *